(12) United States Patent
Takahashi et al.

(10) Patent No.: US 11,089,169 B2
(45) Date of Patent: Aug. 10, 2021

(54) IMAGE TRANSFER SYSTEM, IMAGING TERMINAL, DISPLAY TERMINAL, AND ADJUSTMENT METHOD

(71) Applicant: OLYMPUS CORPORATION, Hachioji (JP)

(72) Inventors: Tetsuyuki Takahashi, Tokyo (JP); Yasuhiro Hasegawa, Hanno (JP); Kiyoshi Toyoda, Tokyo (JP)

(73) Assignee: OLYMPUS CORPORATION, Tokyo (JP)

(*) Notice: Subject to any disclaimer, the term of this patent is extended or adjusted under 35 U.S.C. 154(b) by 50 days.

(21) Appl. No.: 16/718,527

(22) Filed: Dec. 18, 2019

(65) Prior Publication Data

US 2020/0128140 A1 Apr. 23, 2020

Related U.S. Application Data

(63) Continuation of application No. PCT/JP2017/023176, filed on Jun. 23, 2017.

(51) Int. Cl.
*H04N 1/00* (2006.01)
*H04N 5/232* (2006.01)

(52) U.S. Cl.
CPC ..... *H04N 1/00103* (2013.01); *H04N 1/00129* (2013.01); *H04N 5/232* (2013.01);
(Continued)

(58) Field of Classification Search
CPC ............ H04N 5/232; H04N 1/00103
(Continued)

(56) References Cited

U.S. PATENT DOCUMENTS

2007/0300272 A1* 12/2007 Takanezawa ...... H04N 21/4334
725/105
2016/0065435 A1 3/2016 Ito et al.

FOREIGN PATENT DOCUMENTS

JP 2007-49681 A 2/2007
JP 2013-121014 A 6/2013
(Continued)

OTHER PUBLICATIONS

International Search Report dated Sep. 5, 2017, issued in counterpart International Application No. PCT/JP2017/023176, with English Translation. (3 pages).

*Primary Examiner* — Joel W Fosselman
(74) *Attorney, Agent, or Firm* — Westerman, Hattori, Daniels & Adrian, LLP

(57) ABSTRACT

An image transfer system including an imaging terminal and a display terminal. A processor included in one terminal of the imaging terminal and the display terminal is programmed to execute a communication delay time calculation function of generating a first measurement signal in synchronization with the imaging period and transmitting the first measurement signal to the other terminal, receiving a second measurement signal in accordance with the first measurement signal transmitted from the other terminal, and calculating a communication delay time according to a transmission timing of the first measurement signal, a reception timing of the second measurement signal, and elapsed time data included in the second measurement signal and indicating an elapsed time from a reception timing of the first measurement signal to a transmission timing of the second measurement signal in the other terminal.

12 Claims, 31 Drawing Sheets

(52) U.S. Cl.
CPC ................ *H04N 2201/0055* (2013.01); *H04N 2201/0084* (2013.01)

(58) Field of Classification Search
USPC ...................................................... 348/207.1
See application file for complete search history.

(56) References Cited

FOREIGN PATENT DOCUMENTS

| | | |
|---|---|---|
| JP | 2016-5204 A | 1/2016 |
| JP | 2016-46767 A | 4/2016 |

\* cited by examiner

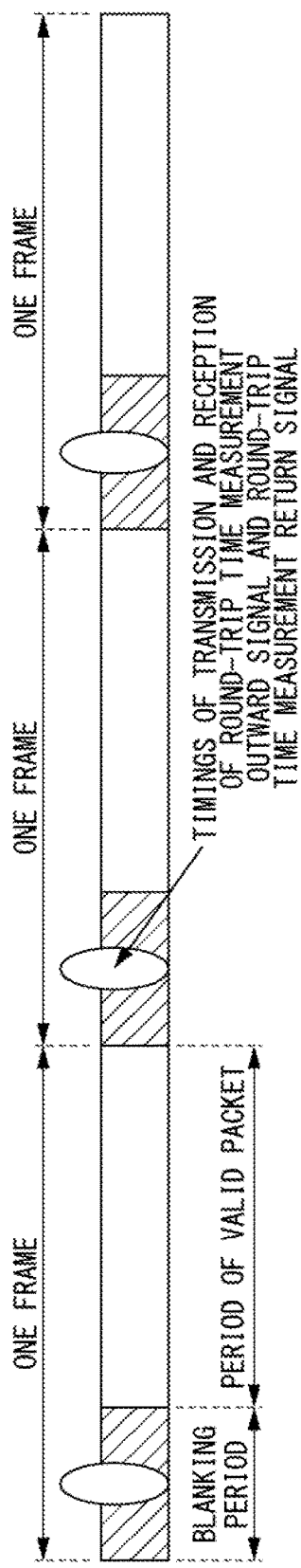

IMAGE TRANSFER SYSTEM, IMAGING TERMINAL, DISPLAY TERMINAL, AND ADJUSTMENT METHOD

CROSS REFERENCE TO RELATED APPLICATIONS

This application is a continuation application based on a PCT Patent Application No. PCT/JP2017/023176, filed on Jun. 23, 2017, the content of which is incorporated herein by reference.

BACKGROUND

Technical Field

The present invention relates to an image transfer system, an imaging terminal, a display terminal, an adjustment method, an adjustment support method, an adjustment program, and an adjustment support program.

Background Art

In the related art, for example, image transfer systems that wirelessly deliver captured image data between imaging terminals and display terminals using wireless communication standards such as Institute of Electrical and Electronics Engineers (IEEE) 802.11 which is a high-speed wireless communication technology, typified by so-called WiFi (registered trademark), have been commercialized. In image transfer systems, imaging terminals transmit captured image data captured by imaging units included in the imaging terminals to display terminals. Then, in the image transfer systems, the display terminals cause display units included in the display terminals to display images in accordance with the captured image data transmitted from the imaging terminals.

In such image transfer systems, for example, synchronization signals such as vertical synchronization signals or horizontal synchronization signals based on standard clock signals generated by crystal oscillator ICs or the like are generated by each of imaging terminals and display terminals. Then, the imaging terminals and the display terminals each operate in accordance with timings of the generated synchronization signals. That is, in the imaging terminals, imaging units capture images in accordance with the timings of the synchronization signals generated in the imaging terminals and transmit captured image data to the display terminals. In the display terminals, display units display images in accordance with the captured image data transmitted from the imaging terminals in accordance with timings of the synchronization signals generated in the display terminals.

Incidentally, in image transfer systems, even when crystal oscillator ICs mounted on imaging terminals and display terminals are crystal oscillator ICs generating clock signals of the same phase or period, synchronization signals generated by the imaging terminals deviate from synchronization signals generated by the display terminals in some cases. That is, phases or periods deviate between the clock signals generated by the crystal oscillator ICs mounted on the imaging terminals and clock signals generated by the crystal oscillator ICs mounted on the display terminals in some cases. This is caused due to an error (for example, an error in 100 ppm units depending on temperature characteristics) of a phase or a period of an output signal that a crystal oscillator included in each crystal oscillator IC has, a variation in a timing at which power is supplied to each of the imaging terminal and the display terminal, or the like. Then, a deviation amount of the synchronization signal generated by each of the imaging terminal and the display terminal increases in proportion to an elapsed time. Therefore, even when a process of matching timings at which the imaging terminal and the display terminal each generate the synchronization signals is performed a finite number of times (for example, once, twice, or the like) after supply of power, the synchronization signal generated by the imaging terminal and the synchronization signal generated by the display terminal may deviate from one another over time.

When the synchronization signals deviate from one another in the imaging terminal and the display terminal, a valid period of an image in the captured image data transmitted from the imaging terminal may not be within the synchronization signal generated by the display terminal in some cases. That is, a start timing or an end timing of the valid period of the image in the captured image data transmitted from the imaging terminal may deviate from a start timing or an end timing of a valid period of an image based on the synchronization signal generated by the display terminal in some cases. In addition, when the valid period of the image in the captured image data transmitted from the imaging terminal deviates from the valid period of the image based on the synchronization signal generated by the display terminal, the display terminal may not correctly display the image in accordance with the captured image data transmitted from the imaging terminal.

Accordingly, for example, a technology for a communication device that synchronizes communication timings of two communication units has been proposed as in Japanese Unexamined Patent Application, First Publication No. 2016-005204 (hereinafter referred to as Patent Document 1). In the technology disclosed in Patent Document 1, at least one of the communication units is controlled such that beacons transmitted by the two communication units performing communication independently at different frequencies are synchronized. At this time, in the technology disclosed in Patent Document 1, after each communication unit transmits a beacon at a predetermined time interval, the communication unit issues a predetermined signal after a predetermined time passes. In the technology disclosed in Patent Document 1, communication timings of the two communication units are synchronized based on a time difference between the timings at which the signals issued from the communication units are received in accordance with transfer of a beacon signal by each communication unit.

Incidentally, in wireless communication, for example, delay of wireless transfer between communication devices is changed due to interference or the like of wireless signals in some cases. However, in synchronization control in the technology for the communication devices disclosed in Patent Document 1, delay of wireless transfer is not taken into consideration. Therefore, when the technology for the communication devices disclosed in Patent Document 1 is applied to each of an imaging terminal and a display terminal in an image transfer device, for example, control of phase deviation which is not originally necessary may be performed due to temporary delay of wireless transfer.

SUMMARY

The present invention is devised in view of the foregoing problem recognition and an objective of the present invention is to provide an image transfer system, an imaging terminal, a display terminal, an adjustment method, an adjustment support method, an adjustment program, and an adjustment support program capable of determining adjustment necessity and non-necessity of phase deviation between a timing signal of the imaging terminal and a timing signal of the display terminal in the image transfer system wirelessly delivering captured image data between the imaging terminal and the display terminal.

According to a first aspect of the present invention, there is provided an image transfer system including an imaging terminal that transmits captured image data at an imaging period and a display terminal that is configured to receive the captured image data and displays the captured image data at a display period. The image transfer system includes: a communication delay time calculation function provided for one terminal between the imaging terminal and the display terminal, the function of generating a first measurement signal in synchronization with the imaging period and transmitting the first measurement signal to the other terminal, receiving a second measurement signal in accordance with the first measurement signal transmitted from the other terminal, and calculating a communication delay time according to a transmission timing of the first measurement signal, a reception timing of the second measurement signal, and elapsed time data included in the second measurement signal and indicating an elapsed time from a reception timing of the first measurement signal to a transmission timing of the second measurement signal in the other terminal; a communication delay time calculation assisting function provided for the other terminal, the function of receiving the first measurement signal, generating the second measurement signal including the elapsed time data, and transmitting the second measurement signal to the one terminal; an adjustment necessity or non-necessity determination function provided for one terminal between the imaging terminal and the display terminal, the function of determining necessity or non-necessity of adjustment for phase deviation between an imaging timing of the imaging terminal and a display timing of the display terminal according to the communication delay time and a pre-decided threshold time; and a phase adjustment function provided for one terminal between the imaging terminal and the display terminal, the function of adjusting a phase of the imaging timing or the display timing when the adjustment of the phase deviation is determined to be necessary.

According to a second aspect of the present invention, in the image transfer system according to the first aspect, in the phase adjustment function, the phase of the imaging timing or the display timing may be adjusted according to the communication delay time when the adjustment of the phase deviation is determined to be necessary.

According to a third aspect of the present invention, in the image transfer system according to the second aspect, in the adjustment necessity or non-necessity determination function, the adjustment of the phase deviation may be determined to be necessary when the communication delay time is equal to or less than the threshold time.

According to a fourth aspect of the present invention, in the image transfer system according to the third aspect, in the adjustment necessity or non-necessity determination function, the threshold time may be updated to a time shorter than a current decided time when the adjustment of the phase deviation is determined to be necessary.

According to a fifth aspect of the present invention, in the image transfer system according to the third aspect, the adjustment necessity or non-necessity determination function may include a phase deviation cumulative time estimation function of estimating a cumulative time of the phase deviation according to a non-adjustment elapsed time indicating an elapsed time from a time at which the adjustment of the phase deviation is last determined to be necessary when the communication delay time exceeds the threshold time. In the phase deviation cumulative time estimation function, the threshold time may be updated according to the communication delay time when the estimated cumulative time exceeds a predetermined ratio of the threshold time.

According to a sixth aspect of the present invention, in the image transfer system according to the fifth aspect, the imaging terminal and the display terminal may include a clock generator with the same specification. In the phase deviation cumulative time estimation function, the cumulative time may be estimated according to the non-adjustment elapsed time and information indicating a pre-stored precision specification of the clock generator.

According to a seventh aspect of the present invention, the image transfer system according to the fifth aspect may further include a period adjustment necessity and non-necessity determination function provided for one terminal between the imaging terminal and the display terminal, the period adjustment necessity and non-necessity determination function of determining necessity or non-necessity of adjustment of period deviation between the imaging period and the display period whenever a predetermined time elapses.

According to an eighth aspect of the present invention, in the image transfer system according to the seventh aspect, in the phase deviation cumulative time estimation function, the cumulative time may be estimated according to the non-adjustment elapsed time and information indicating an adjustment amount of the period deviation by the period adjustment necessity and non-necessity determination function.

According to a ninth aspect of the present invention, there is provided an imaging terminal in an image transfer system including the imaging terminal that transmits captured image data at an imaging period and a display terminal that is configured to receive the captured image data and displays the captured image data at a display period. The imaging terminal includes: a communication delay time calculation function of generating a first measurement signal in synchronization with the imaging period and transmitting the first measurement signal to the display terminal, receiving a second measurement signal in accordance with the first measurement signal transmitted from the display terminal, and calculating a communication delay time according to a transmission timing of the first measurement signal, a reception timing of the second measurement signal, and elapsed time data included in the second measurement signal and indicating an elapsed time from a reception timing of the first measurement signal to a transmission timing of the second measurement signal in the display terminal; an adjustment necessity or non-necessity determination function of determining necessity or non-necessity of adjustment for phase deviation between an imaging timing of the imaging terminal and a display timing of the display terminal according to the communication delay time and a pre-decided threshold time; and a phase adjustment function of adjusting a phase of the imaging timing when the adjustment of the phase deviation is determined to be necessary.

According to a tenth aspect of the present invention, there is provided a display terminal in an image transfer system including an imaging terminal that transmits captured image data at an imaging period and the display terminal that is configured to receive the captured image data and displays the captured image data at a display period. The display terminal includes a communication delay time calculation assisting function of receiving a first measurement signal transmitted from the imaging terminal in synchronization with the imaging period, generating a second measurement signal including elapsed time data indicating an elapsed time from a reception timing of the first measurement signal to a transmission timing of the second measurement signal in accordance with the first measurement signal, and transmitting the second measurement signal to the imaging terminal.

According to an eleventh aspect of the present invention, there is provided an adjustment method of adjusting phase deviation between an imaging timing of an imaging terminal and a display timing of a display terminal in an image transfer system including the imaging terminal that transmits captured image data at an imaging period and the display terminal that is configured to receive the captured image data and displays the captured image data at a display period. The adjustment method includes: a process of generating a first measurement signal in synchronization with the imaging period from one terminal between the imaging terminal and the display terminal and transmitting the first measurement signal to the other terminal; a process of receiving the first measurement signal by the other terminal; a process of generating the second measurement signal including elapsed time data indicating an elapsed time from a reception timing of the first measurement signal to a transmission timing of the second measurement signal in accordance with the first measurement signal and transmitting the second measurement signal to the one terminal by the other terminal; a process of receiving the second measurement signal and calculating a communication delay time according to a transmission timing of the first measurement signal, a reception timing of the second measurement signal, and the elapsed time data by the one terminal; a process of determining necessity or non-necessity of adjustment of phase deviation between the imaging timing of the imaging terminal and the display timing of the display terminal according to the communication delay time and a pre-decided threshold time by one terminal between the imaging terminal and the display terminal; and a process of adjusting a phase of the imaging timing or the display timing by one terminal between the imaging terminal and the display terminal when the adjustment of the phase deviation is determined to be necessary.

According to a twelfth aspect of the present invention, there is provided an adjustment method of adjusting phase deviation between an imaging timing of an imaging terminal and a display timing of a display terminal in the imaging terminal of an image transfer system including the imaging terminal that transmits captured image data at an imaging period and the display terminal that is configured to receive the captured image data and displays the captured image data at a display period. The adjustment method includes: a process of generating a first measurement signal in synchronization with the imaging period and transmitting the first measurement signal to the display terminal; a process of receiving a second measurement signal including elapsed time data indicating an elapsed time from a reception timing of the first measurement signal to a transmission timing of the second measurement signal in accordance with the first measurement signal transmitted from the display terminal; a process of calculating a communication delay time according to a transmission timing of the first measurement signal, a reception timing of the second measurement signal, and the elapsed time data; a process of determining necessity or non-necessity of adjustment for phase deviation between the imaging timing of the imaging terminal and the display timing of the display terminal according to the communication delay time and a pre-decided threshold time; and a process of adjusting a phase of the imaging timing when the adjustment of the phase deviation is determined to be necessary.

According to a thirteenth aspect of the present invention, there is provided an adjustment support method of assisting adjustment of a phase deviation between an imaging timing of an imaging terminal and a display timing of a display terminal in the display terminal of an image transfer system including the imaging terminal that transmits captured image data at an imaging period and the display terminal that is configured to receive the captured image data and displays the captured image data at a display period. The adjustment support method includes a process of receiving a first measurement signal transmitted from the imaging terminal in synchronization with the imaging period, generating a second measurement signal including elapsed time data indicating an elapsed time from a reception timing of the first measurement signal to a transmission timing of the second measurement signal in accordance with the first measurement signal, and transmitting the second measurement signal to the imaging terminal.

According to a fourteenth aspect of the present invention, there is provided an adjustment program causing a computer to perform an adjustment method of adjusting phase deviation between an imaging timing of an imaging terminal and a display timing of a display terminal in the imaging terminal of an image transfer system including the imaging terminal that transmits captured image data at an imaging period and the display terminal that is configured to receive the captured image data and displays the captured image data at a display period. The adjustment program causes the computer to perform: a process of generating a first measurement signal in synchronization with the imaging period and transmitting the first measurement signal to the display terminal; a process of receiving a second measurement signal including elapsed time data indicating an elapsed time from a reception timing of the first measurement signal to a transmission timing of the second measurement signal in accordance with the first measurement signal transmitted from the display terminal; a process of calculating a communication delay time according to a transmission timing of the first measurement signal, a reception timing of the second measurement signal, and the elapsed time data; a process of determining necessity or non-necessity of adjustment for phase deviation between the imaging timing of the imaging terminal and the display timing of the display terminal according to the communication delay time and a pre-decided threshold time; and a process of adjusting a phase of the imaging timing when the adjustment of the phase deviation is determined to be necessary.

According to a fifteenth aspect of the present invention, there is provided an adjustment support program causing a computer to perform an adjustment support method of assisting adjustment of a phase deviation between an imaging timing of an imaging terminal and a display timing of a display terminal in the display terminal of an image transfer system including the imaging terminal that transmits captured image data at an imaging period and the display terminal that is configured to receive the captured image data and displays the captured image data at a display period. The adjustment support program causes the computer to perform a process of receiving a first measurement signal transmitted from the imaging terminal in synchronization with the imaging period, generating a second measurement signal including elapsed time data indicating an elapsed time from a reception timing of the first measurement signal to a transmission timing of the second measurement signal in accordance with the first measurement signal, and transmitting the second measurement signal to the imaging terminal.

According to the foregoing aspects, it is possible to obtain the advantages of providing an image transfer system, an imaging terminal, a display terminal, an adjustment method, an adjustment support method, an adjustment program, and an adjustment support program capable of determining adjustment necessity and non-necessity of phase deviation between a timing signal of the imaging terminal and a timing signal of the display terminal in the image transfer system wirelessly delivering captured image data between the imaging terminal and the display terminal.

BRIEF DESCRIPTION OF THE DRAWINGS

FIGS. 6A to 6C are diagrams showing examples of timings at which a round-trip time measurement outward signal and a round-trip time measurement return signal are transmitted and received in the image transfer system according to the first embodiment of the present invention.

DETAILED DESCRIPTION OF THE PREFERRED EMBODIMENTS

Figure 1:
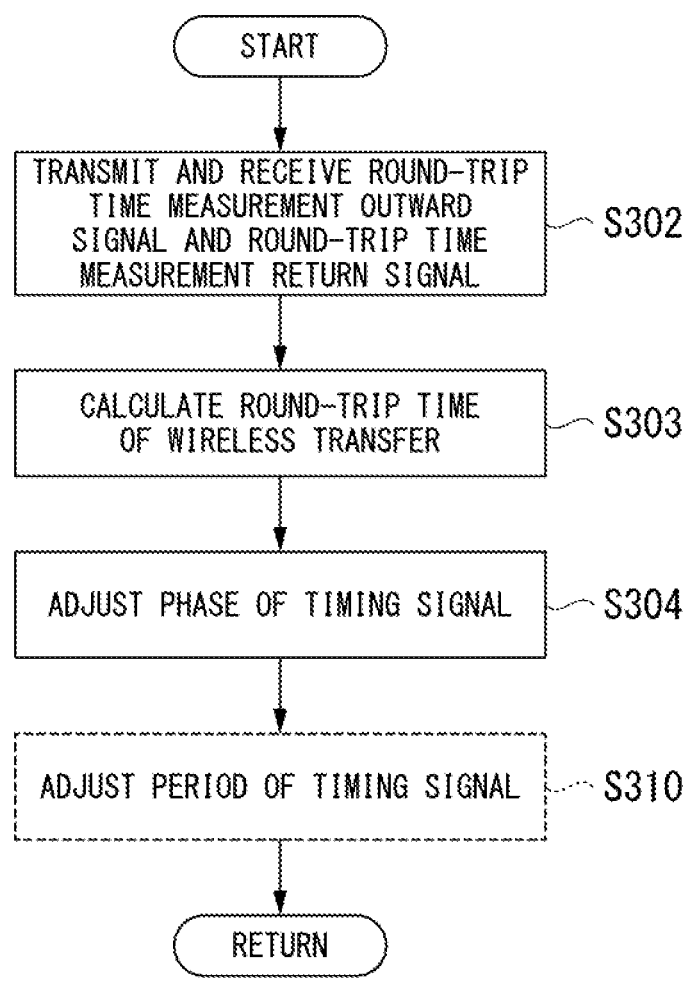
FIG. 1 is a flowchart showing an overall processing procedure of a process in an image transfer system according to an embodiment of the present invention.

Hereinafter, embodiments of the present invention will be described with reference to the drawings. An image transfer system according to an embodiment of the present invention is an image display system in which an imaging terminal wirelessly delivers (transmits) captured image data of an image captured by an imaging unit to a display terminal using a wireless communication technology, and the display terminal causes a display unit to display an image (display image) in accordance with the captured image data wirelessly delivered (transmitted) from the imaging terminal. First, an overview of an overall operation in the image transfer system will be described.

In the image transfer system, when the imaging terminal and the display terminal are activated, the imaging terminal and the display terminal each generate a standard clock signal and start an operation. More specifically, the imaging terminal generates a standard clock signal in the imaging terminal (hereinafter referred to as an "imaging standard clock signal") and starts an operation in accordance with a timing of the generated imaging standard clock signal. In addition, the display terminal generates a standard clock signal in the display terminal (hereinafter referred to as a "display standard clock signal") and starts an operation in accordance with a timing of the generated display standard clock signal. Then, in the image transfer system, an operation of establishing wireless connection is performed between the imaging terminal and the display terminal.

For example, the imaging terminal transmits a connection request to the display terminal until wireless connection with the display terminal is established. When the connection request is transmitted from the imaging terminal, the display terminal transmits a response signal to the imaging terminal in response to the connection request until the wireless connection with the imaging terminal is established. The wireless connection between the imaging terminal and the display terminal is established in accordance with the transmission of the connection request by the imaging terminal and the transmission of the response signal in response to the connection request by the display terminal.

A process performed to establish the wireless connection between the imaging terminal and the display terminal can be conceived easily based on a known wireless communication technology. Accordingly, a detailed description of the process performed to establish the wireless connection between the imaging terminal and the display terminal will be omitted. After the wireless connection is established, each of the imaging terminal and the display terminal monitors quality of the wireless communication by monitoring interference to a currently used channel of the wireless communication by another wireless communication device or the like. Then, each of the imaging terminal and the display terminal operates to select or convert the channel of the wireless communication normally so that the wireless transfer can be performed using a channel with good communication quality. The monitoring of the quality of the wireless communication between the imaging terminal and the display terminal or the method for the wireless transfer in which a channel with good communication quality is used can also be conceived easily based on a known wireless communication technology. Accordingly, a detailed description of the method for the wireless transfer in the imaging terminal and the display terminal will be omitted.

Thereafter, in the image transfer system, after the wireless connection between the imaging terminal and the display terminal is established, the imaging terminal transmits captured image data of an image captured by an imaging unit to the display terminal in accordance with a timing of a synchronization signal such as a vertical synchronization signal or a horizontal synchronization signal generated based on the imaging standard clock signal (hereinafter referred to as an "imaging synchronization signal"). On the other hand, the display terminal causes the display unit to display the image in accordance with the captured image data received from the imaging terminal in accordance with a timing of the synchronization signal such as a vertical synchronization signal or a horizontal synchronization signal generated based on the display standard clock signal (hereinafter referred to as a "display synchronization signal").

In the image transfer system, when the wireless connection between the imaging terminal and the display terminal is established, a phase adjustment process between the imaging terminal and the display terminal starts. Here, an overall processing procedure of the phase adjustment process performed after the wireless connection between the imaging terminal and the display terminal is established will be described. FIG. 1 is a flowchart showing an overall processing procedure of a process in an image transfer system according to an embodiment of the present invention.

In the image transfer system, when the phase adjustment process starts, a round-trip time measurement outward signal and a round-trip time measurement return signal are transmitted and received between the imaging terminal and the display terminal (step S302). More specifically, in the process of step S302, one terminal between the imaging terminal and the display terminal transmits the round-trip time measurement outward signal for calculating a round-trip time necessary for transmission and reception at the time of wireless transfer to the other terminal. Then, the other terminal receiving the round-trip time measurement outward signal transmits the round-trip time measurement return signal in accordance with the received round-trip time measurement outward signal to the one terminal which has transmitted the round-trip time measurement outward signal.

Subsequently, in the image transfer system, the one terminal receiving the round-trip time measurement return signal calculates a round-trip time necessary for transmission and reception in the wireless transfer between the imaging terminal and the display terminal (step S303). More specifically, in the process of step S303, one terminal between the imaging terminal and the display terminal calculates a round-trip time of a signal reciprocating in the wireless transfer based on a transmission time of the round-trip time measurement outward signal, a reception time of the round-trip time measurement return signal transmitted from the other terminal, and information included in the round-trip time measurement return signal. Here, the round-trip time is a sum time of a required time (delay time) of the wireless communication in the wireless transfer of the round-trip time measurement return signal transmitted from one terminal to the other terminal and a required time (delay time) of the wireless communication in the wireless transfer of the round-trip time measurement outward signal transmitted from the other terminal to the one terminal.

Subsequently, in the image transfer system, one terminal receiving the round-trip time measurement return signal adjusts a phase of a timing signal used when the one terminal operates based on the calculated round-trip time necessary for transmission and reception in the wireless transfer between the imaging terminal and the display terminal (step S304). More specifically, when the one terminal is the imaging terminal, the imaging terminal adjusts a phase of the imaging synchronization signal by causing the imaging unit to perform imaging and re-generating the imaging synchronization signal which is a timing signal when the captured image data of the captured image is transmitted to the display terminal, based on the imaging standard clock signal. When the one terminal is the display terminal, the display terminal adjusts a phase of the display synchronization signal by re-generating the display synchronization signal which is a timing signal when the display unit is caused to display the image in accordance with the received captured image data from the imaging terminal, based on the display standard clock signal. Thus, in the image transfer system, the phase is adjusted so that the phases of the imaging synchronization signal and the display synchronization signal do not deviate from one other between the imaging terminal and the display terminal.

The above process is a phase adjustment process for the timing signal performed between the imaging terminal and the display terminal in the image transfer system. In the image transfer system, after the phase adjustment process for the timing signal in step S304 ends, the process returns to step S302 to repeat the phase adjustment process of steps S302 to S304. Through the phase adjustment process, in the image transfer system, the phases of the imaging synchronization signal and the display synchronization signal are adjusted between the imaging terminal and the display terminal so that the phases do not deviate over time.

In the image transfer system, a period of the timing signal may be adjusted based on the information used in the phase adjustment process subsequently after the phase adjustment process for the timing signal in step S304. That is, in the image transfer system, periods of the imaging synchronization signal and the display synchronization signal may further be adjusted so that the periods do not deviate over time. In the overall flowchart of the phase adjustment process by the image transfer system shown in FIG. 1, the period of the timing signal is adjusted in step S310 subsequently after the phase adjustment process for the timing signal in step S304.

Here, a more detailed operation of the phase adjustment process for the timing signal performed in the image transfer system will be described exemplifying a case in which the imaging terminal included in the image transfer system is one terminal and the display terminal is the other terminal. An operation in a case in which the display terminal included in the image transfer system is one terminal and the imaging terminal is the other terminal can be easily understood by inversely conceiving the imaging terminal and the display terminal in the following description.

When the wireless connection with the display terminal is established, the imaging terminal generates a time of the imaging terminal based on the imaging standard clock signal. For example, the imaging terminal sets the time of establishment of the wireless connection with the display terminal as a standard time (for example, time 0) and starts generating a time indicating a later elapsed time (hereinafter referred to as an "imaging terminal time") based on the imaging standard clock signal. Then, in step S302, the imaging terminal determines a time at which a round-trip time measurement outward signal is scheduled to be transmitted to the display terminal (imaging terminal time) and generates a round-trip time measurement outward signal before the determined transmission schedule time. Then, the imaging terminal includes information regarding a packet identification number in the round-trip time measurement outward signal and transmits the round-trip time measurement outward signal to the display terminal. Thereafter, the imaging terminal waits for transmission of a round-trip time measurement return signal from the display terminal in accordance with the transmitted round-trip time measurement outward signal.

On the other hand, when the wireless connection with the imaging terminal is established, the display terminal generates a time of the display terminal based on the display standard clock signal. For example, the display terminal sets the time of establishment of the wireless connection with the imaging terminal as a standard time (for example, time 0) and starts generating a time indicating a later elapsed time (hereinafter referred to as a "display terminal time") based on the display standard clock signal. Then, the display terminal waits for transmission of the round-trip time measurement outward signal from the imaging terminal. Thereafter, when the display terminal receives the round-trip time measurement outward signal transmitted from the imaging terminal, the display terminal extracts information regarding a packet identification number included in the received round-trip time measurement outward signal in step S302. The display terminal clocks the display terminal time indicating a time at which the round-trip time measurement outward signal is received. Then, the display terminal determines a time at which the round-trip time measurement return signal in accordance with the received round-trip time measurement outward signal is scheduled to be transmitted to the imaging terminal (display terminal time) and generates the round-trip time measurement return signal before the determined transmission schedule time. At this time, the display terminal calculates a difference between a reception time of the round-trip time measurement outward signal and the determined transmission schedule time of the round-trip time measurement return signal as a receiver elapsed time. Then, the display terminal includes information regarding the calculated receiver elapsed time, information regarding the transmission schedule time of the round-trip time measurement return signal, and information regarding the packet identification number extracted from the round-trip time measurement outward signal in the round-trip time measurement return signal and transmits the round-trip time measurement return signal to the imaging terminal.

Thereafter, when the imaging terminal receives the round-trip time measurement return signal transmitted from the display terminal, the imaging terminal clocks the imaging terminal time indicating a time at which the round-trip time measurement return signal is received. The imaging terminal extracts the information regarding the received receiver elapsed time, the information regarding the transmission schedule time of the round-trip time measurement return signal, and the information regarding the packet identification number included in the received round-trip time measurement return signal. Then, in step S303, the imaging terminal calculates a difference between the transmission schedule time of the round-trip time measurement outward signal determined in step S302 and the reception time of the round-trip time measurement return signal. Then, the imaging terminal calculates a round-trip time necessary for transmission and reception at the time of wireless transfer with the display terminal by subtracting the extracted receiver elapsed time from the time of the calculated difference. That is, the imaging terminal calculates a delay time of a signal reciprocating in only the wireless transfer between the imaging terminal and the display terminal.

In this way, in the image transfer system, one terminal between the imaging terminal and the display terminal calculates the delay time of the signal reciprocating in only the wireless transfer as a round-trip time based on information regarding a time at which the round-trip time measurement outward signal is transmitted, information regarding a time at which the round-trip time measurement return signal transmitted from the other terminal is received, and information regarding a time until the other terminal receives the round-trip time measurement outward signal and the round-trip time measurement return signal is transmitted.

Thereafter, in the image transfer system, the imaging terminal performs the phase adjustment process for the timing signal in step S304. In the phase adjustment process for the timing signal by the imaging terminal, the phase is adjusted without changing the period of the imaging synchronization signal by re-generating the imaging synchronization signal (the timing signal) used for the imaging unit to perform imaging in accordance with the round-trip time calculated based on the information regarding the round-trip time measurement return signal corresponding to the transmitted round-trip time measurement outward signal. Here, when the round-trip time calculated in step S303 is equal to or less than a determination value which is a threshold for determining a pre-decided round-trip time (hereinafter referred to as a "round-trip time determination value,") the imaging terminal re-generates the imaging synchronization signal (the timing signal) and adjusts the phase of the imaging synchronization signal. Conversely, when the round-trip time calculated in step S303 is greater than the pre-decided round-trip time determination value, the imaging terminal keeps a current generation timing without re-generating the imaging synchronization signal (the timing signal), that is, ends the phase adjustment process for the timing signal in step S304 without adjusting the phase of the imaging synchronization signal.

Thereafter, in the image transfer system, the imaging terminal repeats the phase adjustment process for the timing signal in steps S302 to S304.

When a period of the timing signal is adjusted as in the overall flowchart of the phase adjustment process by the image transfer system shown in FIG. 1, the imaging terminal performs a period adjustment process for the timing signal in step S310 subsequently after the phase adjustment process for the timing signal in step S304. The period adjustment process for the timing signal in step S310 may be performed whenever the phase adjustment process for the timing signal is performed a predetermined number of times, that is, when a pre-decided time elapses.

As described above, in the image transfer system, after the wireless connection between the imaging terminal and the display terminal is established, one terminal between the imaging terminal and the display terminal starts the phase adjustment process for the timing signal by transmitting the round-trip time measurement outward signal to the other terminal. Then, in the image transfer system, the phase of the timing signal is adjusted based on the round-trip time of only transmission and reception of the wireless transfer between the imaging terminal and the display terminal which is calculated based on the information regarding the round-trip time measurement outward signal transmitted by the one terminal and the information included in the round-trip time measurement return signal in accordance with the transmitted round-trip time measurement outward signal.

First Embodiment

Figure 2:
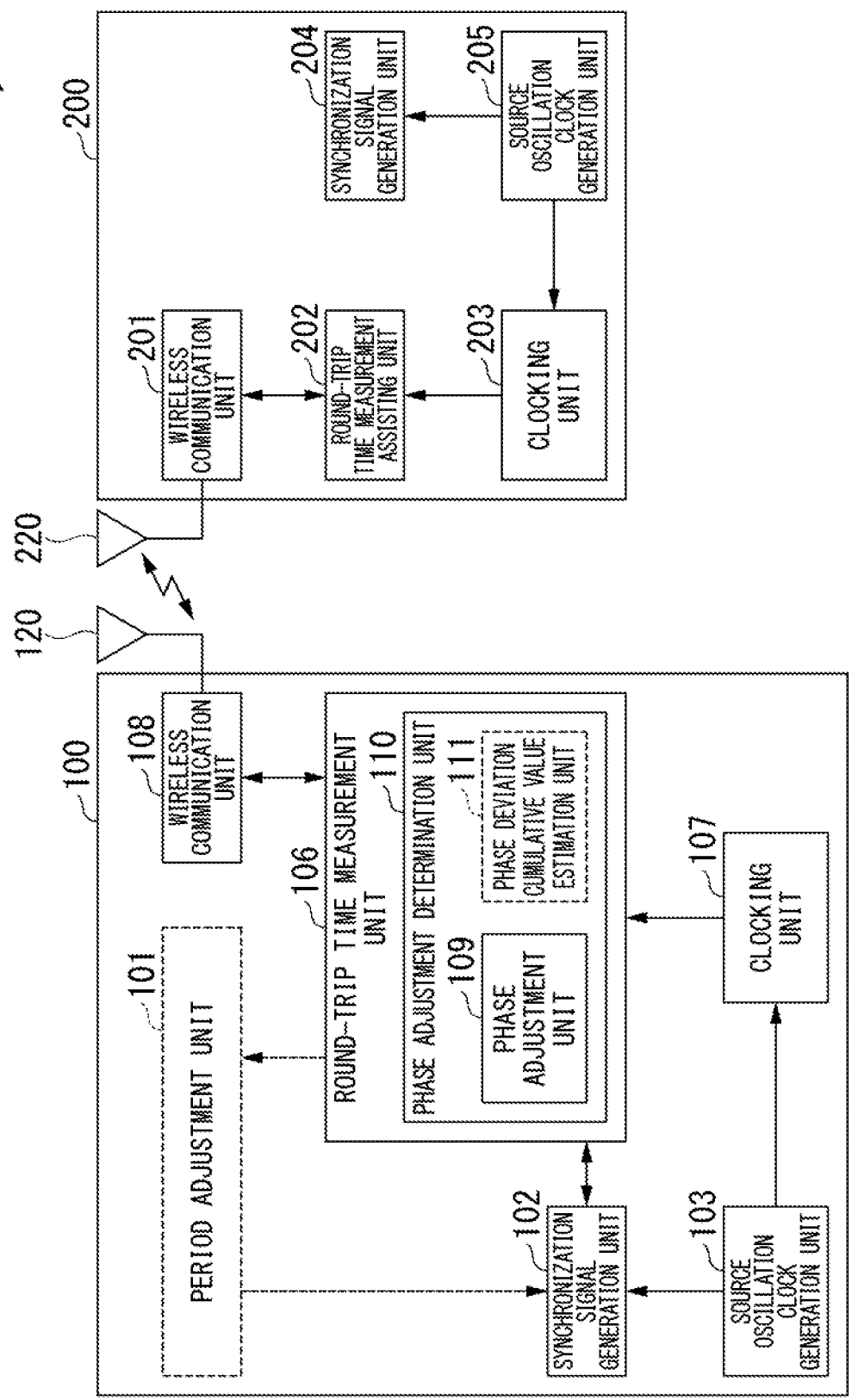
FIG. 2 is a block diagram showing an overall configuration of an image transfer system according to a first embodiment of the present invention.

Next, a specific configuration and operation in which the phase of the timing signal in the image transfer system is adjusted in the image transfer system will be described. FIG. 2 is a block diagram showing an overall configuration of the image transfer system according to a first embodiment of the present invention. An image transfer system 1 includes an imaging terminal 100 and a display terminal 200. The imaging terminal 100 starts an operation in accordance with a timing of an imaging standard clock signal generated in the imaging terminal 100. Then, the imaging terminal 100 transmits captured image data of an image captured by an imaging unit to the display terminal 200 in accordance with a timing of an imaging synchronization signal which is a timing signal generated based on the imaging standard clock signal. The display terminal 200 starts an operation in accordance with a timing of a display standard clock signal generated in the display terminal 200. Then, the display terminal 200 causes a display unit to display an image in accordance with the captured image data received from the imaging terminal 100 in accordance with a timing of the display synchronization signal which is a timing signal generated based on the display standard clock signal.

The image transfer system 1 is an image transfer system that has a configuration in which the imaging terminal 100 transmits a round-trip time measurement outward signal to the display terminal 200 and a phase of a timing signal (an imaging synchronization signal) generated by the imaging terminal 100 is adjusted based on information regarding the transmitted round-trip time measurement outward signal and information included in a round-trip time measurement return signal transmitted from the display terminal 200 in accordance with the transmitted round-trip time measurement outward signal.

The imaging terminal 100 includes a synchronization signal generation unit 102, a period adjustment unit 101, a source oscillation clock generation unit 103, a wireless communication unit 108, a round-trip time measurement unit 106, a clocking unit 107, a phase adjustment unit 109, a phase adjustment determination unit 110, a phase deviation cumulative value estimation unit 111, and an antenna 120. The display terminal 200 includes a synchronization signal generation unit 204, a source oscillation clock generation unit 205, a wireless communication unit 201, a round-trip time measurement assisting unit 202, a clocking unit 203, and an antenna 220.

FIG. 2 shows a configuration of the imaging terminal 100 in which the phase adjustment determination unit 110 is included inside the round-trip time measurement unit 106, and the phase adjustment unit 109 and the phase deviation cumulative value estimation unit 111 are included inside the phase adjustment determination unit 110. FIG. 2 shows a configuration in which the period adjustment unit 101 is included in the imaging terminal 100. However, in the image transfer system 1, the imaging terminal 100 may be configured to adjust a phase of at least a timing signal (imaging synchronization signal). Therefore, in the image transfer system 1, the imaging terminal 100 may have a configuration in which one or both of the period adjustment unit 101 and the phase deviation cumulative value estimation unit 111 shown in FIG. 2 are not included.

First, each constituent element included in the imaging terminal 100 will be described.

The source oscillation clock generation unit 103 generates a source oscillation clock signal which is a source of an imaging standard clock signal by which the imaging terminal 100 operates. The source oscillation clock generation unit 103 is, for example, a so-called clock generator configured to include a crystal oscillation IC or the like. The source oscillation clock generation unit 103 generates a source oscillation clock signal when the imaging terminal 100 is activated. The imaging standard clock signal is generated based on the source oscillation clock signal generated by the source oscillation clock generation unit 103. In the following description, to facilitate the description, the source oscillation clock generation unit 103 is assumed to generate the imaging standard clock signal for description.

The clocking unit 107 clocks a time in the imaging terminal 100 (an imaging terminal time) based on the imaging standard clock signal generated by the source oscillation clock generation unit 103. The clocking unit 107 outputs information regarding the clocked imaging terminal time to the round-trip time measurement unit 106 (including the phase adjustment determination unit 110, the phase adjustment unit 109, and the phase deviation cumulative value estimation unit 111). The clocking unit 107 may also output the information regarding the clocked imaging terminal time to the wireless communication unit 108.

The synchronization signal generation unit 102 generates a synchronization signal (imaging synchronization signal) such as a vertical synchronization signal or a horizontal synchronization signal indicating start or end of a valid period of captured image data imaged and output by an imaging unit (not shown) included in the imaging terminal 100 based on the imaging standard clock signal generated by the source oscillation clock generation unit 103. The synchronization signal generation unit 102 outputs the generated imaging synchronization signal to each of the imaging unit (not shown) and the round-trip time measurement unit 106 (the phase adjustment determination unit 110, the phase adjustment unit 109, and the phase deviation cumulative value estimation unit 111).

When an instruction to adjust the phase of the imaging synchronization signal is input from the phase adjustment unit 109 included in the phase adjustment determination unit 110 inside the round-trip time measurement unit 106, the synchronization signal generation unit 102 re-generates the imaging synchronization signal (that is, adjusts the phase of the generated imaging synchronization signal) according to the input instruction to adjust the phase. When an instruction to adjust the period of the imaging synchronization signal is input from the period adjustment unit 101, the synchronization signal generation unit 102 re-generates the imaging synchronization signal (that is, adjusts the period of the generated imaging synchronization signal) according to the input instruction to adjust the period. Then, the synchronization signal generation unit 102 outputs the re-generated imaging synchronization signal to each of the imaging unit (not shown) and the round-trip time measurement unit 106.

The round-trip time measurement unit 106 measures (calculates) a round-trip time necessary to transmit and receive at the time of wireless transfer between the imaging terminal 100 and the display terminal 200 based on information regarding the imaging terminal time output from the clocking unit 107. When the round-trip time in the wireless transfer is measured, the round-trip time measurement unit 106 first determines a transmission schedule time which is an imaging terminal time at which the round-trip time measurement outward signal for calculating a round-trip time in the wireless transfer is scheduled to be transmitted to the display terminal 200. Then, the round-trip time measurement unit 106 generates the round-trip time measurement outward signal before the determined transmission schedule time and outputs the generated round-trip time measurement outward signal to the wireless communication unit 108 so that the round-trip time measurement outward signal is transmitted to the display terminal 200.

The round-trip time measurement unit 106 temporarily stores information regarding the determined transmission schedule time. Here, the information regarding the transmission schedule time temporarily stored by the round-trip time measurement unit 106 may be a transmission schedule time determined by the round-trip time measurement unit 106. The information regarding the transmission schedule time temporarily stored by the round-trip time measurement unit 106 may be information regarding an actual transmission time at which the wireless communication unit 108 transmits the round-trip time measurement outward signal to the display terminal 200. In the following description, the transmission schedule time determined by the round-trip time measurement unit 106 and the actual transmission time at which the wireless communication unit 108 transmits the round-trip time measurement outward signal to the display terminal 200 are assumed to be the same time and are referred to as a "transmission schedule time" for description.

Thereafter, when the round-trip time measurement return signal transmitted from the display terminal 200 is output from the wireless communication unit 108, the round-trip time measurement unit 106 calculates a round-trip time in which a signal reciprocates in the wireless transfer with the display terminal 200 based on the information regarding the temporarily stored transmission schedule time of the round-trip time measurement outward signal and information regarding the round-trip time measurement return signal output from the wireless communication unit 108. Here, as the information regarding the round-trip time measurement return signal, there is information regarding a reception time at which the round-trip time measurement outward signal is received in addition to information regarding a receiver elapsed time included in the round-trip time measurement return signal, information regarding the transmission schedule time of the round-trip time measurement return signal, and information regarding a packet identification number.

The round-trip time measurement unit 106 temporarily stores the information regarding the round-trip time measurement return signal, including information regarding a reception time at which the round-trip time measurement return signal is received. Here, information regarding the reception time temporarily stored by the round-trip time measurement unit 106 may be an input time at which the round-trip time measurement return signal is input from the wireless communication unit 108 to the round-trip time measurement unit 106. The information regarding the reception time temporarily stored by the round-trip time measurement unit 106 may be information regarding a reception time at which the wireless communication unit 108 actually receives the round-trip time measurement return signal transmitted from the display terminal 200. In the following description, the input time at which the round-trip time measurement return signal is input from the wireless communication unit 108 and a reception time at which the wireless communication unit 108 actually receives the round-trip time measurement return signal are assumed to be the same time and are referred to as a "reception time" for description.

The round-trip time measurement unit 106 outputs the information regarding the calculated round-trip time to the phase adjustment determination unit 110.

The phase adjustment determination unit 110 determines whether the phase of the imaging synchronization signal is adjusted based on the information regarding the round-trip time output from the round-trip time measurement unit 106. More specifically, the phase adjustment determination unit 110 compares the round-trip time output from the round-trip time measurement unit 106 with a round-trip time determination value that is pre-decided and stored. That is, the phase adjustment determination unit 110 compares a delay time of a signal delayed only in wireless transmission and reception between the imaging terminal 100 and the display terminal 200 with a delay time indicated by the pre-decided round-trip time determination value. Then, when the round-trip time output from the round-trip time measurement unit 106 is equal to or less than the pre-decided round-trip time determination value, the phase adjustment determination unit 110 determines that the phase of the imaging synchronization signal is adjusted. Conversely, when the round-trip time output from the round-trip time measurement unit 106 is greater than the pre-decided round-trip time determination value, the phase adjustment determination unit 110 determines that the phase of the imaging synchronization signal is not adjusted.

The phase adjustment determination unit 110 outputs information indicating a determination result about the adjustment of the phase of the imaging synchronization signal (hereinafter referred to as a "phase adjustment determination result") to the phase adjustment unit 109 and the phase deviation cumulative value estimation unit 111. At this time, the phase adjustment determination unit 110 outputs the phase adjustment determination result obtained by determining whether the phase of the imaging synchronization signal is adjusted and the information regarding the round-trip time output from the round-trip time measurement unit 106 to the phase adjustment unit 109.

When the phase adjustment determination result output from the phase adjustment determination unit 110 indicates that the phase of the imaging synchronization signal is adjusted, the phase adjustment unit 109 outputs an instruction to adjust the phase of the imaging synchronization signal to the synchronization signal generation unit 102 based on the phase adjustment determination result and the information regarding the round-trip time output from the phase adjustment determination unit 110. The phase adjustment unit 109 adjusts the phase of the imaging synchronization signal by outputting an instruction to re-generate the imaging synchronization signal to the synchronization signal generation unit 102. More specifically, the phase adjustment unit 109 adjusts the phase of the imaging synchronization signal by causing the synchronization signal generation unit 102 to temporarily stop generating the imaging synchronization signal, waits for a time indicated by the information regarding the round-trip time, and subsequently giving an instruction to resume the generation of the imaging synchronization signal. In the following description, a series of instructions for the phase adjustment unit 109 to adjust the phase of the imaging synchronization signal output to the synchronization signal generation unit 102 is referred to as a "phase adjustment instruction."

When the phase adjustment determination result output from the phase adjustment determination unit 110 indicates that the phase of the imaging synchronization signal is not adjusted, the phase adjustment unit 109 does not output the phase adjustment instruction to the synchronization signal generation unit 102. That is, when the phase of the imaging synchronization signal is not adjusted, the phase adjustment unit 109 causes the synchronization signal generation unit 102 to continuously generate the imaging synchronization signal without instructing the synchronization signal generation unit 102 to adjust the phase of the imaging synchronization signal.

The phase deviation cumulative value estimation unit 111 estimates a deviation amount between phases of the imaging synchronization signal and the display synchronization signal based on a period in which the phase adjustment determination result output from the phase adjustment determination unit 110 indicates that the phase of the imaging synchronization signal is not adjusted. Then, even when the phase adjustment determination result output from the phase adjustment determination unit 110 indicates that the phase of the imaging synchronization signal is not adjusted, the phase deviation cumulative value estimation unit 111 also causes the phase adjustment unit 109 to adjust the phase of the imaging synchronization signal based on a result obtained by estimating the deviation amount between the phases of the imaging synchronization signal and the display synchronization signal.

More specifically, the phase deviation cumulative value estimation unit 111 clocks a time in which the phase adjustment determination result indicating that the phase of the imaging synchronization signal is not adjusted is continuously output from the phase adjustment determination unit 110 after the phase adjustment determination result indicating that the phase of the imaging synchronization signal is adjusted is output from phase adjustment determination unit 110. Thus, the phase deviation cumulative value estimation unit 111 clocks (cumulates) an elapsed time in a state in which the phase of the imaging synchronization signal is not adjusted (hereinafter referred to as a "phase non-adjustment time") from a time at which the phase of the imaging synchronization signal is adjusted last.

Then, the phase deviation cumulative value estimation unit 111 calculates a deviation amount between the phases of the imaging synchronization signal and the display synchronization signal (hereinafter referred to as a "phase deviation cumulative value") based on the clocked phase non-adjustment time in the state in which the phase of the imaging synchronization signal is not adjusted. Then, the phase deviation cumulative value estimation unit 111 estimates the deviation amount between the phases of the imaging synchronization signal and the display synchronization signal by comparing the calculated phase deviation cumulative value with a pre-decided round-trip time determination value. At this time, when the phase deviation cumulative value is greater than a predetermined ratio of the pre-decided round-trip time determination value, the phase deviation cumulative value estimation unit 111 estimates that the deviation amount between the phases of the imaging synchronization signal and the display synchronization signal is large. In this case, the phase deviation cumulative value estimation unit 111 updates the round-trip time determination value pre-decided for the phase adjustment determination unit 110 to determine whether to adjust the phase of the imaging synchronization signal to a shorter time. Thus, for the imaging synchronization signal generated by the synchronization signal generation unit 102, an instruction to adjust the phase is given more by the phase adjustment unit 109 when the phase adjustment determination unit 110 subsequently determines whether the phase of the imaging synchronization signal is adjusted. When the phase deviation cumulative value estimation unit 111 estimates that the deviation amount between the phases of the imaging synchronization signal and the display synchronization signal is large, the phase adjustment unit 109 is instructed to adjust the phase of the imaging synchronization signal.

Conversely, when the phase deviation cumulative value is equal to or less than the predetermined ratio of the pre-decided round-trip time determination value, the phase deviation cumulative value estimation unit 111 estimates that the deviation amount between the phases of the imaging synchronization signal and the display synchronization signal is small. In this case, the phase deviation cumulative value estimation unit 111 continues to cumulate the round-trip time. When the phase adjustment determination result output from the phase adjustment determination unit 110 indicates that the phase of the imaging synchronization signal is adjusted, the phase deviation cumulative value estimation unit 111 initializes the phase deviation cumulative value, that is, sets the phase non-adjustment time to phase non-adjustment time=0. Thus, the phase deviation cumulative value estimation unit 111 clocks (cumulates) the phase non-adjustment time in the state in which the phase of the imaging synchronization signal is not adjusted from the time at which the phase of the imaging synchronization signal is adjusted last again.

In the image transfer system 1, at least when the phase adjustment determination result output from the phase adjustment determination unit 110 indicates that the phase of the imaging synchronization signal is adjusted, the phase adjustment unit 109 may adjust the phase of the imaging synchronization signal. Therefore, as described above, the imaging terminal 100 may not include the phase deviation cumulative value estimation unit 111.

The wireless communication unit 108 is a communication unit that transmits and receives a signal or data through wireless transfer by wireless connection established with the display terminal 200. The wireless communication unit 108 transmits the captured image data imaged and output by the imaging unit (not shown) included in the imaging terminal 100 to the display terminal 200 via the antenna 120 for wireless communication. The wireless communication unit 108 transmits the round-trip time measurement outward signal output from the round-trip time measurement unit 106 to the display terminal 200 via the antenna 120.

The wireless communication unit 108 receives the round-trip time measurement return signal transmitted from the display terminal 200 in accordance with the transmitted round-trip time measurement outward signal via the antenna 120. The wireless communication unit 108 outputs the received round-trip time measurement return signal to the round-trip time measurement unit 106.

The antenna 120 is an antenna for wireless communication used for the imaging terminal 100 to perform the wireless communication with the display terminal 200. The antenna 120 transmits the captured image data output from the wireless communication unit 108 or a wireless signal in accordance with the round-trip time measurement outward signal to the display terminal 200. The antenna 120 receives a wireless signal in accordance with the round-trip time measurement return signal transmitted from the display terminal 200. Then, the antenna 120 outputs the received round-trip time measurement return signal to the wireless communication unit 108.

The period adjustment unit 101 determines whether to adjust the period of the imaging synchronization signal generated by the synchronization signal generation unit 102 whenever a pre-decided time elapses. When the period adjustment unit 101 determines to adjust the period of the imaging synchronization signal, the period adjustment unit 101 outputs an instruction to adjust the period of the imaging synchronization signal (hereinafter referred to as a "period adjustment instruction") to the synchronization signal generation unit 102.

In the image transfer system 1, at least when the phase adjustment determination result output from the phase adjustment determination unit 110 indicates that the phase of the imaging synchronization signal is adjusted, the phase adjustment unit 109 may adjust the phase of the imaging synchronization signal. Therefore, as described above, the imaging terminal 100 may not include the period adjustment unit 101.

In this configuration, the imaging terminal 100 adjusts the phase and the period (at least, the phase) of the imaging synchronization signal (timing signal) used for the imaging unit (not shown) to capture an image or used to transmit the captured image data of the image captured by the imaging unit (not shown) to the display terminal 200. That is, the imaging terminal 100 adjusts the phase and the period (at least the phase) of the imaging synchronization signal generated by the imaging terminal 100 so that the phase and the period (at least the phase) between the imaging synchronization signal and the display synchronization signal with the display terminal 200 included together in the image transfer system 1 do not deviate and the phase and the period match the phase and the period (at least the phase) of the display synchronization signal generated by the display terminal 200.

Some or all of the functions of the constituent elements (for example, the functions of the round-trip time measurement unit 106, the phase adjustment determination unit 110, and the phase adjustment unit 109 and further the function of the phase deviation cumulative value estimation unit 111 or the period adjustment unit 101) adjusting the phase and the period (at least the phase) of the imaging synchronization signal included in the imaging terminal 100 may be realized as processors. At this time, all of the above-described functions in the imaging terminal 100 may be realized by one processor. The functions may be realized by individual processors corresponding to the above-described functions in the imaging terminal 100, that is, a plurality of processors. The above-described processor can be realized by, for example, a general-purpose central processing unit (CPU) and a program recorded on a memory. Some or all of the above-described functions in the imaging terminal 100 may also be realized by a dedicated integrated circuit such as a large scale integration (LSI), that is, a so-called application specific integrated circuit (ASIC).

Next, each constituent element included in the display terminal 200 will be described.

The source oscillation clock generation unit 205 generates a source oscillation clock signal which is a source of a display standard clock signal by which the display terminal 200 operates. The source oscillation clock generation unit 205 is, for example, a so-called clock generator configured to include a crystal oscillation IC or the like. The source oscillation clock generation unit 205 generates a source oscillation clock signal when the display terminal 200 is activated. The display standard clock signal is generated based on the source oscillation clock signal generated by the source oscillation clock generation unit 205. In the following description, to facilitate the description, the source oscillation clock generation unit 205 is assumed to generate the display standard clock signal for description.

The clocking unit 203 clocks a time in the display terminal 200 (a display terminal time) based on the display standard clock signal generated by the source oscillation clock generation unit 205. The clocking unit 203 outputs information regarding the clocked display terminal time to the round-trip time measurement assisting unit 202. The clocking unit 203 may also output the information regarding the clocked display terminal time to the wireless communication unit 201.

The synchronization signal generation unit 204 generates a synchronization signal (display synchronization signal) such as a vertical synchronization signal or a horizontal synchronization signal indicating start or end of a valid period of an image in accordance with the captured image data transmitted from the imaging terminal 100 and displayed on the display unit (not shown) included in the display terminal 200 based on the display standard clock signal generated by the source oscillation clock generation unit 205. The synchronization signal generation unit 204 outputs the generated display synchronization signal to, for example, a display image processing unit (not shown), a display unit (not shown), or the like that performs processes of generating an image in accordance with the captured image data transmitted from the imaging terminal 100 and causing a display unit (not shown) including a display device such as a liquid crystal display (LCD) to display the image.

The round-trip time measurement assisting unit 202 generates the round-trip time measurement return signal in accordance with the round-trip time measurement outward signal transmitted from the imaging terminal 100 based on information regarding the display terminal time output from the clocking unit 203. Then, the round-trip time measurement assisting unit 202 outputs the generated round-trip time measurement return signal to the wireless communication unit 201 to transmit the round-trip time measurement return signal to the imaging terminal 100. Thus, the round-trip time measurement assisting unit 202 assists in measurement (calculation) of a round-trip time necessary for transmission and reception at the time of wireless transfer between the imaging terminal 100 and the display terminal 200 which is performed in the imaging terminal 100.

When the round-trip time measurement return signal is generated, the round-trip time measurement assisting unit 202 first determines a transmission schedule time which is a display terminal time at which the round-trip time measurement return signal in accordance with the received round-trip time measurement outward signal is scheduled to be transmitted to the display terminal 200. The round-trip time measurement assisting unit 202 calculates a difference between the determined transmission schedule time of the round-trip time measurement return signal and a reception time of the round-trip time measurement outward signal as a receiver elapsed time.

The round-trip time measurement assisting unit 202 temporarily stores information regarding the reception time of the round-trip time measurement outward signal used at the time of calculation of the receiver elapsed time. Here, the information regarding the reception time temporarily stored by the round-trip time measurement assisting unit 202 may be an input time at which the round-trip time measurement outward signal is input from the wireless communication unit 201 to the round-trip time measurement assisting unit 202. The information regarding the reception time temporarily stored by the round-trip time measurement assisting unit 202 may be information regarding a reception time at which the wireless communication unit 201 actually receives the round-trip time measurement outward signal from the imaging terminal 100 and which is output from the wireless communication unit 201. In the following description, the input time at which the round-trip time measurement outward signal from the wireless communication unit 201 is input and the reception time at which the wireless communication unit 201 actually receives the round-trip time measurement outward signal are assumed to be the same time and are referred to as an "input time" so that the reception time is distinguished from the reception time used in the round-trip time measurement unit 106.

Then, the round-trip time measurement assisting unit 202 generates the round-trip time measurement return signal including the calculated receiver elapsed time, the information regarding the determined transmission schedule time of the round-trip time measurement return signal, and information regarding the packet identification number extracted from the round-trip time measurement outward signal before the determined transmission schedule time, and outputs the generated round-trip time measurement return signal to the wireless communication unit 201 to transmit the round-trip time measurement return signal to the imaging terminal 100.

The wireless communication unit 201 is a communication unit that transmits and receives a signal or data through wireless transfer by wireless connection established with the imaging terminal 100. The wireless communication unit 201 receives the captured image data or the round-trip time measurement outward signal transmitted from the imaging terminal 100 via the antenna 220 for wireless communication. The wireless communication unit 201 outputs the received captured image data to the display image processing unit (not shown). The wireless communication unit 201 outputs the received round-trip time measurement outward signal to the round-trip time measurement assisting unit 202.

The wireless communication unit 201 transmits the round-trip time measurement return signal output from the round-trip time measurement assisting unit 202 in accordance with the round-trip time measurement outward signal transmitted from the imaging terminal 100 to the imaging terminal 100 via the antenna 220.

The antenna 220 is an antenna for wireless communication used for the display terminal 200 to perform the wireless communication with the imaging terminal 100. The antenna 220 receives the wireless signal in accordance with the captured image data or the round-trip time measurement outward signal transmitted from the imaging terminal 100. Then, the antenna 220 outputs the received captured image data or round-trip time measurement outward signal to the wireless communication unit 201. The antenna 220 transmits a wireless signal in accordance with the round-trip time measurement return signal output from the wireless communication unit 201 to the imaging terminal 100.

In this configuration, the display terminal 200 assists the adjustment of the phase and the period (at least, the phase) of the imaging synchronization signal (timing signal) used for the imaging unit (not shown) included in the imaging terminal 100 to capture an image or used to transmit the captured image data of the image captured by the imaging unit (not shown) to the display terminal 200. That is, the display terminal 200 assists the adjustment of the phase and the period (at least the phase) of the imaging synchronization signal generated by the imaging terminal 100 included together in the image transfer system 1 so that the phase and the period (at least the phase) between the imaging synchronization signal and the display synchronization signal with the display terminal 200 do not deviate and the phase and the period match the phase and the period (at least the phase) of the display synchronization signal generated by the display terminal 200.

Some or all of the functions of the constituent elements (for example, the function of the round-trip time measurement assisting unit 202 and further the function of the display image processing unit (not shown) performing a process of generating an image in accordance with the captured image data transmitted from the imaging terminal 100 and causing the display unit (not shown) to display the image) assisting the adjustment of the phase and the period (at least the phase) of the imaging synchronization signal by the imaging terminal 100 included in the display terminal 200 may be realized as processors. At this time, all of the above-described functions in the display terminal 200 may be realized by one processor. The functions may be realized by individual processors corresponding to the above-described functions in the display terminal 200, that is, a plurality of processors. The above-described processor can be realized by, for example, a general-purpose CPU and a program recorded on a memory. Some or all of the above-described functions in the display terminal 200 may also be realized by a dedicated integrated circuit such as an LSI (a so-called ASIC).

In this configuration, in the image transfer system 1, the imaging terminal 100 adjusts the phase and the period (at least the phase) of the imaging synchronization signal generated based on the imaging standard clock signal generated by the source oscillation clock generation unit 103 included in the imaging terminal 100 based on the round-trip time measurement outward signal transmitted to the display terminal 200 by the imaging terminal 100 and the round-trip time measurement return signal transmitted from the display terminal 200. That is, in the image transfer system 1, a timing at which the imaging terminal 100 wireless delivers the captured image data of the image captured by the imaging unit (not shown) to the display terminal 200 matches a timing at which the display terminal 200 causes the display unit (not shown) to display the image in accordance with the captured image data. Thus, in the image transfer system 1, the display terminal 200 can cause the display unit (not shown) to display the image stably in accordance with the captured image data wirelessly delivered from the imaging terminal 100.

Figure 3:
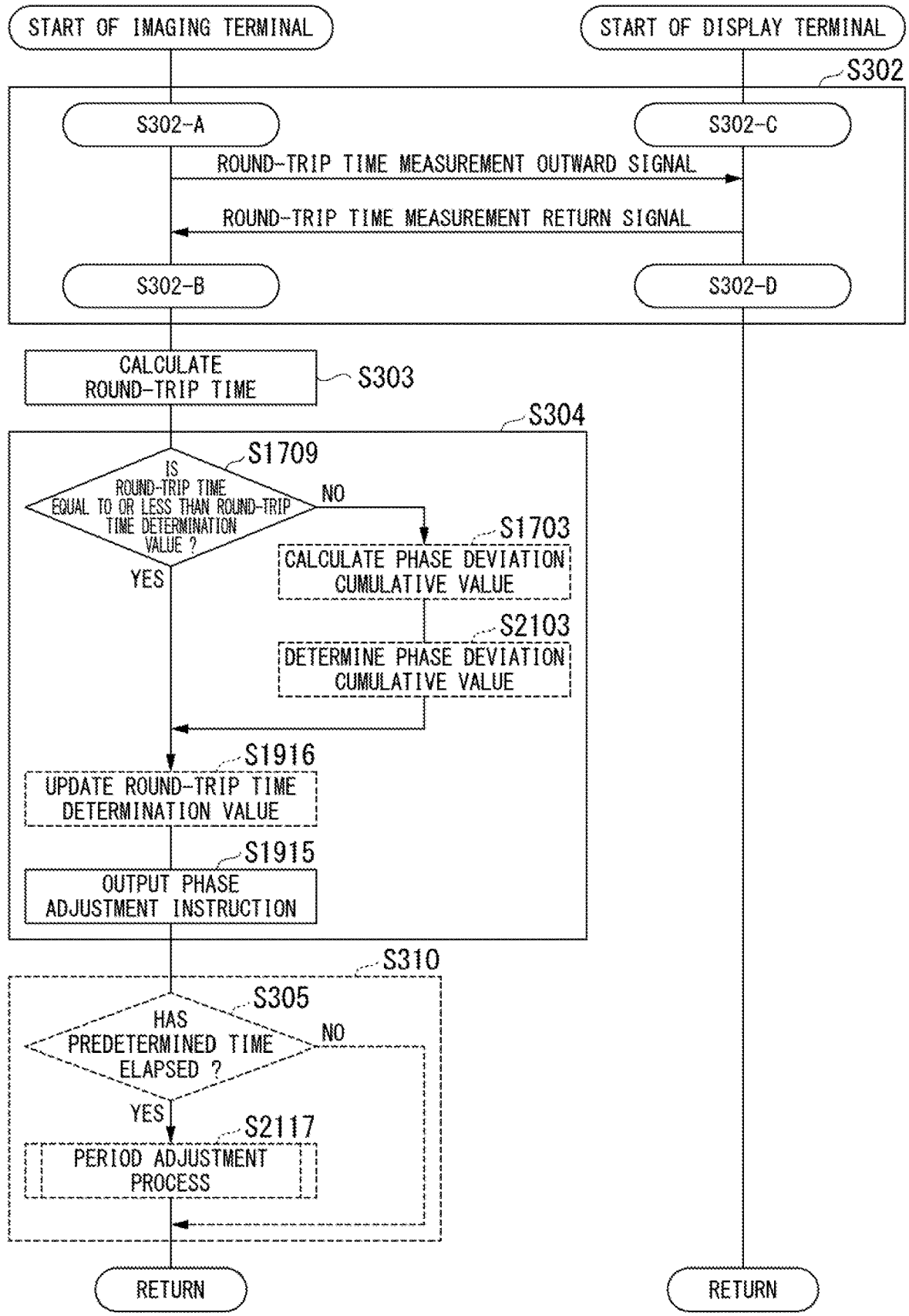
FIG. 3 is a flowchart showing a processing procedure of the image transfer system according to the first embodiment of the present invention.

Next, a more specific operation of adjusting the phase of the timing signal in the image transfer system 1 will be described. FIG. 3 is a flowchart showing a processing procedure of the image transfer system 1 according to the first embodiment of the present invention.

In the image transfer system 1, when the phase adjustment process starts, the imaging terminal 100 transmits the round-trip time measurement outward signal to the display terminal 200, and the display terminal 200 transmits the round-trip time measurement return signal in accordance with the round-trip time measurement outward signal to the imaging terminal 100 in step S302. More specifically, in the imaging terminal 100, the round-trip time measurement unit 106 transmits the round-trip time measurement outward signal to the display terminal 200 via the wireless communication unit 108 and the antenna 120 and receives the round-trip time measurement return signal transmitted from the display terminal 200 in a process of step S302-A and step S302-B in step S302. In the display terminal 200, on the other hand, when the phase adjustment process starts, the round-trip time measurement assisting unit 202 receives the round-trip time measurement outward signal transmitted from the imaging terminal 100 via the antenna 220 and the wireless communication unit 201 and transmits the round-trip time measurement return signal in accordance with the received round-trip time measurement outward signal to the imaging terminal 100 in a process of step S302-C and step S302-D in step S302.

Thereafter, in the image transfer system 1, in step S303, the imaging terminal 100 calculates a round-trip time necessary for transmission and reception in the wireless transfer between the imaging terminal 100 and the display terminal 200. More specifically, the round-trip time measurement unit 106 calculates the round-trip time necessary for transmission and reception in the wireless transfer between the imaging terminal 100 and the display terminal 200 based on the information regarding the transmitted round-trip time measurement outward signal and the information included in the round-trip time measurement return signal transmitted from the display terminal 200.

Thereafter, in the image transfer system 1, in step S304, the imaging terminal 100 adjusts the phase of the imaging synchronization signal based on the round-trip time necessary for transmission and reception in the wireless transfer between the imaging terminal 100 and the display terminal 200 which is calculated in step S303. More specifically, in step S304, the phase adjustment determination unit 110 determines whether the round-trip time calculated by the round-trip time measurement unit 106 is equal to or less than a pre-decided round-trip time determination value (step S1709).

When the calculated round-trip time is equal to or less than the pre-decided round-trip time determination value as a result of the determination of step S1709 ("YES" in step S1709), the phase adjustment determination unit 110 determines that the phase is adjusted. Then, the phase adjustment determination unit 110 outputs a phase adjustment determination result indicating the determined result and information regarding the round-trip time to the phase adjustment unit 109. Thus, the phase adjustment unit 109 outputs the phase adjustment instruction to adjust the phase of the imaging synchronization signal to the synchronization signal generation unit 102 based on the phase adjustment determination result and the information regarding the round-trip time output from the phase adjustment determination unit 110 (step S1915). Thus, the synchronization signal generation unit 102 adjusts the phase of the generated imaging synchronization signal in accordance with the phase adjustment instruction output from the phase adjustment unit 109.

Conversely, when the calculated round-trip time is not equal to or less than the pre-decided round-trip time determination value as a result of the determination of step S1709, that is, the calculated round-trip time is greater than the pre-decided round-trip time determination value ("NO" in step S1709), the phase adjustment determination unit 110 determines that the phase is not adjusted and ends the process of step S304. When the calculated round-trip time is not equal to or less than the pre-decided round-trip time determination value as the result of the determination of step S1709 ("NO" in step S1709), the phase adjustment determination unit 110 may end the process of step S304 without performing the process of step S1915. That is, when the phase adjustment determination unit 110 determines that the phase is not adjusted, the phase adjustment instruction may not be output to the phase adjustment unit 109.

In this way, in the image transfer system 1, the imaging terminal 100 adjusts the phases of the imaging synchronization signal and the display synchronization signal so that the phases do not deviate over time.

In the configuration of the image transfer system 1 shown in FIG. 2, the imaging terminal 100 has a configuration in which the phase deviation cumulative value estimation unit 111 and the period adjustment unit 101 are included. Therefore, the flowchart of the processing procedure of the image transfer system 1 shown in FIG. 3 shows a case in which the phase deviation cumulative value estimation unit 111 performs a process of updating the round-trip time determination value used by the phase adjustment determination unit 110 in step S1709 when it is determined in step S304 that the round-trip time calculated in step S303 is not equal to or less than the pre-decided round-trip time determination value ("NO" in step S1709).

More specifically, the phase deviation cumulative value estimation unit 111 cumulates the phase non-adjustment time in which the phase adjustment determination result indicating that the phase of the imaging synchronization signal is not adjusted is output from the phase adjustment determination unit 110 in step S1709 and calculates the phase deviation cumulative value (step S1703). Then, the phase deviation cumulative value estimation unit 111 determines the calculated phase deviation cumulative value based on the pre-decided round-trip time determination value (step S2103). Thereafter, when the phase deviation cumulative value exceeds a predetermined ratio of the pre-decided round-trip time determination value, the phase deviation cumulative value estimation unit 111 updates the round-trip time determination value to a shorter time (smaller value) (step S1916).

The process of updating the round-trip time determination value in step S1916 may be performed even when the phase adjustment determination unit 110 determines in step S1709 that the round-trip time calculated by the round-trip time measurement unit 106 is equal to or less than the pre-decided round-trip time determination value ("YES" in step S1709). That is, the phase adjustment determination unit 110 may determine a round-trip time with a small value determined to be equal to or less than the pre-decided round-trip time determination value as the round-trip time determination value at the time of subsequent determination of the round-trip time calculated by the round-trip time measurement unit 106.

In the flowchart of the processing procedure of the image transfer system 1 shown in FIG. 3, in step S310, the imaging terminal 100 adjusts the period of the imaging synchronization signal based on the round-trip time necessary for transmission and reception in the wireless transfer between the imaging terminal 100 and the display terminal 200 which is calculated in step S303. More specifically, the period adjustment unit 101 determines whether a pre-decided predetermined time has elapsed after the previous adjustment of the period of the imaging synchronization signal (step S305). When the period adjustment unit 101 determines that the pre-decided predetermined time has elapsed after the previous adjustment of the period of the imaging synchronization signal ("YES" in step S305), the period adjustment unit 101 determines to adjust the period and instructs the synchronization signal generation unit 102 to perform the period adjustment process for the imaging synchronization signal. Thus, the synchronization signal generation unit 102 performs the period adjustment process for the generated imaging synchronization signal (step S2117).

As described above, in the image transfer system 1, the imaging terminal 100 may have a configuration in which at least the phase of the timing signal (the imaging synchronization signal) is adjusted. The imaging terminal 100 may have a configuration in which one or both of the phase deviation cumulative value estimation unit 111 and the period adjustment unit 101 is not included. In this case, in the image transfer system 1, a processing procedure in which a process corresponding to a constituent element not included in the imaging terminal 100 is not performed is realized in the flowchart of the processing procedure of the image transfer system 1 shown in FIG. 3.

Figure 4:
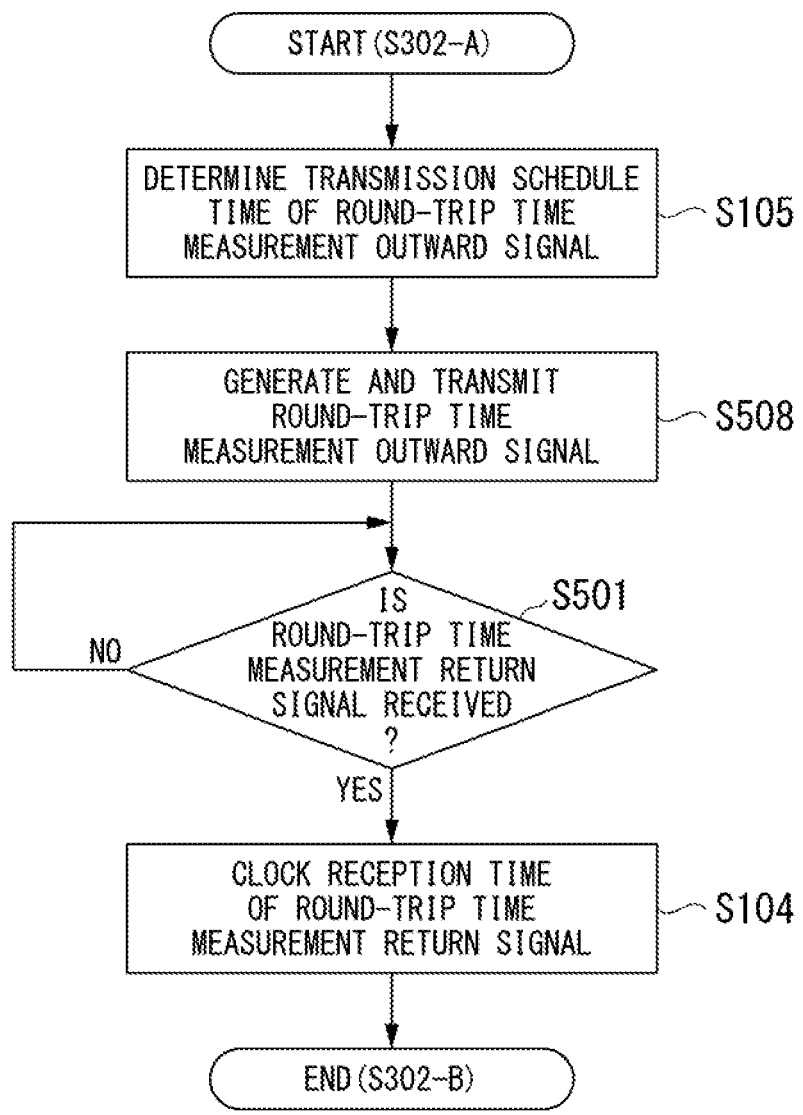
FIG. 4 is a flowchart showing a processing procedure of transmission and reception of a round-trip time measurement outward signal and a round-trip time measurement return signal by an imaging terminal included in the image transfer system according to the first embodiment of the present invention.
Figure 5:
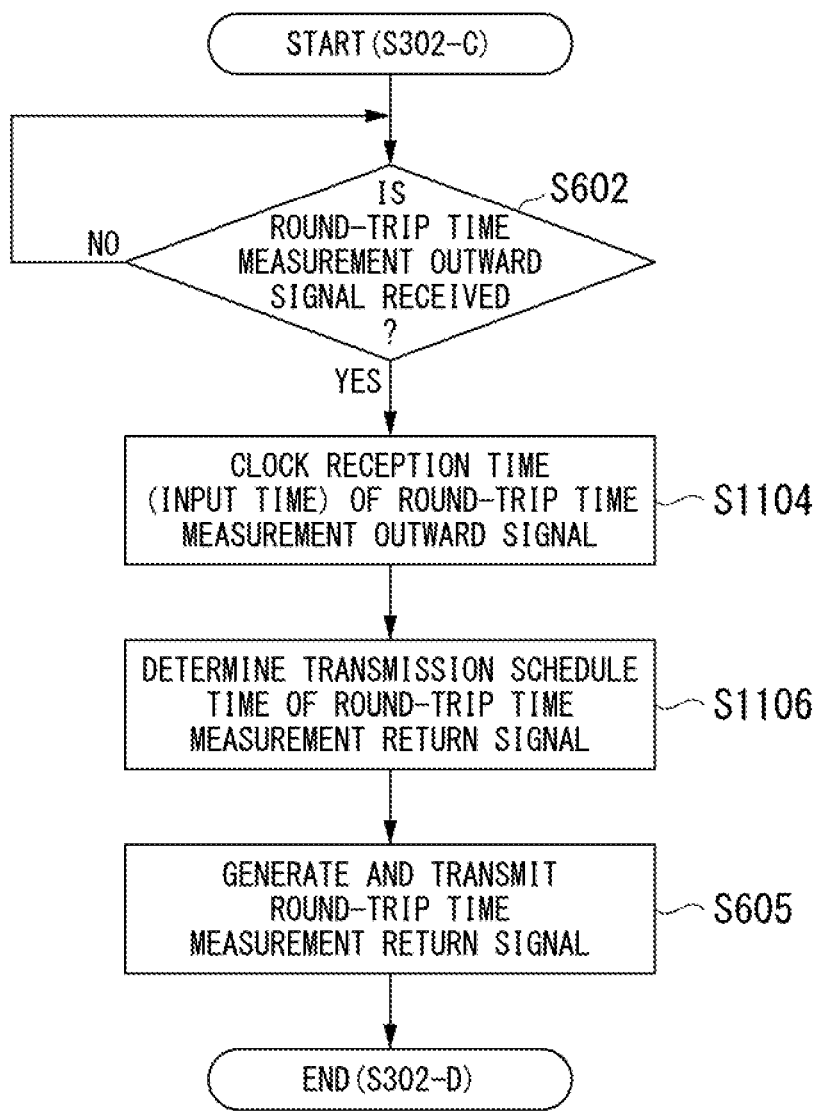
FIG. 5 is a flowchart showing a processing procedure of transmission and reception of a round-trip time measurement outward signal and a round-trip time measurement return signal by a display terminal included in the image transfer system according to the first embodiment of the present invention.

Hereinafter, each process in the image transfer system 1 will be described in more detail. First, the process of transmitting and receiving the round-trip time measurement outward signal and the round-trip time measurement return signal (step S302) in the image transfer system 1 will be described in more detail. FIG. 4 is a flowchart showing a processing procedure of transmission and reception of a round-trip time measurement outward signal and a round-trip time measurement return signal by the imaging terminal 100 included in the image transfer system 1 according to the first embodiment of the present invention. FIG. 5 is a flowchart showing a processing procedure of transmission and reception of the round-trip time measurement outward signal and the round-trip time measurement return signal by the display terminal 200 included in the image transfer system 1 according to the first embodiment of the present invention.

First, a processing procedure of transmission and reception of the round-trip time measurement outward signal and the round-trip time measurement return signal by the imaging terminal 100 will be described with reference to FIG. 4. When the phase adjustment process in the imaging terminal 100 starts, the round-trip time measurement unit 106 determines a transmission schedule time at which the round-trip time measurement outward signal is scheduled to be transmitted to the display terminal 200 (step S105). Then, the round-trip time measurement unit 106 generates the round-trip time measurement outward signal before the determined transmission schedule time and outputs the generated round-trip time measurement outward signal to the wireless communication unit 108 to transmit the round-trip time measurement outward signal to the display terminal 200 (step S508).

Thereafter, the round-trip time measurement unit 106 confirms whether the wireless communication unit 108 receives the round-trip time measurement return signal transmitted from the display terminal 200 in accordance with the transmitted round-trip time measurement outward signal (step S501). The round-trip time measurement unit 106 can confirm whether the wireless communication unit 108 receives the round-trip time measurement return signal transmitted from the display terminal 200 in step S501 by determining whether the round-trip time measurement return signal transmitted from the display terminal 200 is output from the wireless communication unit 108.

When the wireless communication unit 108 does not receive the round-trip time measurement return signal transmitted from the display terminal 200 in a confirmation result of step S501 ("NO" in step S501), the round-trip time measurement unit 106 repeats step S501 to wait for transmission of the round-trip time measurement return signal from the display terminal 200. Conversely, when the wireless communication unit 108 receives the round-trip time measurement return signal transmitted from the display terminal 200 in a confirmation result of step S501 ("YES" in step S501), the round-trip time measurement unit 106 clocks a reception time of the round-trip time measurement return signal based on the round-trip time measurement return signal output from the wireless communication unit 108 (step S104).

Next, a processing procedure of transmission and reception of the round-trip time measurement outward signal and the round-trip time measurement return signal by the display terminal 200 will be described with reference to FIG. 5. When the phase adjustment process in the display terminal 200 starts, the round-trip time measurement assisting unit 202 confirms whether the wireless communication unit 201 receives the round-trip time measurement outward signal transmitted from the imaging terminal 100 (step S602). The round-trip time measurement assisting unit 202 confirms in step S602 whether the wireless communication unit 201 receives the round-trip time measurement outward signal transmitted from the imaging terminal 100 by determining whether the round-trip time measurement outward signal transmitted from the imaging terminal 100 is output from the wireless communication unit 201.

When the wireless communication unit 201 does not receive the round-trip time measurement outward signal transmitted from the imaging terminal 100 in a confirmation result of step S602 ("NO" in step S602), the round-trip time measurement assisting unit 202 repeats step S602 to wait for transmission of the round-trip time measurement outward signal from the imaging terminal 100. Conversely, when the wireless communication unit 201 receives the round-trip time measurement outward signal transmitted from the imaging terminal 100 in a confirmation result of step S602 ("YES" in step S602), the round-trip time measurement assisting unit 202 clocks an input time which is a reception time of the round-trip time measurement outward signal based on the round-trip time measurement outward signal output from the wireless communication unit 201 (step S1104).

Thereafter, the round-trip time measurement assisting unit 202 determines the transmission schedule time at which the round-trip time measurement return signal in accordance with the round-trip time measurement outward signal transmitted from the imaging terminal 100 is scheduled to be transmitted to the imaging terminal 100 (step S1106). Then, the round-trip time measurement assisting unit 202 generates the round-trip time measurement return signal before the determined transmission schedule time and outputs the generated round-trip time measurement return signal to the wireless communication unit 201 to transmit the round-trip time measurement return signal to the imaging terminal 100 (step S605).

In this way, in the image transfer system 1, the round-trip time measurement unit 106 in the imaging terminal 100 transmits the round-trip time measurement outward signal to the display terminal 200 and clocks the reception time of the round-trip time measurement return signal transmitted from the display terminal 200 in accordance with the transmitted round-trip time measurement outward signal. In the image transfer system 1, the round-trip time measurement assisting unit 202 in the display terminal 200 clocks an input time of the round-trip time measurement outward signal transmitted from the imaging terminal 100 and transmits the round-trip time measurement return signal in accordance with the round-trip time measurement outward signal to the imaging terminal 100. That is, in the image transfer system 1, the display terminal 200 transmits the round-trip time measurement return signal in accordance with the round-trip time measurement outward signal transmitted from the imaging terminal 100.

In the image transfer system 1, the captured image data is wirelessly delivered from the imaging terminal 100 to the display terminal 200. Therefore, the round-trip time measurement outward signal and the round-trip time measurement return signal are transmitted and received between the round-trip time measurement unit 106 and the round-trip time measurement assisting unit 202 during a period in which the captured image data is not wirelessly delivered. That is, in the image transfer system 1, the round-trip time measurement unit 106 and the round-trip time measurement assisting unit 202 each transmit and receive the round-trip time measurement outward signal and the round-trip time measurement return signal at timings at which the wireless transfer of the captured image data from the imaging terminal 100 to the display terminal 200 is not hindered. Here, examples of the timings at which the round-trip time measurement outward signal and the round-trip time measurement return signal are transmitted and received between the round-trip time measurement unit 106 and the round-trip time measurement assisting unit 202 will be described.

Figure 6B:
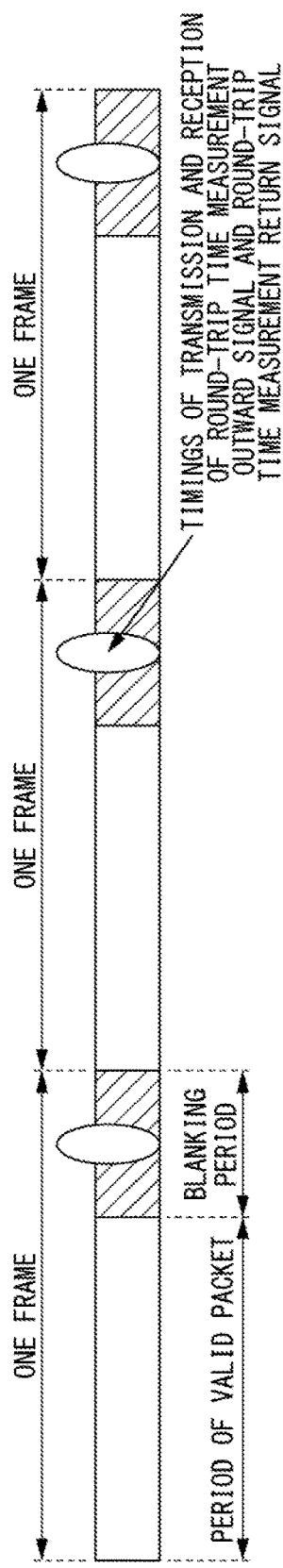
Figure 6C:
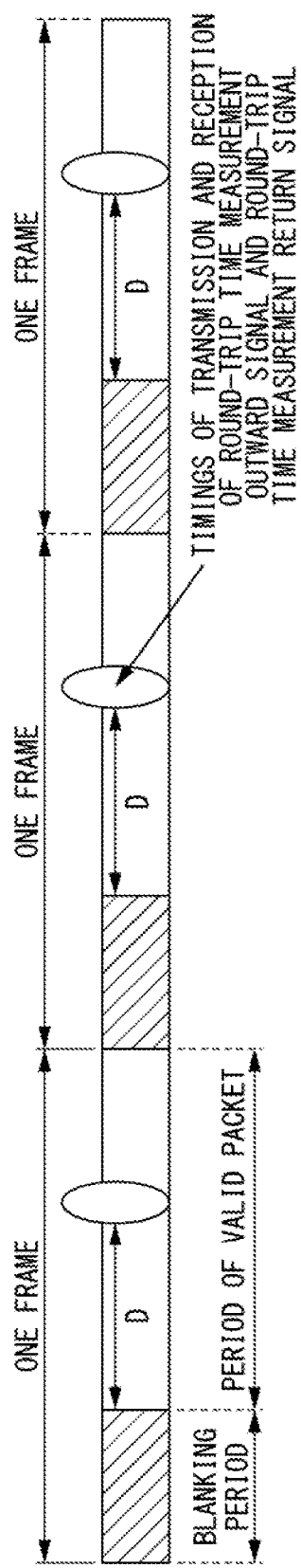

FIGS. 6A to 6C are diagrams showing examples of timings at which a round-trip time measurement outward signal and a round-trip time measurement return signal are transmitted and received in the image transfer system 1 according to the first embodiment of the present invention. FIGS. 6A to 6C show examples of cases of transmission and reception of the round-trip time measurement outward signal and the round-trip time measurement return signal between the round-trip time measurement unit 106 and the round-trip time measurement assisting unit 202 at predetermined timings in each frame of an image in which the captured image data is wirelessly delivered from the imaging terminal 100 to the display terminal 200. The round-trip time measurement unit 106 and the round-trip time measurement assisting unit 202 transmit and receive the round-trip time measurement outward signal and the round-trip time measurement return signal for a period in which a packet of the captured image data for a valid period (hereinafter referred to as a "valid packet") in an image of one frame is not wirelessly delivered.

An example shown in FIG. 6A shows a case of transmission and reception of the round-trip time measurement outward signal and the round-trip time measurement return signal during a period until a valid packet is wirelessly delivered using a timing of the imaging synchronization signal indicating start of the valid period of the image as a trigger in each frame wirelessly delivered from the imaging terminal 100 to the display terminal 200. More specifically, in the example shown in FIG. 6A, during a period until a period of the valid packet starts (herein referred to as a "blanking period") in the wireless transfer of the captured image data of each frame, the round-trip time measurement unit 106 transmits the round-trip time measurement outward signal to the round-trip time measurement assisting unit 202, and the round-trip time measurement assisting unit 202 transmits (returns) the round-trip time measurement return signal in accordance with the round-trip time measurement outward signal to the round-trip time measurement unit 106.

In the example shown in FIG. 6A, timings at which the round-trip time measurement unit 106 and the round-trip time measurement assisting unit 202 transmit and receive the round-trip time measurement outward signal and the round-trip time measurement return signal may be timings at which a header packet including information regarding the size or the like of an image indicated by the captured image data conceived to be delivered during the blanking period is wirelessly delivered.

An example shown in FIG. 6B shows a case of transmission and reception of the round-trip time measurement outward signal and the round-trip time measurement return signal during a period until wireless transfer of a subsequent frame starts using a timing of the imaging synchronization signal indicating end of the valid period of the image as a trigger in each frame wirelessly delivered from the imaging terminal 100 to the display terminal 200. More specifically, in the example shown in FIG. 6B, in the wireless transfer of the captured image data of each frame, the round-trip time measurement unit 106 transmits the round-trip time measurement outward signal to the round-trip time measurement assisting unit 202, and the round-trip time measurement assisting unit 202 transmits (returns) the round-trip time measurement return signal to the round-trip time measurement unit 106 for a period until a period of the valid packet starts (herein referred to as a "blanking period") in the wireless transfer of a subsequent frame after the end of the period of the valid packet.

In the example shown in FIG. 6B, timings at which the round-trip time measurement unit 106 and the round-trip time measurement assisting unit 202 transmit and receive the round-trip time measurement outward signal and the round-trip time measurement return signal may be timings at which a header packet of the captured image data transmitted during the blanking period is wirelessly delivered.

An example shown in FIG. 6C shows a case of transmission and reception of the round-trip time measurement outward signal and the round-trip time measurement return signal during a period in which a valid packet is wirelessly delivered using a timing of the imaging synchronization signal indicating a pre-decided one time point from the timing of the imaging synchronization signal indicating the start of the valid period of the image as a trigger in each frame wirelessly delivered from the imaging terminal 100 to the display terminal 200. More specifically, in the example shown in FIG. 6C, at timings of the imaging synchronization signal indicating that a pre-decided delay period D elapses after start of the period of the valid packet in the wireless transfer of the captured image data of each frame, the round-trip time measurement unit 106 transmits the round-trip time measurement outward signal to the round-trip time measurement assisting unit 202, and the round-trip time measurement assisting unit 202 transmits (returns) the round-trip time measurement return signal to the round-trip time measurement unit 106.

In the example shown in FIG. 6C, there is no change either in transmission and reception of the round-trip time measurement outward signal and the round-trip time measurement return signal between the round-trip time measurement unit 106 and the round-trip time measurement assisting unit 202 so that the wireless transfer of the valid captured image data in the image of one frame is not hindered. Accordingly, in the example shown in FIG. 6C, the round-trip time measurement unit 106 and the round-trip time measurement assisting unit 202 also transmit and receive the round-trip time measurement outward signal and the round-trip time measurement return signal for a period of any two valid packets in which the captured image data is partitioned into a plurality of pieces and wirelessly delivered for a period of valid packets. Therefore, in the example shown in FIG. 6C, the imaging synchronization signal indicating the pre-decided one time point is an imaging synchronization signal indicating one time point between any two valid packets after the period of the valid packets starts and the delay period D elapses. The imaging synchronization signal indicating the pre-decided one time point is a synchronization packet indicating one time point between any two valid packets after the period of the valid packets starts and the delay period D passes.

The timings at which the round-trip time measurement unit 106 and the round-trip time measurement assisting unit 202 transmit and receive the round-trip time measurement outward signal and the round-trip time measurement return signal are not limited to the timings shown in FIGS. 6A to 6C. That is, the round-trip time measurement unit 106 and the round-trip time measurement assisting unit 202 may transmit and receive the round-trip time measurement outward signal and the round-trip time measurement return signal at any timing at which the wireless transfer of the valid captured image data in the image of one frame is not hindered.

Figure 7:
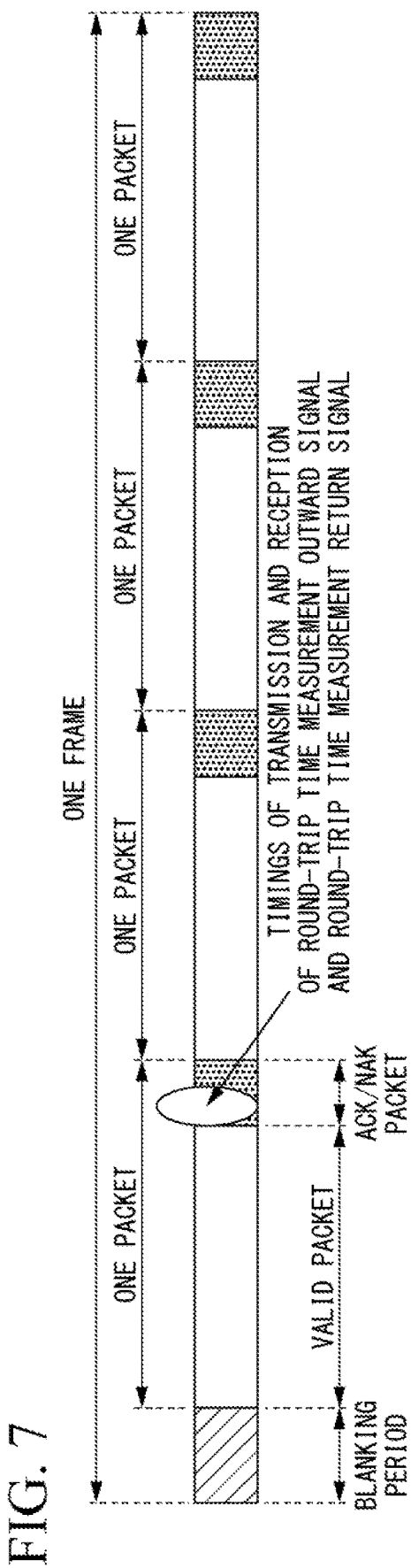
FIG. 7 is a diagram showing an example of another timing at which a round-trip time measurement outward signal and a round-trip time measurement return signal are transmitted and received in the image transfer system according to the first embodiment of the present invention.

Here, an example of another timing at which the round-trip time measurement outward signal and the round-trip time measurement return signal are transmitted and received between the round-trip time measurement unit 106 and the round-trip time measurement assisting unit 202 will be described. FIG. 7 is a diagram showing an example of another timing at which a round-trip time measurement outward signal and a round-trip time measurement return signal are transmitted and received in the image transfer system 1 according to the first embodiment of the present invention. FIG. 7 shows an example of a case of transmission and reception of the round-trip time measurement outward signal and the round-trip time measurement return signal, included in packets of an acknowledge (ACK) signal or a negative acknowledge (NAK) signal indicating a wireless transfer state of a valid packet when captured image data of an image of one frame is partitioned into a plurality of pieces and wirelessly delivered from the imaging terminal 100 to the display terminal 200. The round-trip time measurement unit 106 and the round-trip time measurement assisting unit 202 transmit and receive the round-trip time measurement outward signal and the round-trip time measurement return signal using a packet of the acknowledge (ACK) signal or the negative acknowledge (NAK) signal (hereinafter referred to as an "ACK/NAK packet") in any valid packet.

In the example shown in FIG. 7 shows a case of transmission and reception of the round-trip time measurement outward signal and the round-trip time measurement return signal, included in an ACK/NAK packet corresponding to a first valid packet wirelessly delivered after an imaging synchronization signal indicting start of the valid period of an image among valid packets corresponding to one frame wirelessly delivered from the imaging terminal 100 to the display terminal 200. More specifically, in the example shown in FIG. 7, after a period until a period of the valid packets in the wireless transfer of the captured image data of one frame starts (herein also referred to as a "blanking period"), the round-trip time measurement unit 106 transmits the round-trip time measurement outward signal to the round-trip time measurement assisting unit 202, included in the ACK/NAK packet indicating a wirelessly delivered state of the first valid packet, and the round-trip time measurement assisting unit 202 transmits (returns) the round-trip time measurement return signal to the round-trip time measurement unit 106.

The example shown in FIG. 7 shows the case of transmission and reception of the round-trip time measurement outward signal and the round-trip time measurement return signal, included in the ACK/NAK packet corresponding to the first valid packet, but the ACK/NAK packet for transmitting and receiving the round-trip time measurement outward signal and the round-trip time measurement return signal may be an ACK/NAK packet corresponding to a valid packet enumerated in a specific order (for example, a fifth valid packet or the like) after the blanking period. The example shown in FIG. 7 shows the case of transmission and reception of the round-trip time measurement outward signal and the round-trip time measurement return signal, included in the ACK/NAK packet corresponding to the same valid packet, but an ACK/NAK packet for transmitting the round-trip time measurement outward signal and an ACK/NAK packet for transmitting the round-trip time measurement return signal may be ACK/NAK packets corresponding to specific valid packets in different orders.

In this way, in the image transfer system 1, the round-trip time measurement unit 106 and the round-trip time measurement assisting unit 202 each transmit and receive the round-trip time measurement outward signal and the round-trip time measurement return signal at timings at which the wireless transfer of the captured image data from the imaging terminal 100 to the display terminal 200 is not hindered. In the examples of the timings of transmission and reception of the round-trip time measurement outward signal and the round-trip time measurement return signal, as shown in FIGS. 6 and 7, the examples of the cases of transmission and reception of the round-trip time measurement outward signal and the round-trip time measurement return signal, included in any packet at the time of wireless transfer of the captured image data have been described. However, the present invention is not limited to the configuration in which the round-trip time measurement outward signal and the round-trip time measurement return signal are transmitted and received, included in the packets related to the wireless transfer of the captured image data. For example, the round-trip time measurement outward signal and the round-trip time measurement return signal may be transmitted and received, included in another packet wirelessly delivered between the imaging terminal 100 and the display terminal 200. For example, a dedicated packet indicating each of the round-trip time measurement outward signal and the round-trip time measurement return signal may be wirelessly delivered between the imaging terminal 100 and the display terminal 200.

Thereafter, in the image transfer system 1, each time of transmission and reception of the round-trip time measurement outward signal and the round-trip time measurement return signal is clocked. Then, in the image transfer system 1, a round-trip time necessary for transmission and reception at the time of wireless transfer between the imaging terminal 100 and the display terminal 200 is calculated based on information regarding the clocked time.

In the image transfer system 1, through the process of step S303, the imaging terminal 100 calculates the round-trip time necessary for transmission and reception at the time of wireless transfer between the imaging terminal 100 and the display terminal 200. In the process of calculating the round-trip time in step S303, the round-trip time measurement unit 106 first calculates a difference between the transmission schedule time of the round-trip time measurement outward signal determined in step S105 and the reception time of the round-trip time measurement return signal clocked in step S104. Then, the round-trip time measurement unit 106 calculates the round-trip time of the signal reciprocating only in the wireless transfer between the imaging terminal 100 and the display terminal 200 by subtracting the receiver elapsed time extracted from the received round-trip time measurement return signal from a time of the calculated difference. That is, the round-trip time measurement unit 106 calculates a time necessary for transmission of the round-trip time measurement outward signal and reception of the round-trip time measurement return signal in the process of calculating the round-trip time in step S303 as a round-trip time of the wireless transfer.

Figure 8:
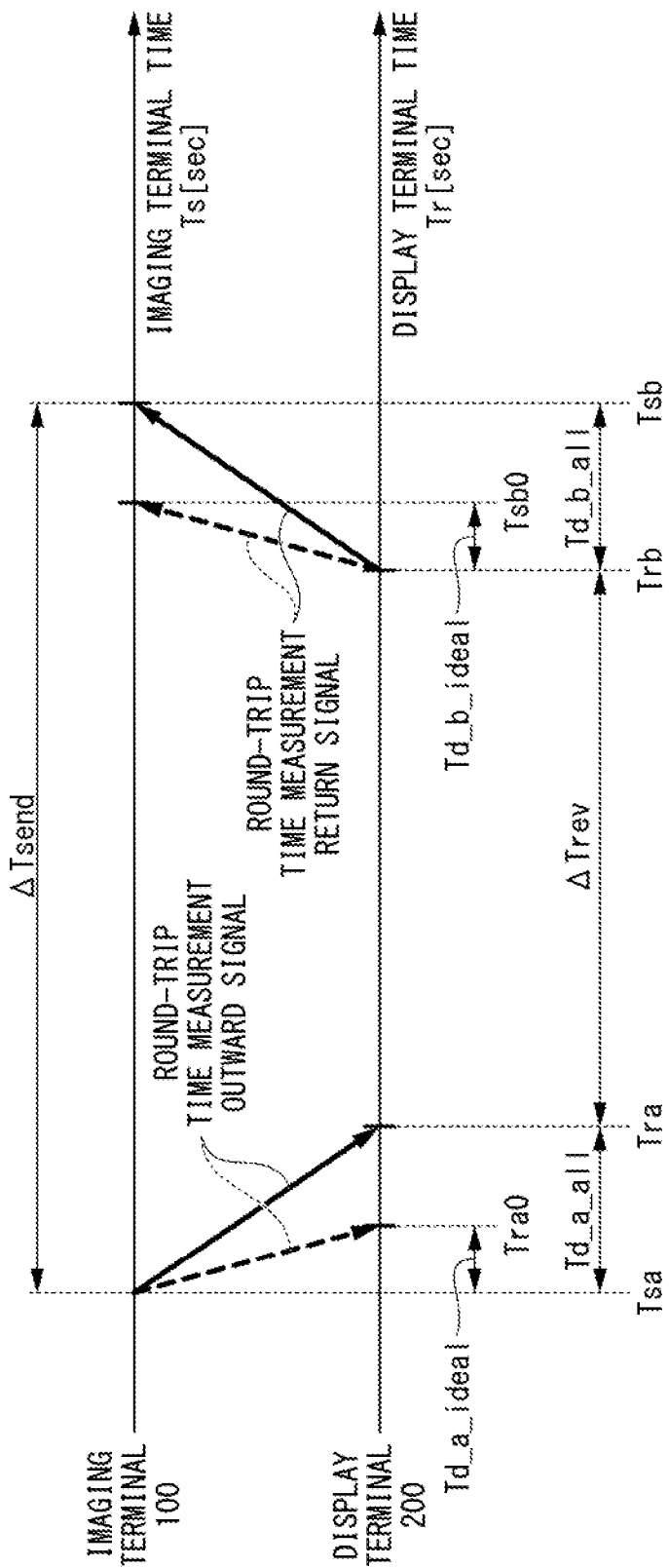
FIG. 8 is a diagram showing an example of a method of calculating a round-trip time of wireless transfer by the imaging terminal included in the image transfer system according to the first embodiment of the present invention.

Here, an example of a method of calculating the round-trip time in the round-trip time measurement unit 106 in step S303 will be described. FIG. 8 is a diagram showing an example of a method of calculating a round-trip time of wireless transfer by the imaging terminal 100 included in the image transfer system 1 according to the first embodiment of the present invention. FIG. 8 shows a temporal relation between the round-trip time measurement outward signal transmitted to the display terminal 200 by the imaging terminal 100 and the round-trip time measurement return signal transmitted to the imaging terminal 100 by the display terminal 200.

When the imaging terminal 100 transmits the round-trip time measurement outward signal to the display terminal 200 at imaging terminal time=time Tsa (transmission schedule time Tsa), the display terminal 200 can receive the round-trip time measurement outward signal at display terminal time=time Tra0 (input time Tra0) in an ideal state in which a delay time in the wireless transfer is small. However, due to delay of the wireless transfer, the round-trip time measurement outward signal transmitted by the imaging terminal 100 at transmission schedule time Tsa is received by the display terminal 200 at display terminal time=time Tra (input time Tra). On the other hand, when the display terminal 200 transmits the round-trip time measurement return signal in accordance with the round-trip time measurement outward signal to the imaging terminal 100 at display terminal time=time Trb (transmission schedule time Trb), the imaging terminal 100 can receive the round-trip time measurement return signal at imaging terminal time=time Tsb0 (reception time Tsb0) in an ideal state in which a delay time in the wireless transfer is small. However, due to delay of the wireless transfer, the round-trip time measurement return signal transmitted by the display terminal 200 at transmission schedule time Trb is received by the imaging terminal 100 at imaging terminal time=time Tsb (reception time Tsb). Then, the round-trip time measurement unit 106 calculates a round-trip time of only the wireless transfer between the imaging terminal 100 and the display terminal 200 in consideration of a wireless transfer state shown in FIG. 8.

Here, in FIG. 8, a time from transmission schedule time Tsa to input time Tra0 is referred to as transmission time Td_a_ideal and a time from transmission schedule time Trb to reception time Tsb0 is referred to as a reception time Td_b_ideal. Transmission time Td_a_ideal and reception time Td_b_ideal are stored in advance in the round-trip time measurement unit 106 as components of aerial wire passing time Td_ideal when round-trip time=0 is set. In FIG. 8, a time from transmission schedule time Tsa to input time Tra is referred to as transmission time Td_a_all and a time from transmission schedule time Trb to reception time Tsb is referred to as reception time Td_b_all. The round-trip time measurement unit 106 calculates transmission time Td_a_all and reception time Td_b_all as components of aerial wire passing time Td_all when round-trip time>0 is set.

In FIG. 8, total elapsed time ΔTsend is a time from transmission schedule time Tsa at which the round-trip time measurement outward signal is transmitted and which can be clocked by the imaging terminal 100 based on imaging terminal time Ts to reception time Tsb at which the imaging terminal 100 receives the round-trip time measurement return signal. In FIG. 8, receiver elapsed time ΔTrev is a time from input time Tra at which the round-trip time measurement outward signal is received and which can be clocked based on display terminal time Tr by the display terminal 200 to transmission schedule time Trb at which the display terminal 200 transmits the round-trip time measurement return signal, that is, the receiver elapsed time. Receiver elapsed time ΔTrev is calculated by the round-trip time measurement assisting unit 202. More specifically, the round-trip time measurement assisting unit 202 calculates receiver elapsed time ΔTrev by Expression (1) below in the wireless transfer state shown in FIG. 8.

$$\Delta Trev = Trb - Tra \quad (1)$$

The round-trip time measurement unit 106 calculates a round-trip time Td of only the wireless transfer between the imaging terminal 100 and the display terminal 200 based on Expressions (2) to (6) below established by the wireless transfer state and the foregoing definition shown in FIG. 8

$$\Delta Tsend = Tsb - Tsa \quad (2)$$

$$Td\_all = \Delta Tsend - \Delta Trev \quad (3)$$

$$Td\_all = Td\_a\_all + Td\_b\_all \quad (4)$$

$$Td\_ideal = Td\_a\_ideal + Td\_b\_ideal \quad (5)$$

$$Td = Td\_all - Td\_ideal \quad (6)$$

The round-trip time measurement unit 106 may calculate the round-trip time Td without using the aerial wire passing time Td_ideal and its components (transmission time Td_a_ideal and reception time Td_b_ideal) when round-trip time=0 is set. That is, the round-trip time measurement unit 106 may calculate round-trip time Td setting each of aerial wire passing time Td_ideal, transmission time Td_a_ideal and reception time Td_b_ideal to "0." In this case, round-trip time Td can be calculated based on Expression (3) above. That is, round-trip time Td is the same time as aerial wire passing time Td_all (Td=Td_all) when round-trip time>0.

The round-trip time measurement unit 106 outputs information regarding calculated round-trip time Td to the phase adjustment determination unit 110. Thus, in the image transfer system 1, through the process of step S304, the phase of the imaging synchronization signal generated by the synchronization signal generation unit 102 is adjusted based on a determination result of round-trip time Td calculated by the round-trip time measurement unit 106.

In the process of step S304, when the phase adjustment determination unit 110 determines in step S1709 that the round-trip time calculated by the round-trip time measurement unit 106 is equal to or less than a pre-decided round-trip time determination value ("YES" in step S1709), the phase adjustment determination unit 110 determines to adjust the phase of the imaging synchronization signal generated by the synchronization signal generation unit 102. For example, when the pre-decided round-trip time determination value is determined to be round-trip time determination value Td_th, the phase adjustment determination unit 110 compares round-trip time determination value Td_th with round-trip time Td calculated by the round-trip time measurement unit 106 in step S303. Then, when the compared round-trip time Td is equal to or less than round-trip time determination value Td_th, the phase adjustment determination unit 110 determines to adjust the phase of the imaging synchronization signal generated by the synchronization signal generation unit 102. In this case, the phase adjustment determination unit 110 may update round-trip time Td equal to or less than round-trip time determination value Td_th, that is, round-trip time Td which is a shorter time (small value) than round-trip time determination value Td_th, as new round-trip time determination value Td_th in step S1916.

The new round-trip time determination value Td_th updated in step S1916 may be, for example, an average value of the current round-trip time Td used for the determination and the current round-trip time determination value Td_th. The new round-trip time determination value Td_th updated in step S1916 may be, for example, a statistically calculated value such as a mode of the plurality of round-trip times Td used for the previous determination and the current round-trip time Td used for the determination. The new round-trip time determination value Td_th updated in step S1916 may be a pre-decided fixed value rather than a value obtained using round-trip time Td.

The phase adjustment determination unit 110 outputs a phase adjustment determination result indicating that the phase of the imaging synchronization signal is adjusted and determined in step S1709 and round-trip time Td to the phase adjustment unit 109.

In step S1915, the phase adjustment unit 109 outputs a phase adjustment instruction to adjust the phase of the imaging synchronization signal to the synchronization signal generation unit 102. More specifically, the phase adjustment unit 109 outputs the phase adjustment instruction to re-generate the imaging synchronization signal to the synchronization signal generation unit 102 for re-generating the imaging synchronization signal after waiting by round-trip time Td calculated by the round-trip time measurement unit 106 in step S303. Thus, the synchronization signal generation unit 102 adjusts the phase of the generated imaging synchronization signal in accordance with the phase adjustment instruction output from the phase adjustment unit 109.

In the image transfer system 1, the phase adjustment determination unit 110 included in the imaging terminal 100 includes the phase deviation cumulative value estimation unit 111 in addition to the phase adjustment unit 109. When the phase adjustment determination unit 110 determines in step S1709 that the phase of the imaging synchronization signal is not adjusted ("NO" in step S1709), the phase deviation cumulative value estimation unit 111 estimates a deviation amount between the phases of the imaging synchronization signal and the display synchronization signal by calculating a phase deviation cumulative value. Based on a result obtained by estimating the deviation amount between the phases of the imaging synchronization signal and the display synchronization signal, the phase deviation cumulative value estimation unit 111 updates the pre-decided round-trip time determination value used when the phase adjustment determination unit 110 determines whether the phase of the imaging synchronization signal is adjusted. Here, the processes in which the phase deviation cumulative value estimation unit 111 estimates the deviation amount between the phases of the imaging synchronization signal and the display synchronization signal and updates the round-trip time determination value (steps S1703 to S1916) will be described in more detail.

Figure 9:
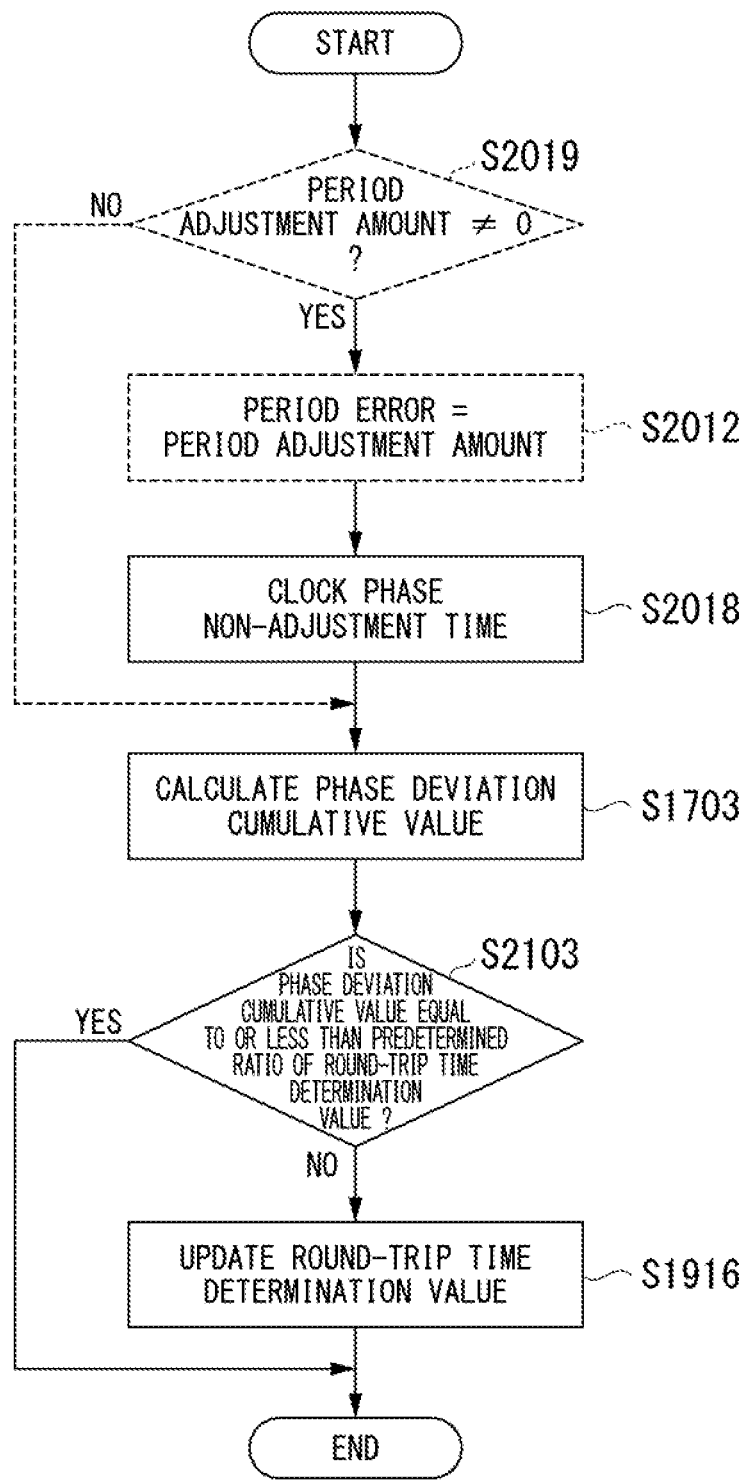
FIG. 9 is a flowchart showing a processing procedure of an updating process for a determination value of a round-trip time by the imaging terminal included in the image transfer system according to the first embodiment of the present invention.

FIG. 9 is a flowchart showing a processing procedure of an updating process for a determination value of a round-trip time (a round-trip time determination value) by the imaging terminal 100 included in the image transfer system 1 according to the first embodiment of the present invention. In the image transfer system 1, the imaging terminal 100 includes the period adjustment unit 101. Therefore, FIG. 9 shows a processing procedure of a case of the synchronization signal generation unit 102 that has the configuration in which the period of the imaging synchronization signal generated in accordance with the period adjustment instruction output from the period adjustment unit 101 is adjusted.

When the phase deviation cumulative value estimation unit 111 starts the process of updating the round-trip time determination value, information regarding a period adjustment amount at the time of adjustment of the period of the imaging synchronization signal in accordance with the period adjustment instruction output from the period adjustment unit 101 is acquired from the synchronization signal generation unit 102. Then, the phase deviation cumulative value estimation unit 111 determines whether the acquired period adjustment amount is a value other than "0" (period adjustment amount≠0) (step S2019). That is, in step S2019, the phase deviation cumulative value estimation unit 111 determines whether the synchronization signal generation unit 102 adjusts the period of the imaging synchronization signal.

When the period adjustment amount is not a value other than "0", that is, the period adjustment amount is "0" in a determination result of step S2019 ("NO" in step S2019), the phase deviation cumulative value estimation unit 111 moves the process to step S1703. Conversely, when the period adjustment amount is a value other than "0" in a determination result of step S2019 ("YES" in step S2019), the phase deviation cumulative value estimation unit 111 substitutes the period adjustment amount as a period error (step S2012). Here, the period error is defined as a predetermined value based on an output error in a source oscillation clock signal in the source oscillation clock generation unit 103 that generates a source oscillation clock signal. The period error is, for example, an error occurring in 100 ppm units due to temperature characteristics in accordance with precision of a clock generator even when the source oscillation clock generation unit 103 and the source oscillation clock generation unit 205 are clock generators with the same specification. Therefore, the period error may be set based on information regarding specification indicating precision of the clock generator instead of substituting the period adjustment amount.

Thereafter, the phase deviation cumulative value estimation unit 111 clocks an elapsed time in a state in which the phase of the imaging synchronization signal is not adjusted from the time of the final phase adjustment of the imaging synchronization signal, that is, a time in which a phase adjustment determination result indicating that the phase of the imaging synchronization signal is not adjusted is continuously output from the phase adjustment determination unit 110 (phase non-adjustment time) (step S2018).

Then, the phase deviation cumulative value estimation unit 111 calculates a phase deviation cumulative value based on the period error and the clocked phase non-adjustment time (step S1703). For example, when the period adjustment amount acquired from the synchronization signal generation unit 102 is referred to as period adjustment amount E and period adjustment amount E is a value other than "0" in step S2019, period adjustment amount E is substituted with period error E' in step S2012. Then, a case in which the phase deviation cumulative value estimation unit 111 clocks phase non-adjustment time T' in step S2018 is conceived. In this case, the phase deviation cumulative value estimation unit 111 calculates phase deviation cumulative value V by multiplying phase non-adjustment time T' by period error E' as in Expression (7) below.

$$V = T' \times E' \qquad (7)$$

Conversely, when period adjustment amount E is not a value other than "0," that is, period adjustment amount E=0, in a determination result of step S2019 ("NO" in step S2019), the phase deviation cumulative value estimation unit 111 considers that period adjustment amount E=period error E'=0 is set and calculates the phase deviation cumulative value V as phase deviation cumulative value V=0.

Subsequently, the phase deviation cumulative value estimation unit 111 determines whether the calculated phase deviation cumulative value is equal to or less than a predetermined ratio of the pre-decided round-trip time determination value (step S2103). When the calculated phase deviation cumulative value is equal to or less than the predetermined ratio of the pre-decided round-trip time determination value in a determination result of step S2103 ("YES" in step S2103), the phase deviation cumulative value estimation unit 111 determines that the round-trip time determination value is not updated and ends the process of updating the round-trip time determination value.

Conversely, when the calculated phase deviation cumulative value is not equal to or less than the predetermined ratio of the pre-decided round-trip time determination value, that is, the calculated phase deviation cumulative value exceeds the predetermined ratio of the pre-decided round-trip time determination value, in a determination result of step S2103 ("NO" in step S2103), the phase deviation cumulative value estimation unit 111 determines that the round-trip time determination value is updated. Then, the phase deviation cumulative value estimation unit 111 updates the round-trip time determination value to a shorter time (small value) (step S1916). For example, the phase deviation cumulative value estimation unit 111 updates round-trip time determination value Td_newth set to a shorter time (small value) by multiplying current round-trip time determination value Td_th by pre-decided constant ε (where ε is a real number of 1<ε) as new determination value Td_th as in Expression (8) below.

$$Td\_newth = Td\_th \times \varepsilon \qquad (8)$$

The new round-trip time determination value updated in step S1916 by the phase deviation cumulative value estimation unit 111 may be a value obtained in a similar point of view to a point of view when the phase adjustment determination unit 110 updates the round-trip time determination value in step S1916. That is, the phase deviation cumulative value estimation unit 111 updates an average value of current round-trip time determination value Td_th and current round-trip time Td used for the determination of step S1709 by the phase adjustment determination unit 110, a statistically calculated value such as a mode of the plurality of round-trip times Td, a pre-decided fixed value, or the like as new round-trip time determination value Td_th in step S1916.

In the image deliver system 1, the imaging terminal 100 includes the period adjustment unit 101. Thus, the period of the imaging synchronization signal is adjusted whenever the pre-decided time elapses in step S310 subsequently after the adjustment of the phase of the imaging synchronization signal. Here, an example of the process of step S310 in which the period adjustment amount is obtained when the period adjustment unit 101 adjusts the period of the imaging synchronization signal will be described.

Figure 10:
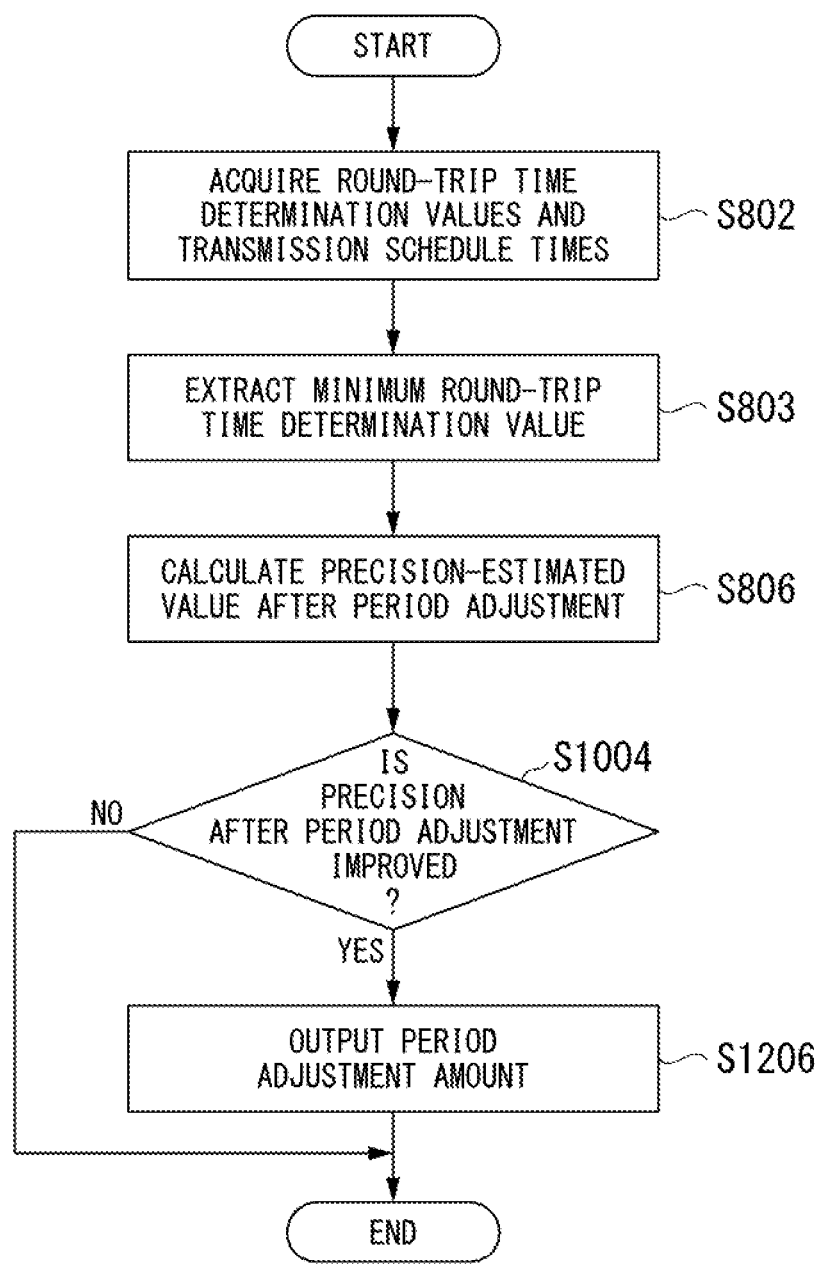
FIG. 10 is a flowchart showing an example of a processing procedure for obtaining a periodic adjustment amount of an imaging synchronization signal by the imaging terminal included in the image transfer system according to the first embodiment of the present invention.

FIG. 10 is a flowchart showing an example of a processing procedure for obtaining a periodic adjustment amount of an imaging synchronization signal by the imaging terminal 100 included in the image transfer system 1 according to the first embodiment of the present invention. When the period adjustment unit 101 determines that the pre-decided predetermined time has elapsed in step S305 of step S310 ("YES" in step S305) and accordingly determines to adjust the period of the imaging synchronization signal, the period adjustment unit 101 obtains the period adjustment amount at the time of adjustment of the period of the imaging synchronization signal in accordance with the processing procedure shown in FIG. 10 in the period adjustment process of step S2117.

When the period adjustment unit 101 starts the process of obtaining the period adjustment amount of the imaging synchronization signal, the period adjustment unit 101 acquires a combination of the plurality of round-trip time determination values used for the phase adjustment determination unit 110 to determine the round-trip time, the transmission schedule time of each corresponding round-trip time measurement outward signal transmitted to calculate each round-trip time, and the transmission schedule time of each corresponding round-trip time measurement return signal within the period in which it is determined that the phase is not adjusted after the final adjustment of the phase of the imaging synchronization signal from the round-trip time measurement unit 106 (step S802).

Subsequently, the period adjustment unit 101 extracts the minimum round-trip time determination value among the plurality of acquired round-trip time determination values (step S803). Thereafter, the period adjustment unit 101 calculates an estimated value of precision of the imaging synchronization signal (hereinafter referred to as a "precision-estimated value after the period adjustment") when the period is adjusted by waiting for generating the imaging synchronization signal by a time indicated by the minimum round-trip time determination value provisionally based on information regarding the extracted round-trip time determination value (step S806). Then, the period adjustment unit 101 determines whether the calculated precision-estimated value after the period adjustment is a value indicating improvement in the precision of the period of the imaging synchronization signal (step S1004).

When the period adjustment unit 101 determines that the precision of the period of the imaging synchronization signal is not improved in a determination result of step S1004 ("NO" in step S1004), the process of obtaining the period adjustment amount ends. That is, the period adjustment unit 101 does not adjust the period of the imaging synchronization signal based on the combination of the acquired round-trip time determination value, the transmission schedule time of the round-trip time measurement outward signal, and the transmission schedule time of the round-trip time measurement return signal. Conversely, when the period adjustment unit 101 determines that the precision of the period of the imaging synchronization signal is improved in a determination result of step S1004 ("YES" in step S1004), the period adjustment unit 101 calculates the period adjustment amount for adjusting the period of the imaging synchronization signal based on a combination of the calculated precision-estimated value after the period adjustment, the acquired round-trip time determination value, the transmission schedule time of the round-trip time measurement outward signal, and the transmission schedule time of the round-trip time measurement return signal. Then, the period adjustment unit 101 outputs the calculated period adjustment amount to the synchronization signal generation unit 102 along with the period adjustment instruction (step S1206).

Thus, in step S2117, the synchronization signal generation unit 102 performs the period adjustment process of adjusting the period of the generated imaging synchronization signal by the period adjustment amount in accordance with the period adjustment instruction output from the period adjustment unit 101.

Figure 11:
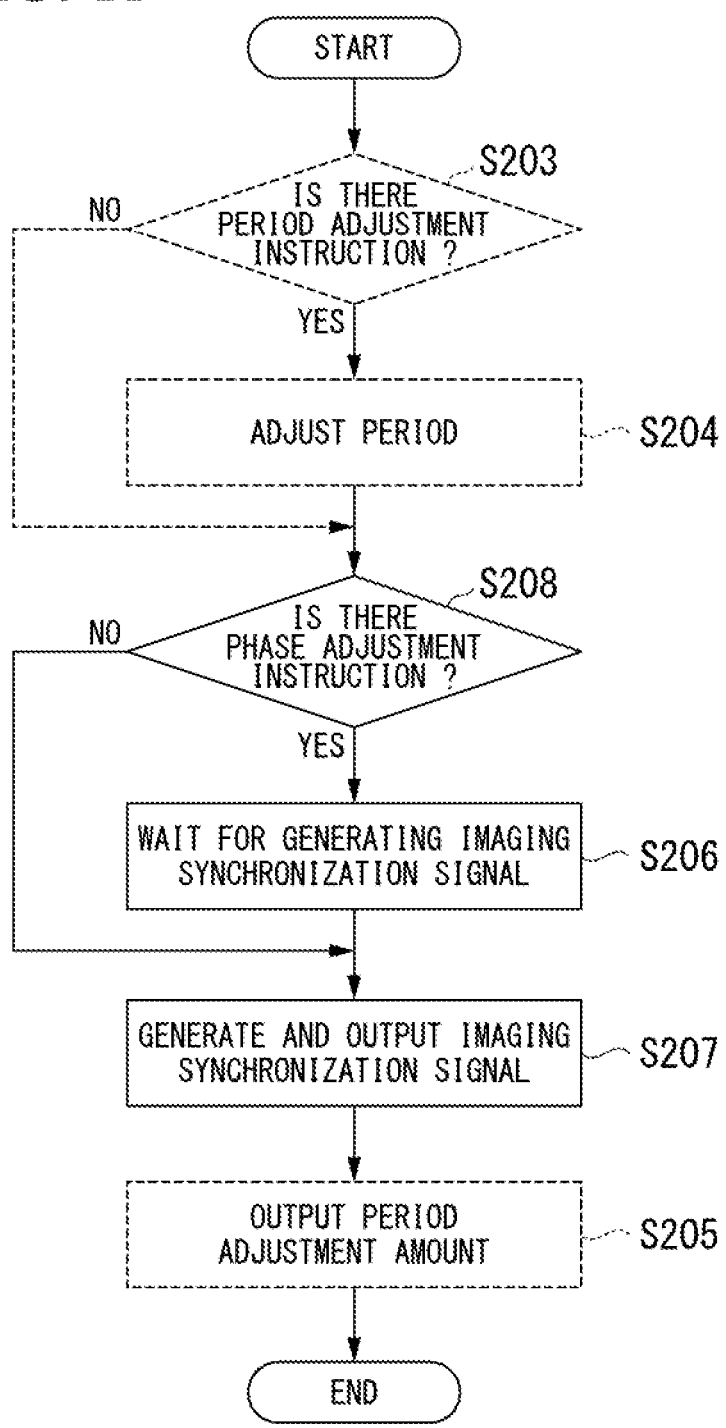
FIG. 11 is a flowchart showing a processing procedure of an adjustment process for an imaging synchronization signal by the imaging terminal included in the image transfer system according to the first embodiment of the present invention.

Here, an example of a process in which the synchronization signal generation unit 102 adjusts the phase and the period of the generated imaging synchronization signal will be described. FIG. 11 is a flowchart showing a processing procedure of an adjustment process for an imaging synchronization signal by the imaging terminal 100 included in the image transfer system 1 according to the first embodiment of the present invention.

The synchronization signal generation unit 102 starts an operation of generating the imaging synchronization signal when the imaging terminal 100 is activated and the imaging standard clock signal is input from the source oscillation clock generation unit 103. Then, the synchronization signal generation unit 102 confirms whether the period adjustment instruction is output from the period adjustment unit 101 (step S203).

When the period adjustment instruction is not output from the period adjustment unit 101 in a confirmation result of step S203 ("NO" in step S203), the synchronization signal generation unit 102 moves the process to step S208. Conversely, when the period adjustment instruction is output from the period adjustment unit 101 in a confirmation result of step S203 ("YES" in step S203), the synchronization signal generation unit 102 adjusts the period of the imaging synchronization signal in accordance with the period adjustment amount output from the period adjustment unit 101 along with the period adjustment instruction (step S204).

For example, when a period A is the period of the imaging synchronization signal before the period adjustment and period adjustment amount E is the period adjustment amount output from the period adjustment unit 101, the synchronization signal generation unit 102 calculates a period A' of the imaging synchronization signal subjected to the period adjustment by Expression (9) below and performs the period adjustment in step S204.

$$A'=A\times(1+E) \tag{9}$$

The example of the process of obtaining the period adjustment amount when the period adjustment unit 101 adjusts the period of the imaging synchronization signal in the image transfer system 1 will be described with reference to FIG. 10. Therefore, the synchronization signal generation unit 102 adjusts the period of the imaging synchronization signal in accordance with the period adjustment amount output from the period adjustment unit 101 in step S204, as described above. However, a method in which the synchronization signal generation unit 102 adjusts the period of the imaging synchronization signal is not limited to the method performed in accordance with the period adjustment amount. The period of the imaging synchronization signal may be adjusted based on a known period adjustment technology.

Subsequently, the synchronization signal generation unit 102 confirms whether the phase adjustment instruction is output from the phase adjustment unit 109 (step S208). When the phase adjustment instruction is not output from the phase adjustment unit 109 in a confirmation result of step S208 ("NO" in step S208), the synchronization signal generation unit 102 moves the process to step S207. Conversely, when the phase adjustment instruction is output from the phase adjustment unit 109 in a confirmation result of step S208 ("YES" in step S208), the synchronization signal generation unit 102 temporarily stops generating the imaging synchronization signal in accordance with the phase adjustment instruction. Then, the synchronization signal generation unit 102 waits until the time indicated by the round-trip time output from the phase adjustment unit 109 along with the phase adjustment instruction elapses (step S206). Therefore, the synchronization signal generation unit 102 moves the process to step S207.

Then, the synchronization signal generation unit 102 generates the imaging synchronization signal and outputs the generated imaging synchronization signal to each constituent element (the imaging unit (not shown) and the round-trip time measurement unit 106) included in the imaging terminal 100 (step S207).

Thereafter, when the period adjustment instruction is output from the period adjustment unit 101 ("YES" in step S203) and the period of the imaging synchronization signal is adjusted in accordance with the period adjustment amount output from the period adjustment unit 101 along with the period adjustment instruction in step S204, the synchronization signal generation unit 102 outputs information regarding the period adjustment amount of the imaging synchronization signal adjusted in the period adjustment to the round-trip time measurement unit 106 (step S205). That is, in step S205, the synchronization signal generation unit 102 outputs the information regarding the period adjustment amount output along with the period adjustment instruction from the period adjustment unit 101 to the phase deviation cumulative value estimation unit 111 in the phase adjustment determination unit 110 included in the round-trip time measurement unit 106.

In the processing procedure, the synchronization signal generation unit 102 generates and outputs the imaging synchronization signal of which the phase and the period are adjusted in accordance with the phase adjustment instruction output by the phase adjustment unit 109 and the period adjustment instruction output by the period adjustment unit 101. Thus, in the image transfer system 1, the phase and the period (at least the phase) of the imaging synchronization signal generated in the imaging terminal 100 can be adjusted so that the phase and the period of the imaging synchronization signal match the phase and the period (at least the phase) of the display synchronization signal generated by the display terminal 200.

Figure 12:
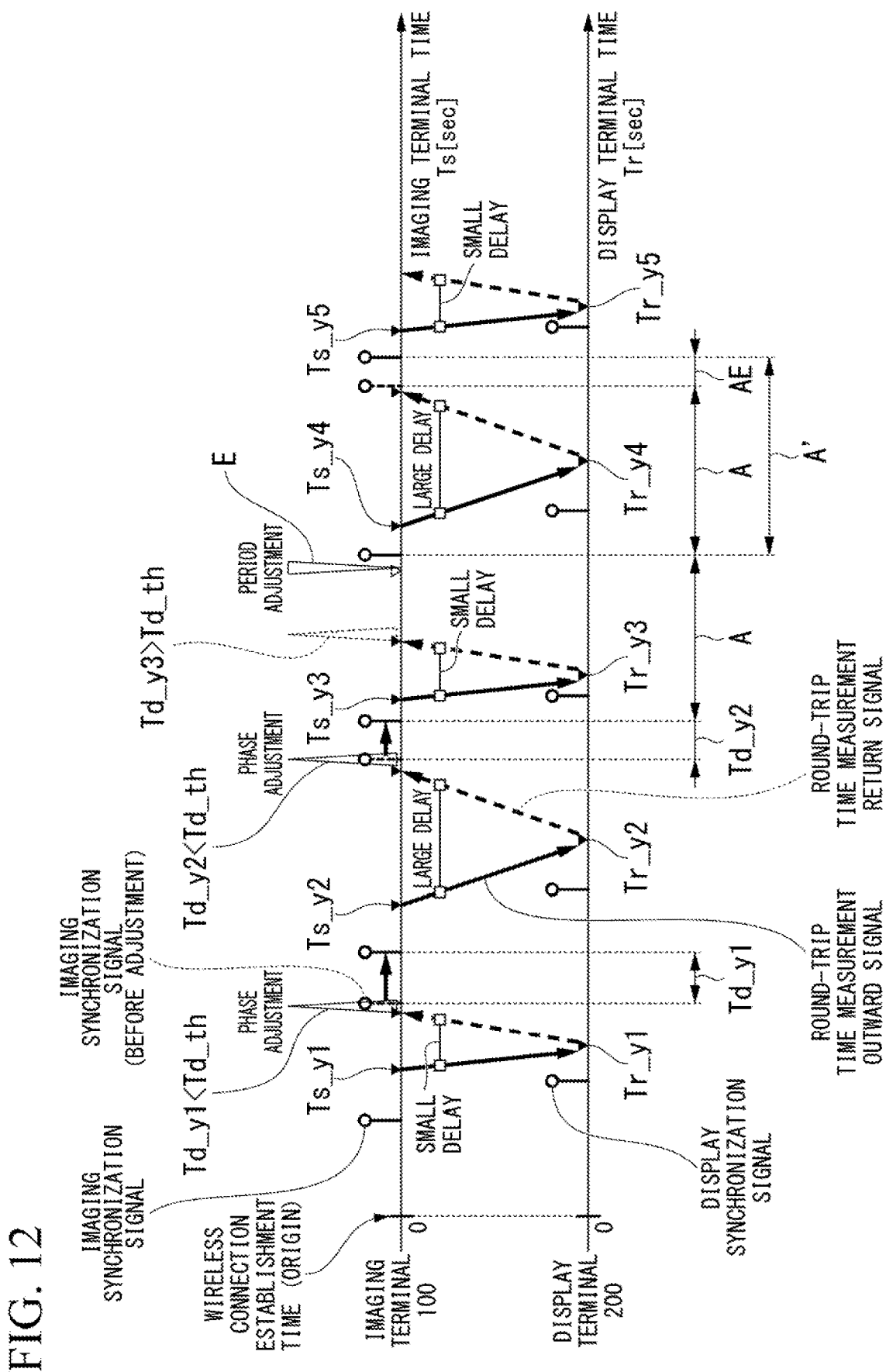
FIG. 12 is a timing chart showing an example of transmission and reception of captured image data wirelessly delivered in the image transfer system according to the first embodiment of the present invention.
Figure 13:
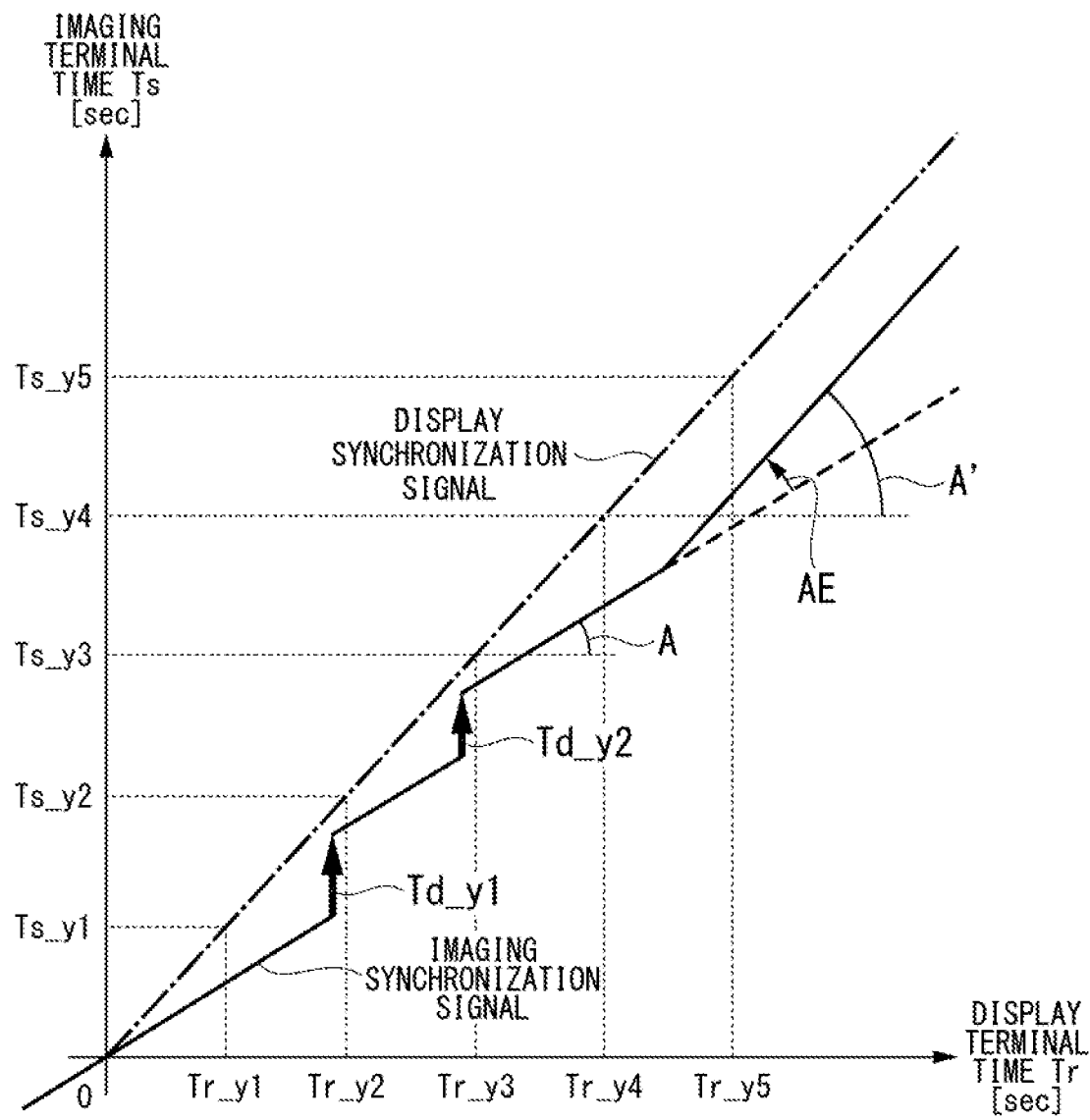
FIG. 13 is a diagram showing an example of a relation between synchronization signals and times when captured image data is wirelessly delivered in the image transfer system according to the first embodiment of the present invention.

Here, an example of a case in which the phase or the period of the imaging synchronization signal is adjusted in the image transfer system 1 will be described. FIG. 12 is a timing chart showing an example of transmission and reception of captured image data wirelessly delivered in the image transfer system 1 according to the first embodiment of the present invention. FIG. 13 is a diagram showing an example of a relation between synchronization signals (the imaging synchronization signal and the display synchronization signal) and times (the imaging terminal time and the display terminal time) when the captured image data is wirelessly delivered in the image transfer system 1 according to the first embodiment of the present invention.

FIG. 12 shows examples of timings at which the synchronization signal generation unit 102 generates the imaging synchronization signal on a time axis of the imaging terminal time in the imaging terminal 100. FIG. 12 shows examples of timings at which the synchronization signal generation unit 204 generates the display synchronization signal on a time axis of the display terminal time in the display terminal 200. FIG. 12 shows examples of timings of the round-trip time measurement outward signal and the round-trip time measurement return signal wirelessly delivered between the imaging terminal 100 and the display terminal 200. FIG. 13 shows an example of a relation between the phase and the period of the imaging synchronization signal and the phase and the period of the display synchronization signal changed over time when the imaging terminal time in the imaging terminal 100 is the X axis and the display terminal time in the display terminal 200 is the Y axis. FIGS. 12 and 13 schematically show a case in which the phase and the period of the imaging synchronization signal generated by the synchronization signal generation unit 102 are adjusted based on the round-trip time calculated in the imaging terminal 100 so that the phase and the period of the imaging synchronization signal match the phase and the period of the display synchronization signal generated by the synchronization signal generation unit 204.

In the image transfer system 1, the imaging terminal 100 starts generating the imaging synchronization signal by setting a time point at which wireless connection is established to standard imaging terminal time=0, as described above, and transmits the round-trip time measurement outward signal to the display terminal 200 at each transmission schedule time. In the image transfer system 1, the display terminal 200 starts generating the display synchronization signal by setting a time point at which wireless connection is established to standard display terminal time=0, as described above, and waits for transmitting the round-trip time measurement outward signal from the imaging terminal 100. Then, when the display terminal 200 receives the round-trip time measurement outward signal transmitted from the imaging terminal 100, the display terminal 200 transmits the round-trip time measurement return signal to the imaging terminal 100 in accordance with the received round-trip time measurement outward signal at each transmission schedule time. Thus, the imaging terminal 100 adjusts the phase and the period of the imaging synchronization signal based on the transmitted round-trip time measurement outward signal and the received round-trip time measurement return signal.

The example shown in FIG. 12 shows a state in which the imaging terminal 100 (more specifically, the round-trip time measurement unit 106) sets each time of imaging terminal times=Ts_y1 to Ts_y5 as a transmission schedule time and transmits the round-trip time measurement outward signal to the display terminal 200 at each transmission schedule time. The example shown in FIG. 12 shows a state in which the display terminal 200 (more specifically, the round-trip time measurement assisting unit 202) sets each time of display terminal times=Tr_y1 to Tr_y5 after reception of the round-trip time measurement outward signal transmitted from the imaging terminal 100 as a transmission schedule time and transmits the round-trip time measurement return signal in accordance with the round-trip time measurement outward signal received at each transmission schedule time to the imaging terminal 100. To facilitate a description, the example shows in FIG. 12 shows the receiver elapsed time from an input time at which the display terminal 200 receives the round-trip time measurement outward signal to the transmission schedule time at which the round-trip time measurement return signal is transmitted as receiver elapsed time ΔTrev=0. Each time of imaging terminal times=Ts_y1 to Ts_y5 and display terminal times=Tr_y1 to Tr_y5 shown in FIG. 13 corresponds to each time in the example shown in FIG. 12.

More specifically, in the example shown in FIG. 12, the imaging terminal 100 (the round-trip time measurement unit 106) transmits the first round-trip time measurement outward signal to the display terminal 200 at imaging terminal time=Ts_y1 and receives the first round-trip time measurement return signal transmitted at display terminal time=Tr_y1 from the display terminal 200 (the round-trip time measurement assisting unit 202). Thus, the round-trip time measurement unit 106 calculates first round-trip time Td_y1 based on the first transmitted round-trip time measurement outward signal and the first received round-trip time measurement return signal. In the example shown in FIG. 12, first round-trip time Td_y1 calculated by the round-trip time measurement unit 106 is a round-trip time less than round-trip time determination value Td_th (where Td_y1<Td_th). Therefore, the phase adjustment determination unit 110 determines to adjust the phase of the imaging synchronization signal and outputs a phase adjustment determination result indicating a result determined herein to the phase adjustment unit 109. Then, the phase adjustment unit 109 outputs a phase adjustment instruction indicating adjustment of the phase of the imaging synchronization signal to the synchronization signal generation unit 102 by waiting for the generation of the imaging synchronization signal until a time indicated by first round-trip time Td_y1 elapses in accordance with the phase adjustment determination result output from the phase adjustment determination unit 110. Thus, the synchronization signal generation unit 102 adjusts the phase of the generated imaging synchronization signal by re-generating the imaging synchronization signal after waiting for the generation of the imaging synchronization signal by first round-trip time Td_y1 instructed from the phase adjustment unit 109. As a result, the phase of the imaging synchronization signal generated by the synchronization signal generation unit 102 approaches the phase of the display synchronization signal generated by the synchronization signal generation unit 204 as in the example shown in FIG. 13.

Thereafter, the imaging terminal 100 (the round-trip time measurement unit 106) similarly repeats the adjustment of the phase of the imaging synchronization signal. In the example shown in FIG. 12, the imaging terminal 100 (the round-trip time measurement unit 106) transmits the second round-trip time measurement outward signal to the display terminal 200 at imaging terminal time=Ts_y2 and receives the second round-trip time measurement return signal transmitted from the display terminal 200 (the round-trip time measurement assisting unit 202) at display terminal time=Tr_y2. Thus, the round-trip time measurement unit 106 calculates second round-trip time Td_y2 based on the second transmitted round-trip time measurement outward signal and the second received round-trip time measurement return signal. In the example shown in FIG. 12, second round-trip time Td_y2 calculated by the round-trip time measurement unit 106 is also a round-trip time less than round-trip time determination value Td_th (where Td_y2<Td_th). Therefore, the phase adjustment determination unit 110 determines that the phase of the imaging synchronization signal is adjusted. Then, the phase adjustment unit 109 outputs a phase adjustment instruction indicating adjustment of the phase of the imaging synchronization signal to the synchronization signal generation unit 102 by waiting for generation of the imaging synchronization signal until a time indicating second round-trip time Td_y2 elapses. Thus, the synchronization signal generation unit 102 adjusts the phase of the generated imaging synchronization signal by re-generating the imaging synchronization signal after waiting for the generation of the imaging synchronization signal by a time indicating second round-trip time Td_y2 instructed from the phase adjustment unit 109. As a result, the phase of the imaging synchronization signal generated by the synchronization signal generation unit 102 approaches the phase of the display synchronization signal generated by the synchronization signal generation unit 204 as in the example shown in FIG. 13.

In the example shown in FIG. 12, the imaging terminal 100 (the round-trip time measurement unit 106) transmits the third round-trip time measurement outward signal to the display terminal 200 at imaging terminal time=Ts_y3 and receives the third round-trip time measurement return signal transmitted at display terminal time=Tr_y3 from the display terminal 200 (the round-trip time measurement assisting unit 202). At this time, third round-trip time Td_y3 calculated by the round-trip time measurement unit 106 is a round-trip time greater than round-trip time determination value Td_th (where Td_y3>Td_th). Therefore, the phase adjustment determination unit 110 determines that the phase of the imaging synchronization signal is not adjusted. In this case, the phase adjustment unit 109 does not output the phase adjustment instruction to the synchronization signal generation unit 102. That is, the phase adjustment unit 109 continuously generates the imaging synchronization signal to the synchronization signal generation unit 102 without adjusting the phase of the imaging synchronization signal. Thus, the synchronization signal generation unit 102 continuously generates the phase adjusted in accordance with second round-trip time Td_y2, that is, the imaging synchronization signal at the previous adjustment timing.

In the example shown in FIG. 12, after the imaging terminal 100 (the round-trip time measurement unit 106) receives the third round-trip time measurement return signal transmitted from the display terminal 200 (the round-trip time measurement assisting unit 202) at display terminal time=Tr_y3, a pre-decided time necessary to determine whether the period is adjusted has elapsed. Then, in the example shown in FIG. 12, the period adjustment unit 101 outputs period adjustment amount E to the synchronization signal generation unit 102 along with the period adjustment instruction. Thus, the synchronization signal generation unit 102 adjusts the period of the generated imaging synchronization signal in accordance with period adjustment amount E output from the period adjustment unit 101. The example shown in FIG. 12 shows a state in which period A of the imaging synchronization signal before the adjustment of the period is adjusted to period A' enlarged by adjustment amount AE in accordance with period adjustment amount E. As a result, the period of the imaging synchronization signal generated by the synchronization signal generation unit 102 is similar to the period of the display synchronization signal generated by the synchronization signal generation unit 204 as in the example shown in FIG. 13.

In this way, in the image transfer system 1, the imaging terminal 100 (more specifically, the synchronization signal generation unit 102) adjusts the phase and the period of the generated imaging synchronization signal. Thus, in the image transfer system 1, the phase and the period (at least the phase) of the imaging synchronization signal generated by the synchronization signal generation unit 102 are adjusted so that the phase and the period of the imaging synchronization signal match the phase and the period (at least the phase) of the display synchronization signal generated by the display terminal 200 (more specifically, the synchronization signal generation unit 204). That is, in the image transfer system 1, even when the phase and the period of each of the imaging synchronization signal and the display synchronization signal deviate over time due to an error of the phase and the period between the imaging standard clock signal generated by the source oscillation clock generation unit 103 and the display standard clock signal generated by the source oscillation clock generation unit 205, the phase and the period (at least the phase) of the imaging synchronization signal in the imaging terminal 100 are adjusted so that the phase and the period of the imaging synchronization signal match the phase and the period (at least the phase) of the display synchronization signal.

As described above, in the image transfer system 1 according to the first embodiment, after the wireless connection between the imaging terminal 100 and the display terminal 200 is established, the round-trip time measurement outward signal and the round-trip time measurement return signal are transmitted and received between the round-trip time measurement unit 106 included in the imaging terminal 100 and the round-trip time measurement assisting unit 202 included in the display terminal 200. Then, in the image transfer system 1 according to the first embodiment, the round-trip time measurement unit 106 calculates a round-trip time necessary for transmission and reception in the wireless transfer between the imaging terminal 100 and the display terminal 200 based on the transmission schedule time of the round-trip time measurement outward signal and the reception time of the round-trip time measurement return signal in accordance with the round-trip time measurement outward signal transmitted from the round-trip time measurement assisting unit 202. Then, in the image transfer system 1 according to the first embodiment, the phase adjustment determination unit 110 included in the imaging terminal 100 determines whether the phase of the imaging synchronization signal generated by the synchronization signal generation unit 102 included in the imaging terminal 100 is adjusted based on the round-trip time calculated by the round-trip time measurement unit 106. Then, in the image transfer system 1 according to the first embodiment, when the phase adjustment determination unit 110 determines that the phase of the imaging synchronization signal is adjusted, the phase adjustment unit 109 included in the imaging terminal 100 outputs the phase adjustment instruction to adjust the phase of the imaging synchronization signal to the synchronization signal generation unit 102. Thus, in the image transfer system 1 according to the first embodiment, the synchronization signal generation unit 102 adjusts the phase of the generated imaging synchronization signal in accordance with the phase adjustment instruction output from the phase adjustment unit 109. That is, in the image transfer system 1 according to the first embodiment, the imaging terminal 100 adjusts the phase of the generated imaging synchronization signal so that the phase of the imaging synchronization signal matches the phase of the display synchronization signal generated by the display terminal 200.

In the image transfer system 1 according to the first embodiment, the phase deviation cumulative value estimation unit 111 included in the imaging terminal 100 estimates the deviation amount between the phases of the imaging synchronization signal and the display synchronization signal even when the phase adjustment determination unit 110 determines that the phase of the imaging synchronization signal is not adjusted. Then, the phase deviation cumulative value estimation unit 111 causes the phase adjustment unit 109 to adjust the phase of the imaging synchronization signal based on the estimated deviation amount between the phases.

Thus, in the image transfer system 1 according to the first embodiment, the phase of the imaging synchronization signal can be caused to match the phase of the display synchronization signal even when the phases of the imaging synchronization signal and the display synchronization signal deviate from one another over time due to an error of the phase and the period between the imaging standard clock signal generated by the source oscillation clock generation unit 103 included in the imaging terminal 100 and the display standard clock signal generated by the source oscillation clock generation unit 205 included in the display terminal 200. Thus, in the image transfer system 1 according to the first embodiment, even when the wireless transfer between the imaging terminal 100 and the display terminal 200 enters an unstable communication situation such as abrupt worsening of communication quality due to frequent occurrence of retransmission of transmitted and received packets, lowering of a communication rate, or the like and lag of the wireless transfer in which there is variation exceeding a predetermined range occurs, the wireless transfer can be realized in a state excluding lag of wireless transfer exceeding a predetermined range. Thus, in the image transfer system 1 according to the first embodiment, the captured image data can be wirelessly delivered from the imaging terminal 100 to the display terminal 200 without exceeding a valid period of a display image, and thus the display terminal 200 can display the display image stably in accordance with the captured image data transmitted from the imaging terminal 100.

In the image transfer system 1 according to the first embodiment, the period of the imaging synchronization signal can also be adjusted in addition to the phase of the imaging synchronization signal. Thus, in the image transfer system 1 according to the first embodiment, the display terminal 200 can display the display image in accordance with the captured image data transmitted from the imaging terminal 100 more stably.

In the image transfer system 1 according to the first embodiment, the processing procedure in which the phase of the imaging synchronization signal is adjusted whenever the round-trip time measurement unit 106 calculates the round-trip time in the process of adjusting the phase of the imaging synchronization signal in step S304 shown in FIG. 3 has been described. However, the process of adjusting the phase of the imaging synchronization signal in step S304 is not limited to the processing procedure shown in FIG. 3. For example, when considerable delay suddenly occurring in the wireless transfer affects the round-trip time calculated by the round-trip time measurement unit 106 in step S303 of the flowchart showing the processing procedure of the image transfer system 1 shown in FIG. 3, it is conceived that the phase adjustment unit 109 outputs the phase adjustment instruction to adjust the phase of the imaging synchronization signal to the synchronization signal generation unit 102 so that the phase is larger in step S304. Therefore, in step S304 of the flowchart showing the processing procedure of the image transfer system 1 shown in FIG. 3, the phase adjustment unit 109 may perform a phase adjustment process of dividing a phase adjustment amount for adjusting the phase step by step and outputting the phase adjustment instruction to the synchronization signal generation unit 102 without outputting the phase adjustment instruction to adjust the phase of the imaging synchronization signal from the first step so that the phase is larger to the synchronization signal generation unit 102.

Second Embodiment

Hereinafter, an image transfer system according to a second embodiment of the present invention will be described. Configurations of an imaging terminal and a display terminal in the image transfer system according to the second embodiment are similar to the configuration of the image transfer system 1 according to the first embodiment shown in FIG. 2. Accordingly, detailed description of the configuration of the image transfer system according to the second embodiment will be omitted and the image transfer system 1 according to the first embodiment is assumed to perform an operation of the image transfer system according to the second embodiment in the description. To distinguish the image transfer system according to the second embodiment from the image transfer system 1 according to the first embodiment, the image transfer system according to the second embodiment is referred to as an "image transfer system 2."

Next, a specific operation of adjusting a phase of a timing signal in the image transfer system 2 will be described. The overall operation in the image transfer system 2 is similar to that of the image transfer system 1 according to the first embodiment. That is, even in the image transfer system 2, a round-trip time measurement outward signal and a round-trip time measurement return signal are transmitted and received between the round-trip time measurement unit 106 included in the imaging terminal 100 and the round-trip time measurement assisting unit 202 included in the display terminal 200 (step S302). Then, even in the image transfer system 2, the round-trip time measurement unit 106 calculates a round-trip time necessary for transmission and reception in wireless transfer between the imaging terminal 100 and the display terminal 200 based on a transmission time of the round-trip time measurement outward signal and a reception time of the round-trip time measurement return signal transmitted from the round-trip time measurement assisting unit 202 in accordance with the round-trip time measurement outward signal (step S303). Thereafter, even in the image transfer system 2, based on the round-trip time, the phase adjustment determination unit 110 included in the imaging terminal 100 determines whether the phase of the imaging synchronization signal generated by the synchronization signal generation unit 102 included in the imaging terminal 100 is adjusted. Then, even in the image transfer system 2, when it is determined that the phase of the imaging synchronization signal is adjusted, the phase adjustment unit 109 included in the imaging terminal 100 outputs a phase adjustment instruction and the synchronization signal generation unit 102 adjusts the phase of the imaging synchronization signal (step S304). In the image transfer system 2, however, the process of step S304 is different from that of the image transfer system 1 according to the first embodiment. In the following description, a more detailed operation in a phase adjustment process (step S304) different from that of the image transfer system 1 according to the first embodiment will be described.

Even in the image transfer system 2, as in the image transfer system 1 according to the first embodiment, subsequently after the process of adjusting the phase of the imaging synchronization signal in step S304, the period adjustment unit 101 included in the imaging terminal 100 may output the period adjustment instruction based on the information used in the phase adjustment process and the synchronization signal generation unit 102 may perform the process of step S310 in which the period of the imaging synchronization signal is adjusted.

Figure 14:
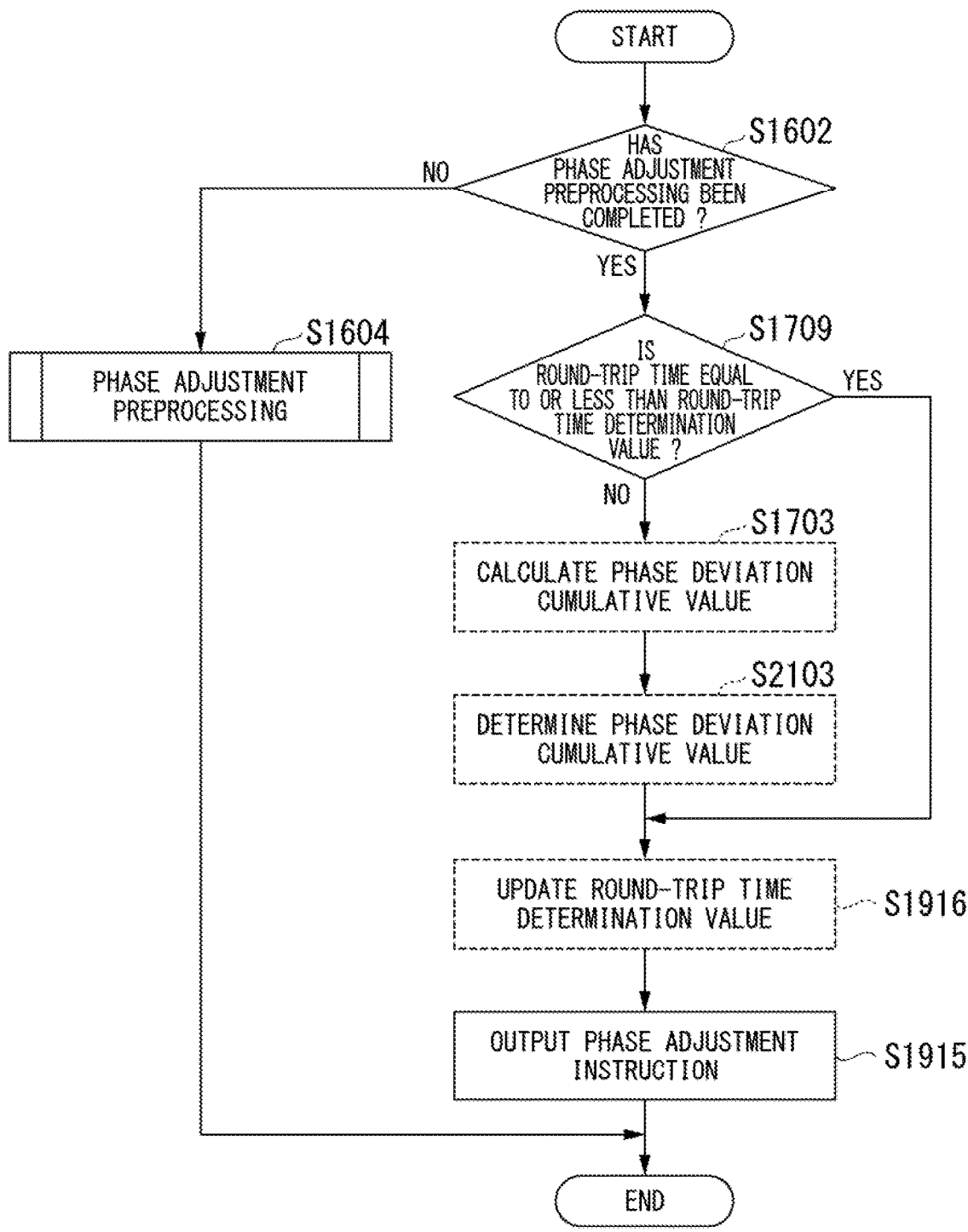
FIG. 14 is a flowchart showing a processing procedure of a phase adjustment process for an imaging synchronization signal by an imaging terminal included in an image transfer system according to a second embodiment of the present invention.

FIG. 14 is a flowchart showing a processing procedure of a phase adjustment process for an imaging synchronization signal by the imaging terminal 100 included in the image transfer system 2 according to the second embodiment of the present invention. When the information regarding the round-trip time is input from the round-trip time measurement unit 106, the phase adjustment determination unit 110 starts the phase adjustment process (step S304).

When the phase adjustment process starts, the phase adjustment determination unit 110 first determines whether phase adjustment preprocessing has been completed (step S1602). More specifically, in step S1602, the phase adjustment determination unit 110 determines whether the phase adjustment preprocessing has been completed, for example, by confirming a phase adjustment preprocessing completion signal set to an ON state when the phase adjustment preprocessing has been completed.

For example, when the phase adjustment preprocessing has not been completed, such as an OFF state of the phase adjustment preprocessing completion signal, in a determination result of step S1602 ("NO" in step S1602), the phase adjustment determination unit 110 determines that the phase adjustment preprocessing is performed. Then, the phase adjustment determination unit 110 performs the phase adjustment preprocessing (step S1604). The phase adjustment preprocessing performed by the phase adjustment determination unit 110 in step S1604 is a process of causing the phase adjustment unit 109 to perform the phase adjustment step by step based on information regarding a plurality of round-trip times calculated by the round-trip time measurement unit 106 so that the phase adjustment for adjusting the phase of the imaging synchronization signal from the first step so that the phase is large is not performed. A processing procedure of the phase adjustment preprocessing performed in step S1604 by the phase adjustment determination unit 110 will be described in detail later.

Conversely, when the phase adjustment preprocessing has been completed, such as an ON state of the phase adjustment preprocessing completion signal, for example, in a determination result of step S1602 ("YES" in step S1602), the phase adjustment determination unit 110 determines that the phase adjustment preprocessing is not performed. In this case, the phase adjustment determination unit 110 performs the process of step S304 in the image transfer system 1 according to the first embodiment. More specifically, when the phase adjustment determination unit 110 determines that the phase adjustment preprocessing is not performed, it is continuously determined whether the round-trip time is equal to or less than a pre-decided round-trip time determination value (step S1709). When the phase adjustment determination unit 110 determines that the phase adjustment is performed, the phase adjustment unit 109 outputs the phase adjustment instruction to adjust the phase of the imaging synchronization signal to the synchronization signal generation unit 102 based on the phase adjustment determination result and the information regarding the round-trip time (step S1915). Thus, the synchronization signal generation unit 102 adjusts the phase of the generated imaging synchronization signal in accordance with the phase adjustment instruction output from the phase adjustment unit 109.

Even in the image transfer system 2, when the round-trip time is not equal to or less than the pre-decided round-trip time determination value in a determination result of step S1709, the phase deviation cumulative value estimation unit 111 may perform the process of updating the round-trip time determination value (the steps S1703, S2103, and S1916) used by the phase adjustment determination unit 110 in step S1709, as in the process of step S304 in the image transfer system 1 according to the first embodiment. The process of updating the round-trip time determination value in step S1916 may be performed by the phase adjustment determination unit 110 as in the process of step S304 in the image transfer system 1 according to the first embodiment even when the round-trip time is equal to or less than the pre-decided round-trip time determination value in the determination result of step S1709.

Figure 15:
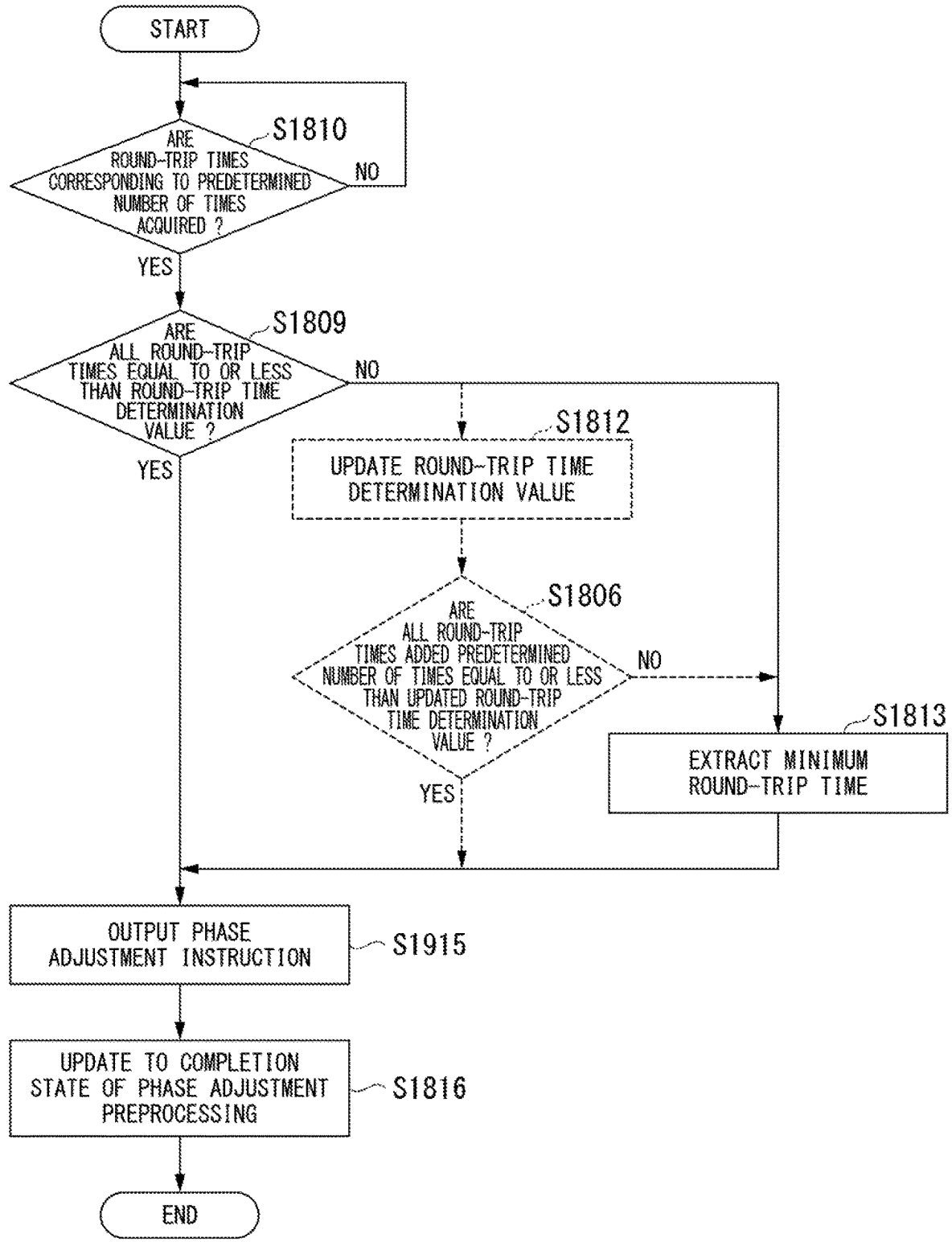
FIG. 15 is a flowchart showing a processing procedure of phase adjustment preprocessing for an imaging synchronization signal by the imaging terminal included in the image transfer system according to a second embodiment of the present invention.

Next, phase adjustment preprocessing performed by the phase adjustment determination unit 110 in step S1604 will be described. FIG. 15 is a flowchart showing a processing procedure of phase adjustment preprocessing for an imaging synchronization signal by the imaging terminal 100 included in the image transfer system 2 according to the second embodiment of the present invention. When the phase adjustment determination unit 110 determines in step S1602 that the phase adjustment preprocessing has not been completed ("NO" in step S1602), the phase adjustment preprocessing is continuously performed.

In the phase adjustment preprocessing, the phase adjustment determination unit 110 first confirms whether the information regarding the round-trip times corresponding to a pre-decided number of times (for example, a times (where a is a natural number equal to or greater than 2: a positive integer)) is input (acquired) from the round-trip time measurement unit 106 (step S1810). When the information regarding the round-trip times is not acquired the predetermined number of times from the round-trip time measurement unit 106 in a confirmation result of step S1810 ("NO" in step S1810), the phase adjustment determination unit 110 returns the process to step S1810 and repeats step S1810 until the information regarding the round-trip time is acquired the predetermined number of times from the round-trip time measurement unit 106. Conversely, when the information regarding the round-trip times is acquired the predetermined number of times from the round-trip time measurement unit 106 in a confirmation result of step S1810 ("YES" in step S1810), the phase adjustment determination unit 110 determines whether all the round-trip times acquired the predetermined number of times (for example, a times) are equal to or less than the pre-decided round-trip time determination value (step S1809).

When all the round-trip times corresponding to the predetermined number of times acquired from the round-trip time measurement unit 106 are equal to or less than the pre-decided round-trip time determination value in a determination result of step S1809 ("YES" in step S1809), the phase adjustment determination unit 110 determines that the phase adjustment is performed and outputs a phase adjustment determination result and information regarding the round-trip time to the phase adjustment unit 109. When the phase adjustment determination unit 110 determines that the phase adjustment is performed in accordance with the determination result of step S1809, the phase adjustment determination unit 110 outputs a pre-decided round-trip time determination value used for the determination as the round-trip time calculated by the round-trip time measurement unit 106 to the phase adjustment unit 109 along with the phase adjustment determination result. For example, when round-trip time determination value Td_th is the pre-decided round-trip time determination value, the phase adjustment determination unit 110 outputs round-trip time determination value Td_th as round-trip time Td to the phase adjustment unit 109. Thus, the phase adjustment unit 109 instructs the synchronization signal generation unit 102 to adjust the phase of the imaging synchronization signal (outputs the phase adjustment instruction) based on the information regarding the round-trip time and the phase adjustment determination result output from the phase adjustment determination unit 110 (step S1915). Thus, the synchronization signal generation unit 102 adjusts the phase of the generated imaging synchronization signal in accordance with the phase adjustment instruction output from the phase adjustment unit 109.

Conversely, when one of the round-trip times corresponding to the predetermined number of times acquired from the round-trip time measurement unit 106 is not equal to or less than the pre-decided round-trip time determination value in a determination result of step S1809 ("NO" in step S1809), the phase adjustment determination unit 110 extracts the minimum round-trip time among the acquired round-trip times corresponding to the predetermined number of times (step S1813). The round-trip time extracted by the phase adjustment determination unit 110 in step S1813 is not limited to the minimum round-trip time among the acquired round-trip times corresponding to the predetermined number of times. For example, the phase adjustment determination unit 110 may extract one round-trip time less than the pre-decided round-trip time determination value among the acquired round-trip times corresponding to the predetermined number of times. Then, the phase adjustment determination unit 110 may output the extracted minimum round-trip time as the round-trip time calculated by the round-trip time measurement unit 106 to the phase adjustment unit 109 along with the phase adjustment determination result. Thus, in step S1915, the phase adjustment unit 109 outputs the phase adjustment instruction to adjust the phase of the imaging synchronization signal to the synchronization signal generation unit 102 based on the information regarding the round-trip time and the phase adjustment determination result output from the phase adjustment determination unit 110. Thus, the synchronization signal generation unit 102 adjusts the phase of the generated imaging synchronization signal in accordance with the phase adjustment instruction output from the phase adjustment unit 109.

Thereafter, after the adjustment of the phase of the imaging synchronization signal by the synchronization signal generation unit 102 is completed, the phase adjustment determination unit 110 sets information indicating whether the phase adjustment preprocessing is completed to a state indicating the completion of the phase adjustment preprocessing as the completion of the phase adjustment preprocessing (step S1816). For example, a phase adjustment preprocessing completion signal indicating whether the phase adjustment preprocessing is completed is set to an ON state indicating completion of the phase adjustment preprocessing.

In this way, in the image transfer system 2, the phase adjustment unit 109 performs the phase adjustment preprocessing for performing the phase adjustment step by step in the process of adjusting the phase of the imaging synchronization signal in step S304 without adjusting the phase of the imaging synchronization signal generated by the synchronization signal generation unit 102 from the first step so that the phase is larger. The number of times the adjustment of the phase of the imaging synchronization signal is divided into steps in the phase adjustment preprocessing may be appropriately changed. That is, in the above-description, the processing procedure of the case in which the phase adjustment is divided into two steps by performing the process of determining whether all the acquired round-trip times corresponding to the predetermined number of times (for example, a times) are equal to or less than the pre-decided round-trip time determination value in step S1809 once has been described. The adjustment of the phase of the imaging synchronization signal can be divided into more steps by further performing a similar process to the process of step S1809.

The flowchart of the processing procedure of the phase adjustment preprocessing in the image transfer system 2 shown in FIG. 15 shows a case in which the adjustment of the phase of the imaging synchronization signal is divided into three steps by performing the similar process to the process of step S1809 is further performed when one of the round-trip times corresponding to the predetermined number of times acquired from the round-trip time measurement unit 106 is not equal to or less than the pre-decided round-trip time determination value in the determination result of step S1809 ("NO" in step S1809).

More specifically, when one of the round-trip times corresponding to the predetermined number of times acquired from the round-trip time measurement unit 106 is not equal to or less than the pre-decided round-trip time determination value in the determination result of step S1809 ("NO" in step S1809), the phase adjustment determination unit 110 updates the round-trip time determination value to a shorter time (small value) than the current round-trip time determination value (step S1812). For example, when the current period of the imaging synchronization signal is period A, the phase adjustment determination unit 110 calculates and updates round-trip time determination value Td_th by Expression (10) below.

$$Td\_th = 0.50 \times A \quad (10)$$

An initial value of round-trip time determination value Td_th may be, for example, a value pre-calculated, for example, by multiplying period A which is a period of the imaging synchronization signal by a positive real number as a coefficient as in Expression (11) below.

$$Td\_th = 0.25 \times A \quad (11)$$

Thereafter, the phase adjustment determination unit 110 further acquires information regarding the round-trip times corresponding to a pre-decided number of times (for example, a times) from the round-trip time measurement unit 106. Then, the phase adjustment determination unit 110 determines whether all the further acquired round-trip times corresponding to the predetermined number of times (for example, a times) are equal to or less than the updated round-trip time determination value (step S1806).

When all the round-trip times corresponding to the predetermined number of times further acquired from the round-trip time measurement unit 106 are equal to or less than the updated round-trip time determination value in the determination result of step S1806 ("YES" in step S1806), the phase adjustment determination unit 110 determines that the phase adjustment is performed and outputs phase adjustment determination result and the information regarding the round-trip times to the phase adjustment unit 109. When the phase adjustment determination unit 110 determines that the phase adjustment is performed in accordance with the determination result of step S1806, the phase adjustment determination unit 110 outputs the updated round-trip time determination value used for the determination as the round-trip time calculated by the round-trip time measurement unit 106 to the phase adjustment unit 109 along with the phase adjustment determination result as in the case in which the phase adjustment is determined to be performed in accordance with the determination result of step S1809. Thus, the phase adjustment unit 109 outputs the phase adjustment instruction based on the information regarding the round-trip time (the updated round-trip time determination value) and the phase adjustment determination result output from the phase adjustment determination unit 110 to the synchronization signal generation unit 102 (step S1915). Thus, the synchronization signal generation unit 102 adjusts the phase of the generated imaging synchronization signal in accordance with the phase adjustment instruction output from the phase adjustment unit 109.

Conversely, when one of the round-trip times corresponding to the predetermined number of times further acquired from the round-trip time measurement unit 106 is not equal to or less than the updated round-trip time determination value in the determination result of step S1806 ("NO" in step S1806), the phase adjustment determination unit 110 extracts the minimum round-trip time among the acquired round-trip times in step S1813. The phase adjustment determination unit 110 acquires the round-trip times corresponding to the predetermined number of times twice (for example, 2×α times) in the process so far. Therefore, the phase adjustment determination unit 110 extracts the minimum round-trip time among all the acquired round-trip times in the process of step S1813 performed in accordance with the determination result of step S1806. In step S1813, the phase adjustment determination unit 110 may extract one round-trip time less than the pre-decided round-trip time determination value or the updated round-trip time determination value among all the acquired round-trip times (for example, 2×α times). Then, the phase adjustment determination unit 110 outputs the extracted minimum round-trip time as the round-trip time calculated by the round-trip time measurement unit 106 to the phase adjustment unit 109 along with the phase adjustment determination result. Thus, in step S1915, the phase adjustment unit 109 instructs the synchronization signal generation unit 102 to adjust the phase of the imaging synchronization signal based on the information regarding the round-trip time (the extracted round-trip time) and the phase adjustment determination result output from the phase adjustment determination unit 110. Thus, the synchronization signal generation unit 102 adjusts the phase of the generated imaging synchronization signal in accordance with the phase adjustment instruction output from the phase adjustment unit 109.

In this way, in the image transfer system 2, the phase adjustment preprocessing for performing the phase adjustment step by step is performed in the process of adjusting the phase of the imaging synchronization signal in step S304 without adjusting the phase of the imaging synchronization signal generated by the synchronization signal generation unit 102 from the first step so that the phase is larger. In the flowchart of the processing procedure of the phase adjustment preprocessing in the image transfer system 2 shown in FIG. 15, the case in which the adjustment of the phase of the imaging synchronization signal is performed in three steps has been described. However, on a similar point of view, the adjustment of the phase of the imaging synchronization signal may be divided into more steps by changing the processing procedure.

As described above, even in the image transfer system 2 according to the second embodiment, as in the image transfer system 1 according to the first embodiment, after the wireless connection between the imaging terminal 100 and the display terminal 200 is established, the round-trip time measurement outward signal and the round-trip time measurement return signal are transmitted and received, and the phase and the period of the imaging synchronization signal generated by the imaging terminal 100 are adjusted so that the phase and the period of the imaging synchronization signal match the phase and the period of the display synchronization signal generated by the display terminal 200. Further, in the image transfer system 2 according to the second embodiment, the phase adjustment amount of the imaging synchronization signal is divided into steps and the phase adjustment process is performed based on the information regarding the round-trip times corresponding to the predetermined number of times output from the round-trip time measurement unit 106 without adjusting the phase of the imaging synchronization signal generated from the first step so that the phase is larger. Thus, in the image transfer system 2 according to the second embodiment, even when considerable delay suddenly occurring in the wireless transfer occurs due to sudden crosstalk or the like occurring until a predetermined time elapses to acquire information regarding the round-trip times corresponding to the predetermined number of times from the first time, the phase of the generated imaging synchronization signal can be adjusted without receiving the influence of the considerable delay.

Thus, even in the image transfer system 2 according to the second embodiment, as in the image transfer system 1 according to the first embodiment, the captured image data can be wirelessly delivered from the imaging terminal 100 to the display terminal 200 without exceeding a valid period of a display image, and thus the display terminal 200 can display the display image stably in accordance with the captured image data transmitted from the imaging terminal 100.

In the image transfer system 1 according to the first embodiment and the image transfer system 2 according to the second embodiment, the round-trip time measurement unit 106, the phase adjustment determination unit 110, the phase adjustment unit 109, and the phase deviation cumulative value estimation unit 111 which are constituent elements adjusting the phase of the imaging synchronization signal generated by the imaging terminal 100 are included in the imaging terminal 100, and the round-trip time measurement assisting unit 202 is included in the display terminal 200, as described above. In other words, in the image transfer system 1 according to the first embodiment and the image transfer system 2 according to the second embodiment, the imaging terminal 100 transmits the round-trip time measurement outward signal to the display terminal 200 and receives the round-trip time measurement return signal transmitted from the display terminal 200 to calculate the round-trip time, as described above. In an image transfer system according to the present invention, even in a configuration in which each constituent element adjusting the phase of the imaging synchronization signal generated by the imaging terminal is included in either the imaging terminal or the display terminal, the function of adjusting the phase of the imaging synchronization signal generated by the imaging terminal can be similarly realized. For example, in contrast to the image transfer system 1 according to the first embodiment and the image transfer system 2 according to the second embodiment, even in a configuration in which the display terminal transmits the round-trip time measurement outward signal to the imaging terminal and receives the round-trip time measurement return signal transmitted from the imaging terminal to calculate the round-trip time, the function of adjusting the phase of the imaging synchronization signal generated by the imaging terminal also be similarly realized.

Third Embodiment

Figure 16:
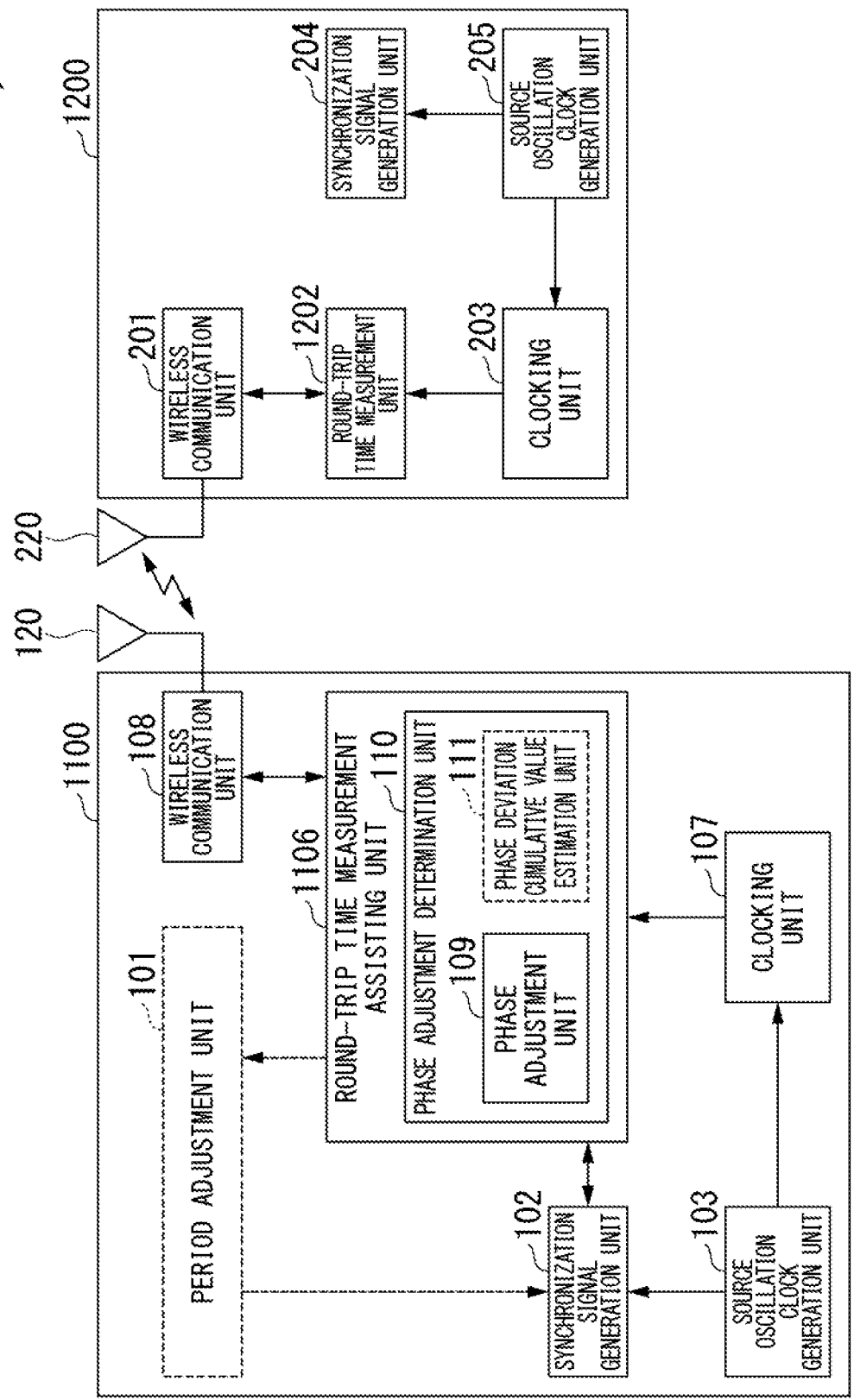
FIG. 16 is a block diagram showing an overall configuration of an image transfer system according to a third embodiment of the present invention.

Hereinafter, an image transfer system according to a third embodiment of the present invention will be described. FIG. 16 is a block diagram showing an overall configuration of the image transfer system according to the third embodiment of the present invention. An image transfer system 3 includes an imaging terminal 1100 and a display terminal 1200. The imaging terminal 1100 includes a synchronization signal generation unit 102, a period adjustment unit 101, a source oscillation clock generation unit 103, a wireless communication unit 108, a round-trip time measurement assisting unit 1106, a clocking unit 107, a phase adjustment unit 109, a phase adjustment determination unit 110, a phase deviation cumulative value estimation unit 111, and an antenna 120. The display terminal 1200 includes a synchronization signal generation unit 204, a source oscillation clock generation unit 205, a wireless communication unit 201, a round-trip time measurement unit 1202, a clocking unit 203, and an antenna 220.

In FIG. 16, in the constituent elements of the image transfer system 3, the same reference numbers are given to similar constituent elements to the constituent elements included in the image transfer system 1 according to the first embodiment and the image transfer system 2 according to the second embodiment shown in FIG. 2.

The image transfer system 3 is an image transfer system in which a round-trip time measurement outward signal and a round-trip time measurement return signal are transmitted and received between the imaging terminal 1100 and the display terminal 1200 and the imaging terminal 1100 adjusts a phase and a period (at least a phase) of a generated imaging synchronization signal so that the phase and the period of the imaging synchronization signal match a phase and a period (at least a phase) of a display synchronization signal generated by the display terminal 1200, as in the image transfer system 1 according to the first embodiment and the image transfer system 2 according to the second embodiment.

Here, in the image transfer system 3, disposition of some of the constituent elements included in the imaging terminal 100 or the display terminal 200 in the image transfer system 1 according to the first embodiment and the image transfer system 2 according to the second embodiment is exchanged. More specifically, in the image transfer system 3, a round-trip time measurement unit 1202 is included in the display terminal 1200 instead of the round-trip time measurement unit 106 included in the imaging terminal 100 in the image transfer system 1 according to the first embodiment and the image transfer system 2 according to the second embodiment. In the image transfer system 3, a round-trip time measurement assisting unit 1106 replacing the round-trip time measurement assisting unit 202 included in the display terminal 200 in the image transfer system 1 according to the first embodiment and the image transfer system 2 according to the second embodiment is included in the imaging terminal 1100.

Therefore, in the image transfer system 3, the display terminal 1200 transmits the round-trip time measurement outward signal to the imaging terminal 1100, and the imaging terminal 1100 transmits the round-trip time measurement return signal in accordance with the round-trip time measurement outward signal transmitted from the display terminal 1200 to the display terminal 1200. Then, in the image transfer system 3, the display terminal 1200 calculates a round-trip time necessary for transmission and reception in wireless transfer between the imaging terminal 1100 and the display terminal 1200 based on a transmission time of the round-trip time measurement outward signal and a reception time of the round-trip time measurement return signal in accordance with the round-trip time measurement outward signal transmitted from the imaging terminal 1100.

However, in the image transfer system 3, there is a process of exchanging signals through the wireless transfer with a change in disposition of a constituent element, but a function and an operation of each constituent element are similar to a function and an operation of a corresponding constituent element in the image transfer system 1 according to the first embodiment and the image transfer system 2 according to the second embodiment. That is, a function and an operation of each constituent element included in the imaging terminal 1100 and the display terminal 1200 in the image transfer system 3 can be easily understood from the above description of each constituent element included in the imaging terminal 100 and the display terminal 200 in the image transfer system 1 according to the first embodiment and the image transfer system 2 according to the second embodiment. Accordingly, a detailed description of each constituent element included in the image transfer system 3 will be omitted.

Figure 17:
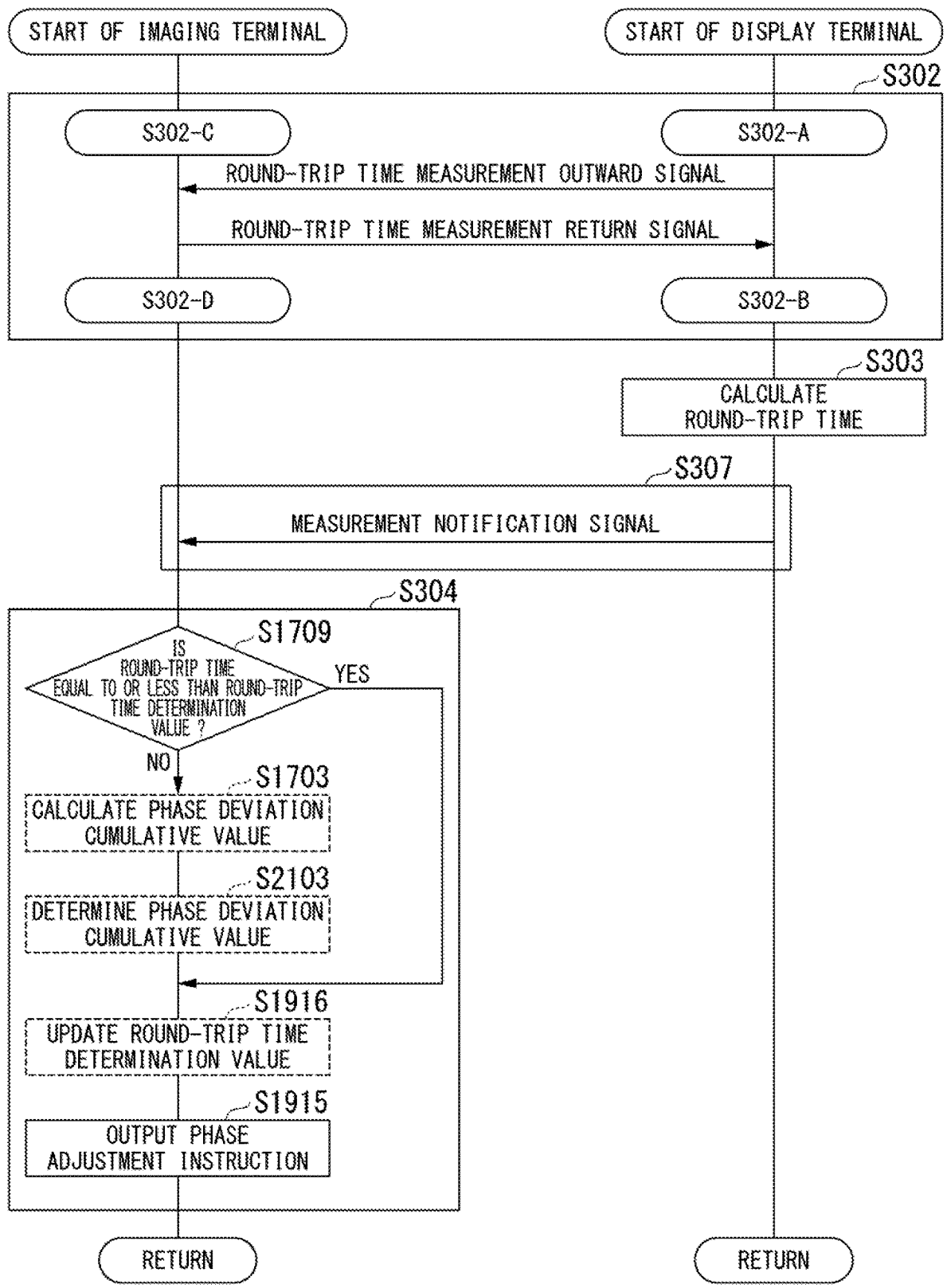
FIG. 17 is a flowchart showing a processing procedure of the image transfer system according to the third embodiment of the present invention.

Next, an operation of a process in the image transfer system 3 will be described. In the image transfer system 3, a process of transmitting information regarding a round-trip time to the imaging terminal 1100 is added with a change to a configuration in which the display terminal 1200 transmits the round-trip time measurement outward signal. However, an overview of an overall operation in the image transfer system 3 is similar to that of the image transfer system 1 according to the first embodiment and the image transfer system 2 according to the second embodiment. Accordingly, in the image transfer system 3, description of the overview of the overall operation will be omitted and a more specific operation of adjusting the phase of the imaging synchronization signal in the image transfer system 3 will be described. FIG. 17 is a flowchart showing a processing procedure of the image transfer system 3 according to the third embodiment of the present invention.

In the image transfer system 3, when the phase adjustment process starts, the display terminal 1200 transmits the round-trip time measurement outward signal to the imaging terminal 1100, and the imaging terminal 1100 transmits the round-trip time measurement return signal in accordance with the round-trip time measurement outward signal to the display terminal 1200 in step S302. More specifically, in the display terminal 1200, the round-trip time measurement unit 1202 transmits the round-trip time measurement outward signal to the imaging terminal 1100 via the wireless communication unit 201 and the antenna 220 and receives the round-trip time measurement return signal transmitted from the imaging terminal 1100 in a process of step S302-A and step S302-B in step S302. In the imaging terminal 1100, on the other hand, when the phase adjustment process starts, the round-trip time measurement assisting unit 1106 receives the round-trip time measurement outward signal transmitted from the display terminal 1200 via the antenna 120 and the wireless communication unit 108 and transmits the round-trip time measurement return signal in accordance with the received round-trip time measurement outward signal to the display terminal 1200 in a process of step S302-C and step S302-D in step S302.

In the image transfer system 3, the process of step S302 in which the round-trip time measurement outward signal and the round-trip time measurement return signal are transmitted and received between the imaging terminal 1100 and the display terminal 1200 can easily be understood by inversely conceiving the imaging terminal 100 and the display terminal 200 performing the process of step S302 in the image transfer system 1 according to the first embodiment and the image transfer system 2 according to the second embodiment. More specifically, easy understanding can be reached by conceiving that the display terminal 1200 (more specifically, the round-trip time measurement unit 1202) performs the process (the process of step S302-A to step S302-B) of transmitting and receiving the round-trip time measurement outward signal and the round-trip time measurement return signal in the imaging terminal 100 included in the image transfer system 1 according to the first embodiment, as shown in FIG. 4. Easy understanding can be reached by conceiving that the imaging terminal 1100 (more specifically, the round-trip time measurement assisting unit 1106) performs the process (the process of step S302-C to step S302-D) of transmitting and receiving the round-trip time measurement outward signal and the round-trip time measurement return signal in the display terminal 200 included in the image transfer system 1 according to the first embodiment, as shown in FIG. 5. Accordingly, a detailed description of the process of step S302 in the image transfer system 3 will be omitted here.

Thereafter, in the image transfer system 3, in step S303, the display terminal 1200 calculates the round-trip time necessary for transmission and reception in the wireless transfer between the imaging terminal 1100 and the display terminal 1200. More specifically, the round-trip time measurement unit 1202 calculates the round-trip time necessary for transmission and reception in the wireless transfer between the imaging terminal 1100 and the display terminal 1200 based on the information regarding the transmitted round-trip time measurement outward signal and information included in the round-trip time measurement return signal transmitted from the imaging terminal 1100.

Thereafter, in the image transfer system 3, in step S307, the display terminal 1200 generates a measurement notification signal including the information regarding the calculated round-trip time and transmits the generated measurement notification signal to the imaging terminal 1100. More specifically, the round-trip time measurement unit 1202 generates a measurement notification signal including the information regarding the calculated round-trip time, the information regarding the transmission schedule time of the round-trip time measurement outward signal, and the information regarding the transmission schedule time included in the received round-trip time measurement return signal. Then, the round-trip time measurement unit 1202 outputs the generated measurement notification signal to the wireless communication unit 201 to transmit the measurement notification signal to the imaging terminal 1100 via the wireless communication unit 201 and the antenna 220. Thus, the imaging terminal 1100 acquires the information regarding the round-trip time from the display terminal 1200. More specifically, the wireless communication unit 108 receives the measurement notification signal transmitted from the display terminal 1200 via the antenna 120. Then, the wireless communication unit 108 outputs each of the information regarding the round-trip time, the information regarding the transmission schedule time of the round-trip time measurement outward signal, and the information regarding the transmission schedule time included in the received round-trip time measurement return signal which are included in the received measurement notification signal to the round-trip time measurement assisting unit 1106.

Thereafter, in the image transfer system 3, in step S304, the imaging terminal 1100 adjusts the phase of the imaging synchronization signal based on the round-trip time necessary for transmission and reception in the wireless transfer between the imaging terminal 1100 and the display terminal 1200 which is transmitted from the display terminal 1200, that is, calculated in step S303 by the display terminal 1200. The process of adjusting the phase of the imaging synchronization signal in step S304 is similar to the process of step S304 in the image transfer system 1 according to the first embodiment and the image transfer system 2 according to the second embodiment. Accordingly, detailed description of the process of step S304 in the image transfer system 3 will be omitted.

In this way, in the image transfer system 3, the display terminal 1200 transmits the round-trip time measurement outward signal and calculates the round-trip time in the wireless transfer between the imaging terminal 1100 and the display terminal 1200, and the imaging terminal 1100 adjusts the phases of the imaging synchronization signal and the display synchronization signal so that the phases do not deviate over time.

Even in the image transfer system 3, as in the image transfer system 1 according to the first embodiment and the image transfer system 2 according to the second embodiment, the process of step S310 may be performed subsequently after the process of adjusting the phase of the imaging synchronization signal in step S304. That is, the period adjustment unit 101 included in the imaging terminal 1100 outputs a phase adjustment instruction based on the information used in the phase adjustment process and the synchronization signal generation unit 102 may adjust the period of the imaging synchronization signal in accordance with the period adjustment instruction output from the period adjustment unit 101. The process of step S310 in this case is similar to the process of step S310 in the image transfer system 1 according to the first embodiment and the image transfer system 2 according to the second embodiment. In the flowchart of the processing procedure of the image transfer system 3 shown in FIG. 17, the process of step S310 performed subsequently after the process of step S304 is not shown.

In this configuration and the processing procedure, in the image transfer system 3, the display terminal 1200 measures (calculates) the round-trip time in the wireless transfer between the imaging terminal 1100 and the display terminal 1200 by transmitting the round-trip time measurement outward signal, and the imaging terminal 1100 adjusts the phase and the period (at least the phase) of the generated imaging synchronization signal based on the round-trip time measured (calculated) by the display terminal 1200. Thus, even in the image transfer system 3, as in the image transfer system 1 according to the first embodiment and the image transfer system 2 according to the second embodiment, the phase and the period (at least the phase) of the imaging synchronization signal generated by the imaging terminal 1100 (more specifically, the synchronization signal generation unit 102) are adjusted so that the phase and the period of the imaging synchronization signal match the phase and the period (at least the phase) of the display synchronization signal generated by the display terminal 1200. That is, even in the image transfer system 3, as in the image transfer system 1 according to the first embodiment and the image transfer system 2 according to the second embodiment, a timing at which the imaging terminal 1100 wirelessly delivers the captured image data of the image captured by the imaging unit (not shown) to the display terminal 1200 matches a timing at which the display terminal 1200 causes the display unit (not shown) to display the image in accordance with the captured image data. Thus, even in the image transfer system 3, as in the image transfer system 1 according to the first embodiment and the image transfer system 2 according to the second embodiment, the display terminal 1200 can stably cause the display unit (not shown) to display the image in accordance with the captured image data wirelessly delivered from the imaging terminal 1100.

As described above, in the image transfer system 3 according to the third embodiment, after the wireless connection between the imaging terminal 1100 and the display terminal 1200 is established, the round-trip time measurement outward signal and the round-trip time measurement return signal are transmitted and received between the round-trip time measurement unit 1202 included in the display terminal 1200 and the round-trip time measurement assisting unit 1106 included in the imaging terminal 1100. Then, in the image transfer system 3 according to the third embodiment, the round-trip time measurement unit 1202 calculates a round-trip time necessary for transmission and reception in the wireless transfer between the imaging terminal 1100 and the display terminal 1200 based on the transmission time of the round-trip time measurement outward signal and the reception time of the round-trip time measurement return signal in accordance with the round-trip time measurement outward signal transmitted from the round-trip time measurement assisting unit 1106, and transmits the round-trip time to the imaging terminal 1100. Then, in the image transfer system 3 according to the third embodiment, the phase adjustment determination unit 110 included in the imaging terminal 1100 determines whether the phase of the imaging synchronization signal generated by the synchronization signal generation unit 102 included in the imaging terminal 1100 is adjusted based on the round-trip time calculated by the round-trip time measurement unit 1202. Then, in the image transfer system 3 according to the third embodiment, when the phase adjustment determination unit 110 determines that the phase of the imaging synchronization signal is adjusted, the phase adjustment unit 109 included in the imaging terminal 1100 outputs the phase adjustment instruction to adjust the phase of the imaging synchronization signal to the synchronization signal generation unit 102. Thus, in the image transfer system 3 according to the third embodiment, the synchronization signal generation unit 102 adjusts the phase of the generated imaging synchronization signal in accordance with the phase adjustment instruction output from the phase adjustment unit 109.

Thus, even in the image transfer system 3 according to the third embodiment, as in the image transfer system 1 according to the first embodiment and the image transfer system 2 according to the second embodiment, the phase and the period (at least the phase) of the imaging synchronization signal can match the phase and the period (at least the phase) of the display synchronization signal. That is, even in the image transfer system 3 according to the third embodiment, the phase and the period (at least the phase) of the imaging synchronization signal can match the phase and the period (at least the phase) of the display synchronization signal even when the phases of the imaging synchronization signal and the display synchronization signal deviate from one another over time due to an error of the phase and the period between the imaging standard clock signal and the display standard clock signal. Thus, even in the image transfer system 3 according to the third embodiment, it is possible to obtain similar advantages as those of the image transfer system 1 according to the first embodiment and the image transfer system 2 according to the second embodiment. That is, even in the image transfer system 3 according to the third embodiment, as in the image transfer system 1 according to the first embodiment and the image transfer system 2 according to the second embodiment, the captured image data can be wirelessly delivered from the imaging terminal 1100 to the display terminal 1200 without exceeding a valid period of a display image, and thus the display terminal 1200 can display the display image stably in accordance with the captured image data transmitted from the imaging terminal 1100.

Further, in the image transfer system 3 according to the third embodiment, the display terminal 1200 calculates the round-trip time necessary for transmission and reception in the wireless transfer between the imaging terminal 1100 and the display terminal 1200. Thus, in the image transfer system 3 according to the third embodiment, it is not necessary to calculate the round-trip time in the imaging terminal 1100 and it is possible to reduce a load of the process performed in the imaging terminal 1100.

As described above, in the image transfer system according to the present invention, it is possible to similarly realize the function of adjusting the phase of the imaging synchronization signal generated by the imaging terminal even in a configuration in which each constituent element adjusting the phase of the imaging synchronization signal generated by the imaging terminal is included in either the imaging terminal or the display terminal.

Fourth Embodiment

Figure 18:
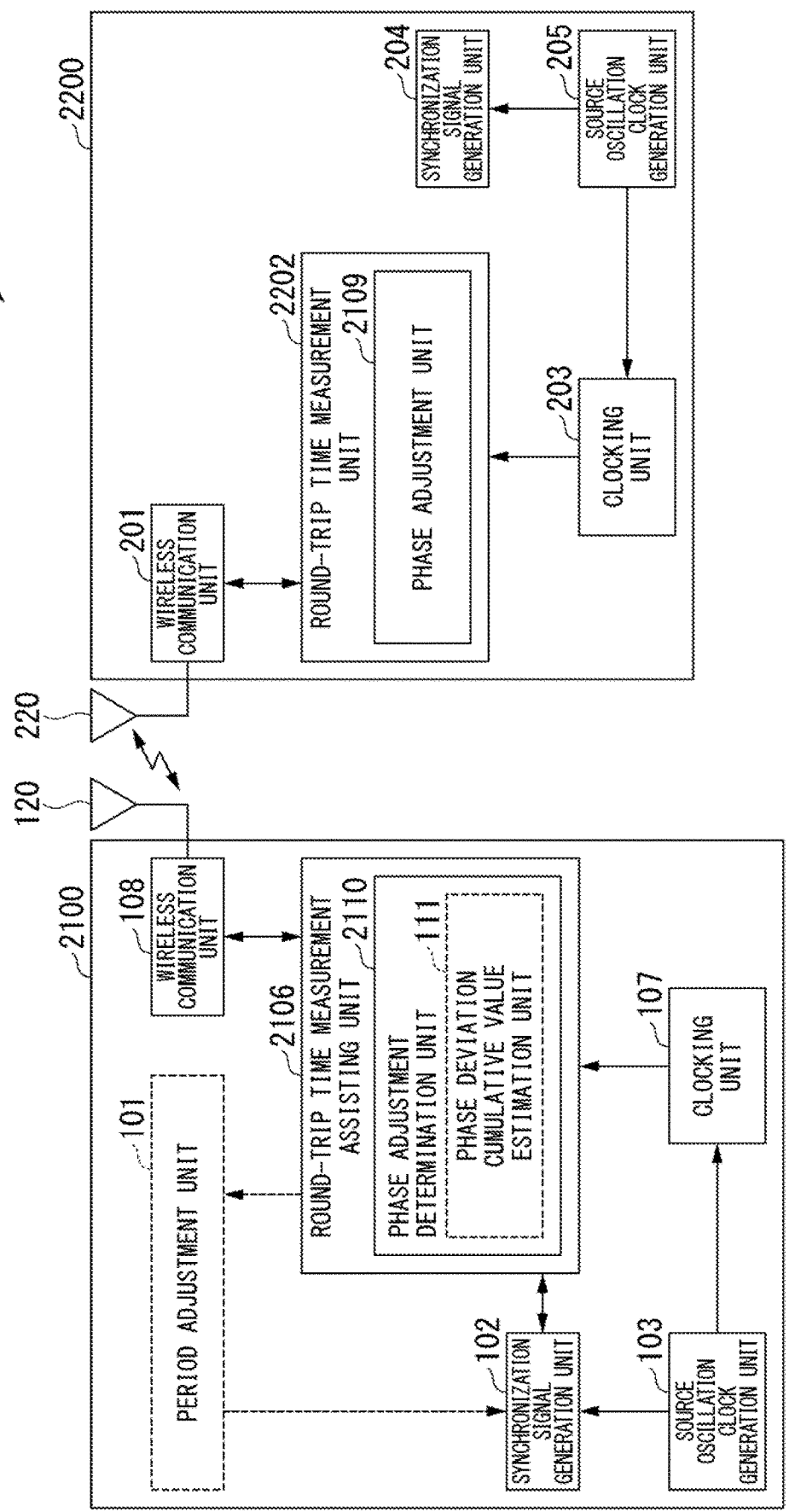
FIG. 18 is a block diagram showing an overall configuration of an image transfer system according to a fourth embodiment of the present invention.

Hereinafter, an image transfer system according to a fourth embodiment of the present invention will be described. FIG. 18 is a block diagram showing an overall configuration of the image transfer system according to the fourth embodiment of the present invention. An image transfer system 4 includes an imaging terminal 2100 and a display terminal 2200. The imaging terminal 2100 includes a synchronization signal generation unit 102, a period adjustment unit 101, a source oscillation clock generation unit 103, a wireless communication unit 108, a round-trip time measurement assisting unit 2106, a clocking unit 107, a phase adjustment determination unit 2110, a phase deviation cumulative value estimation unit 111, and an antenna 120. The display terminal 2200 includes a synchronization signal generation unit 204, a source oscillation clock generation unit 205, a wireless communication unit 201, a round-trip time measurement unit 2202, a clocking unit 203, a phase adjustment unit 2109, and an antenna 220.

In FIG. 18, in the constituent elements of the image transfer system 4, the same reference numbers are given to similar constituent elements to the constituent elements included in the image transfer system 1 according to the first embodiment and the image transfer system 2 according to the second embodiment shown in FIG. 2.

The image transfer system 4 is also an image transfer system in which a round-trip time measurement outward signal and a round-trip time measurement return signal are transmitted and received between the imaging terminal 2100 and the display terminal 2200 and the imaging terminal 2100 adjusts a phase and a period (at least a phase) of a generated imaging synchronization signal so that the phase and the period of the imaging synchronization signal match a phase and a period (at least a phase) of a display synchronization signal generated by the display terminal 2200, as in the image transfer system 1 according to the first embodiment to the image transfer system 3 according to the third embodiment. As in the image transfer system 3 according to the third embodiment, the image transfer system 4 is an image transfer system in which the display terminal 2200 calculates a round-trip time in the wireless transfer between the imaging terminal 2100 and the display terminal 2200 by transmitting the round-trip time measurement outward signal to the imaging terminal 2100, and the imaging terminal 2100 adjusts the phase and the period (at least the phase) of the generated imaging synchronization signal.

Here, in the image transfer system 4, some of the constituent elements included in the imaging terminal 1100 in the image transfer system 3 according to the third embodiment are moved to the display terminal 2200. More specifically, in the image transfer system 4, the display terminal 2200 includes the phase adjustment unit 2109 replacing the phase adjustment unit 109 included in the imaging terminal 1100 in the image transfer system 3 according to the third embodiment. More specifically, in the image transfer system 4, the phase adjustment unit 2109 is included in the round-trip time measurement unit 2202 included in the display terminal 2200.

Therefore, in the image transfer system 4, the display terminal 2200 transmits the phase adjustment instruction to adjust the phase of the imaging synchronization signal generated by the synchronization signal generation unit 102 included in the imaging terminal 2100 to the imaging terminal 2100. Then, in the image transfer system 4, the imaging terminal 2100 adjusts the phase of the generated imaging synchronization signal in accordance with the phase adjustment instruction transmitted from the display terminal 2200.

However, in the image transfer system 4, there is a process of exchanging signals through the wireless transfer with a change in disposition of a constituent element, but a function and an operation of each constituent element are similar to a function and an operation of a corresponding constituent element in the image transfer system 1 according to the first embodiment and the image transfer system 2 according to the second embodiment. That is, a function and an operation of each constituent element included in the imaging terminal 2100 and the display terminal 2200 in the image transfer system 4 can be easily understood from the above description of each constituent element included in the imaging terminal 100 and the display terminal 200 in the image transfer system 1 according to the first embodiment and the image transfer system 2 according to the second embodiment. Accordingly, detailed description of each constituent element included in the image transfer system 4 will be omitted.

Figure 19:
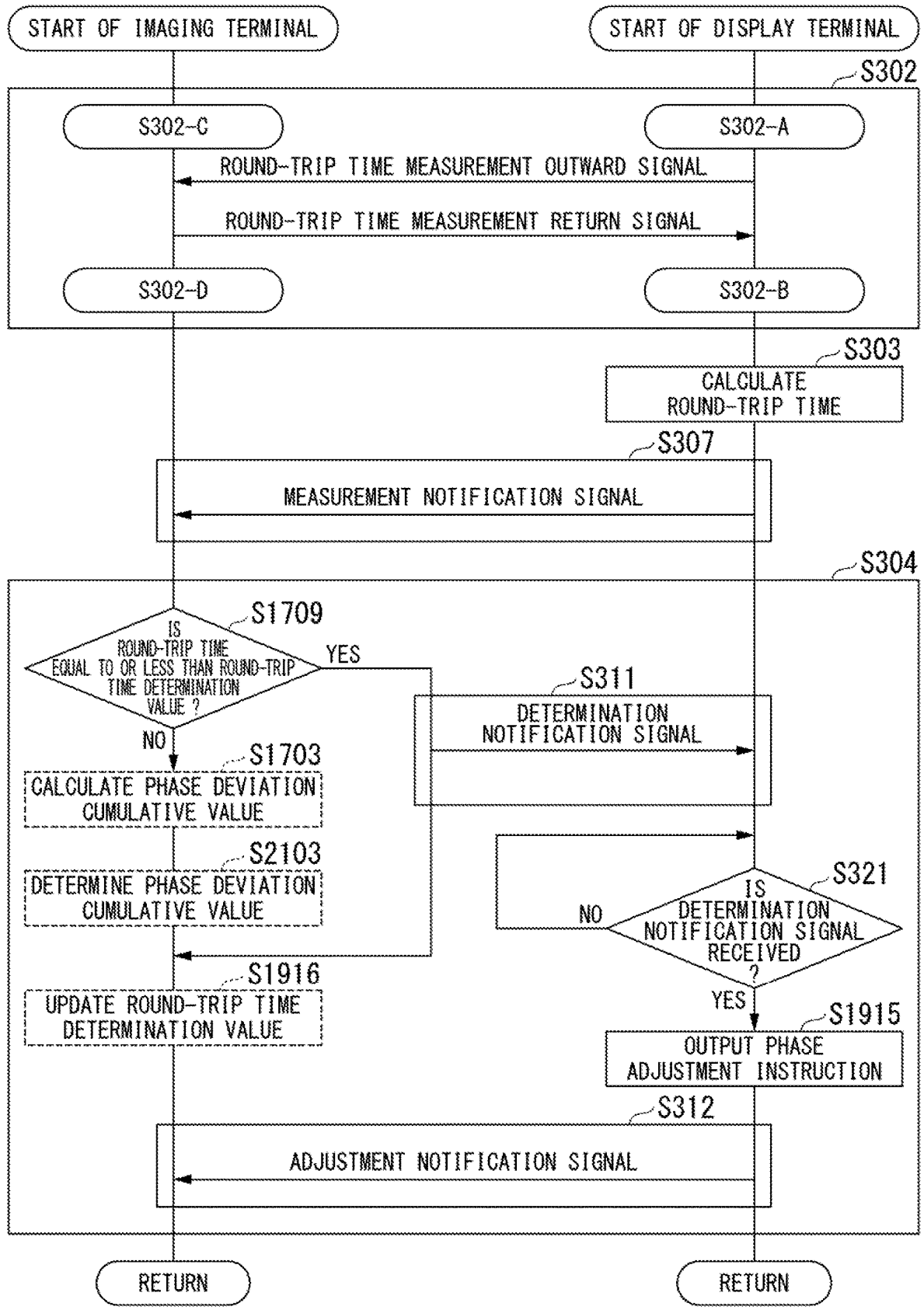
FIG. 19 is a flowchart showing a processing procedure of the image transfer system according to the fourth embodiment of the present invention.

Next, an operation of a process in the image transfer system 4 will be described. In the image transfer system 4, in addition to the process of transmitting information regarding the round-trip time to the imaging terminal 2100, a process of transmitting information regarding a phase adjustment determination result to the display terminal 2200 and a process of transmitting information regarding a phase adjustment instruction to the imaging terminal 2100 are added with a change to a configuration in which the phase adjustment unit 2109 is included in the display terminal 2200. However, an overview of an overall operation in the image transfer system 4 is similar to that of the image transfer system 1 according to the first embodiment and the image transfer system 2 according to the second embodiment. Accordingly, in the image transfer system 4, description of the overview of the overall operation will be omitted and a more specific operation of adjusting the phase of the imaging synchronization signal in the image transfer system 4 will be described. FIG. 19 is a flowchart showing a processing procedure of the image transfer system 4 according to the fourth embodiment of the present invention.

In the image transfer system 4, when the phase adjustment process starts, the display terminal 2200 transmits the round-trip time measurement outward signal to the imaging terminal 2100, and the imaging terminal 2100 transmits the round-trip time measurement return signal in accordance with the round-trip time measurement outward signal to the display terminal 2200 in step S302. The process of step S302 in the image transfer system 4 is similar to the process of step S302 in the image transfer system 3 according to the third embodiment.

Thereafter, in the image transfer system 4, in step S303, the display terminal 2200 calculates the round-trip time necessary for transmission and reception in the wireless transfer between the imaging terminal 2100 and the display terminal 2200. The process of step S303 in the image transfer system 4 is also similar to the process of step S303 in the image transfer system 3 according to the third embodiment.

Thereafter, in the image transfer system 4, in step S307, the display terminal 2200 generates a measurement notification signal including the information regarding the calculated round-trip time and transmits the generated measurement notification signal to the imaging terminal 2100. Thus, the imaging terminal 2100 acquires the information regarding the round-trip time from the display terminal 2200. The process of step S307 in the image transfer system 4 is also similar to the process of step S307 in the image transfer system 3 according to the third embodiment.

Thereafter, in the image transfer system 4, in step S304, the phase of the imaging synchronization signal is adjusted based on the information regarding the round-trip time transmitted from the display terminal 2200. Here, in the image transfer system 4, the display terminal 2200 outputs the phase adjustment instruction to the synchronization signal generation unit 102 included in the imaging terminal 2100.

More specifically, in step S304, the phase adjustment determination unit 2110 determines whether the round-trip time transmitted from the display terminal 2200 is equal to or less than the pre-decided round-trip time determination value (step S1709).

When the round-trip time transmitted from the display terminal 2200 is not equal to or less than the pre-decided round-trip time determination value, that is, the round-trip time calculated by the round-trip time measurement unit 2202 included in the display terminal 2200 is greater than the pre-decided round-trip time determination value in a determination result of step S1709 ("NO" in step S1709), the phase adjustment determination unit 2110 determines that the phase adjustment is not performed, and the process of step S304 ends.

In this case, even in the image transfer system 4, the phase deviation cumulative value estimation unit 111 may estimate a deviation amount between the phases of the imaging synchronization signal and the display synchronization signal and may update the pre-decided round-trip time determination value used when the phase adjustment determination unit 2110 determines whether the phase of the imaging synchronization signal is adjusted based on the estimation result. Since the process (step S1703 to step S1916) of estimating the deviation amount between the phases of the imaging synchronization signal and the display synchronization signal and updating the round-trip time determination value in the image transfer system 4 is the same as that of the image transfer system 1 according to the first embodiment to the image transfer system 3 according to the third embodiment, a detailed description thereof will be omitted.

Conversely, when the round-trip time transmitted from the display terminal 2200 is equal to or less than the pre-decided round-trip time determination value in a determination result of step S1709 ("YES" in step S1709), the phase adjustment determination unit 2110 determines that the phase adjustment is performed. In this case, the phase adjustment determination unit 2110 generates a determination notification signal including the phase adjustment determination result indicating the determination result and transmits the generated determination notification signal to the display terminal 2200 (step S311). More specifically, the phase adjustment determination unit 2110 generates a determination notification signal including the information regarding the phase adjustment determination result and the information regarding the round-trip time transmitted from the display terminal 2200. Then, the phase adjustment determination unit 2110 outputs the generated determination notification signal to the wireless communication unit 108 to transmit the determination notification signal to the phase adjustment unit 2109 via the wireless communication unit 108 and the antenna 120.

In this case, even in the image transfer system 4, the phase adjustment determination unit 2110 may perform the process of step S1916 of updating the round-trip time of a small value determined to be equal to or less than the pre-decided round-trip time determination value to the round-trip time determination value at the time of subsequent determination of the round-trip time. Since the process of step S1916 in the image transfer system 4 is also the same as the process of step S1916 of the image transfer system 1 according to the first embodiment to the image transfer system 3 according to the third embodiment, detailed description thereof will be omitted.

The display terminal 2200 confirms whether the determination notification signal transmitted from the imaging terminal 2100 is received (step S321). More specifically, the phase adjustment unit 2109 confirms whether the information regarding the round-trip time and the phase adjustment determination result determined by the phase adjustment determination unit 2110 are acquired. When the information regarding the round-trip time and the phase adjustment determination result determined by the phase adjustment determination unit 2110 are not acquired in a confirmation result of step S321 ("NO" in step S321), the phase adjustment unit 2109 returns the process to step S321 and repeats step S321 until the information regarding the round-trip time and the phase adjustment determination result are acquired from the phase adjustment determination unit 2110. Conversely, when the information regarding the round-trip time and the phase adjustment determination result determined by the phase adjustment determination unit 2110 are acquired in a confirmation result of step S321 ("YES" in step S321), the phase adjustment unit 2109 generates an adjustment notification signal including the phase adjustment instruction to adjust the phase of the imaging synchronization signal based on the acquired information regarding the round-trip time and phase adjustment determination result (step S1915).

Then, the phase adjustment unit 2109 transmits the generated adjustment notification signal to the imaging terminal 2100 (step S321). More specifically, the phase adjustment unit 2109 generates the adjustment notification signal including the phase adjustment instruction indicating the adjustment of the phase of the imaging synchronization signal by a time indicated by the information regarding the round-trip time. Then, the phase adjustment unit 2109 outputs the generated adjustment notification signal to the wireless communication unit 201 to transmit the adjustment notification signal to the imaging terminal 2100 via the wireless communication unit 201 and the antenna 220. Thus, the imaging terminal 2100 acquires the phase adjustment instruction generated by the phase adjustment unit 2109 included in the display terminal 2200. More specifically, the wireless communication unit 108 receives the adjustment notification signal transmitted from the display terminal 2200 via the antenna 120. Then, the wireless communication unit 108 outputs the information regarding the phase adjustment instruction included in the received adjustment notification signal to the phase adjustment determination unit 2110. The phase adjustment determination unit 2110 outputs the phase adjustment instruction output from the wireless communication unit 108 to the synchronization signal generation unit 102. Thus, the synchronization signal generation unit 102 adjusts the phase of the generated imaging synchronization signal in accordance with the phase adjustment instruction output from the phase adjustment determination unit 2110, that is, the phase adjustment instruction transmitted from the phase adjustment unit 2109 included in the display terminal 2200.

In this way, in the image transfer system 4, the display terminal 2200 transmits the round-trip time measurement outward signal and calculates the round-trip time in the wireless transfer between the imaging terminal 2100 and the display terminal 2200. In the image transfer system 4, the imaging terminal 2100 transmits the phase adjustment determination result obtained by determining whether the phase of the imaging synchronization signal is adjusted to the display terminal 2200, and the display terminal 2200 transmits the phase adjustment instruction to the imaging terminal 2100. Thus, in the image transfer system 4, the imaging terminal 2100 adjusts the phases of the imaging synchronization signal and the display synchronization signal so that the phases do not deviate over time in accordance with the phase adjustment instruction transmitted from the display terminal 2200.

Even in the image transfer system 4, as in the image transfer system 1 according to the first embodiment to the image transfer system 3 according to the third embodiment, the process of adjusting the period of the imaging synchronization signal in step S310 may be performed subsequently after the process of adjusting the phase of the imaging synchronization signal in step S304. The process of step S310 in this case is similar to the process of step S310 in the image transfer system 1 according to the first embodiment to the image transfer system 3 according to the third embodiment. In the flowchart of the processing procedure of the image transfer system 4 shown in FIG. 19, the process of step S310 performed subsequently after the process of step S304 is not shown.

In this configuration and the processing procedure, in the image transfer system 4, the display terminal 2200 measures (calculates) the round-trip time in the wireless transfer between the imaging terminal 2100 and the display terminal 2200 by transmitting the round-trip time measurement outward signal. Even in the image transfer system 4, the imaging terminal 2100 determines whether the phase of the imaging synchronization signal is adjusted based on the round-trip time measured (calculated) by the display terminal 1200. In the image transfer system 4, the display terminal 2200 outputs the phase adjustment instruction to adjust the phase of the imaging synchronization signal. Then, in the image transfer system 4, the imaging terminal 1100 adjusts the phase of the generated imaging synchronization signal. Thus, even in the image transfer system 4, as in the image transfer system 1 according to the first embodiment to the image transfer system 3 according to the third embodiment, the phase and the period (at least the phase) of the imaging synchronization signal generated by the imaging terminal 2100 (more specifically, the synchronization signal generation unit 102) are adjusted so that the phase and the period of the imaging synchronization signal match the phase and the period (at least the phase) of the display synchronization signal generated by the display terminal 2200. That is, even in the image transfer system 4, as in the image transfer system 1 according to the first embodiment to the image transfer system 3 according to the third embodiment, a timing at which the imaging terminal 2100 wirelessly delivers the captured image data of the image captured by the imaging unit (not shown) to the display terminal 2200 matches a timing at which the display terminal 2200 causes the display unit (not shown) to display the image in accordance with the captured image data. Thus, even in the image transfer system 4, as in the image transfer system 1 according to the first embodiment to the image transfer system 3 according to the third embodiment, the display terminal 2200 can stably cause the display unit (not shown) to display the image in accordance with the captured image data wirelessly delivered from the imaging terminal 2100.

As described above, in the image transfer system 4 according to the fourth embodiment, after the wireless connection between the imaging terminal 2100 and the display terminal 2200 is established, the round-trip time measurement outward signal and the round-trip time measurement return signal are transmitted and received between the round-trip time measurement unit 2202 included in the display terminal 2200 and the round-trip time measurement assisting unit 2106 included in the imaging terminal 2100. Then, in the image transfer system 4 according to the fourth embodiment, the round-trip time measurement unit 2202 calculates a round-trip time necessary for transmission and reception in the wireless transfer between the imaging terminal 2100 and the display terminal 2200 based on the transmission time of the round-trip time measurement outward signal and the reception time of the round-trip time measurement return signal in accordance with the round-trip time measurement outward signal transmitted from the round-trip time measurement assisting unit 2106, and transmits the round-trip time to the imaging terminal 2100. Then, in the image transfer system 4 according to the fourth embodiment, the phase adjustment determination unit 2110 included in the imaging terminal 2100 determines whether the phase of the imaging synchronization signal generated by the synchronization signal generation unit 102 included in the imaging terminal 2100 is adjusted based on the round-trip time calculated by the round-trip time measurement unit 2202 and the phase adjustment determination result of the determination result to the display terminal 2200. Then, in the image transfer system 4 according to the fourth embodiment, when the phase adjustment determination unit 2110 determines that the phase of the imaging synchronization signal is adjusted, the phase adjustment unit 2109 included in the display terminal 2200 generates the phase adjustment instruction to adjust the phase of the imaging synchronization signal and transmits the phase adjustment instruction to the imaging terminal 2100. Thus, in the image transfer system 4 according to the fourth embodiment, the synchronization signal generation unit 102 included in the imaging terminal 2100 adjusts the phase of the generated imaging synchronization signal in accordance with the phase adjustment instruction output from the phase adjustment unit 2109.

Thus, even in the image transfer system 4 according to the fourth embodiment, as in the image transfer system 1 according to the first embodiment to the image transfer system 3 according to the third embodiment, the phase and the period (at least the phase) of the imaging synchronization signal can match the phase and the period (at least the phase) of the display synchronization signal. That is, even in the image transfer system 4 according to the fourth embodiment, the phase and the period (at least the phase) of the imaging synchronization signal can match the phase and the period (at least the phase) of the display synchronization signal even when the phases of the imaging synchronization signal and the display synchronization signal deviate from one another over time due to an error of the phase and the period between the imaging standard clock signal and the display standard clock signal. Thus, even in the image transfer system 4 according to the fourth embodiment, it is possible to obtain similar advantages as those of the image transfer system 1 according to the first embodiment to the image transfer system 3 according to the third embodiment. That is, even in the image transfer system 4 according to the fourth embodiment, as in the image transfer system 1 according to the first embodiment to the image transfer system 3 according to the third embodiment, the captured image data can be wirelessly delivered from the imaging terminal 2100 to the display terminal 2200 without exceeding a valid period of a display image, and thus the display terminal 2200 can display the display image stably in accordance with the captured image data transmitted from the imaging terminal 2100.

Further, in the image transfer system 4 according to the fourth embodiment, the display terminal 2200 calculates the round-trip time necessary for transmission and reception in the wireless transfer between the imaging terminal 2100 and the display terminal 2200. In the image transfer system 4 according to the fourth embodiment, the display terminal 2200 generates the phase adjustment instruction to adjust the phase of the imaging synchronization signal. Thus, in the image transfer system 4 according to the fourth embodiment, it is not necessary to calculate the round-trip time and generate the phase adjustment instruction in the imaging terminal 2100, and it is possible to reduce a load of the process performed in the imaging terminal 2100.

Fifth Embodiment

Figure 20:
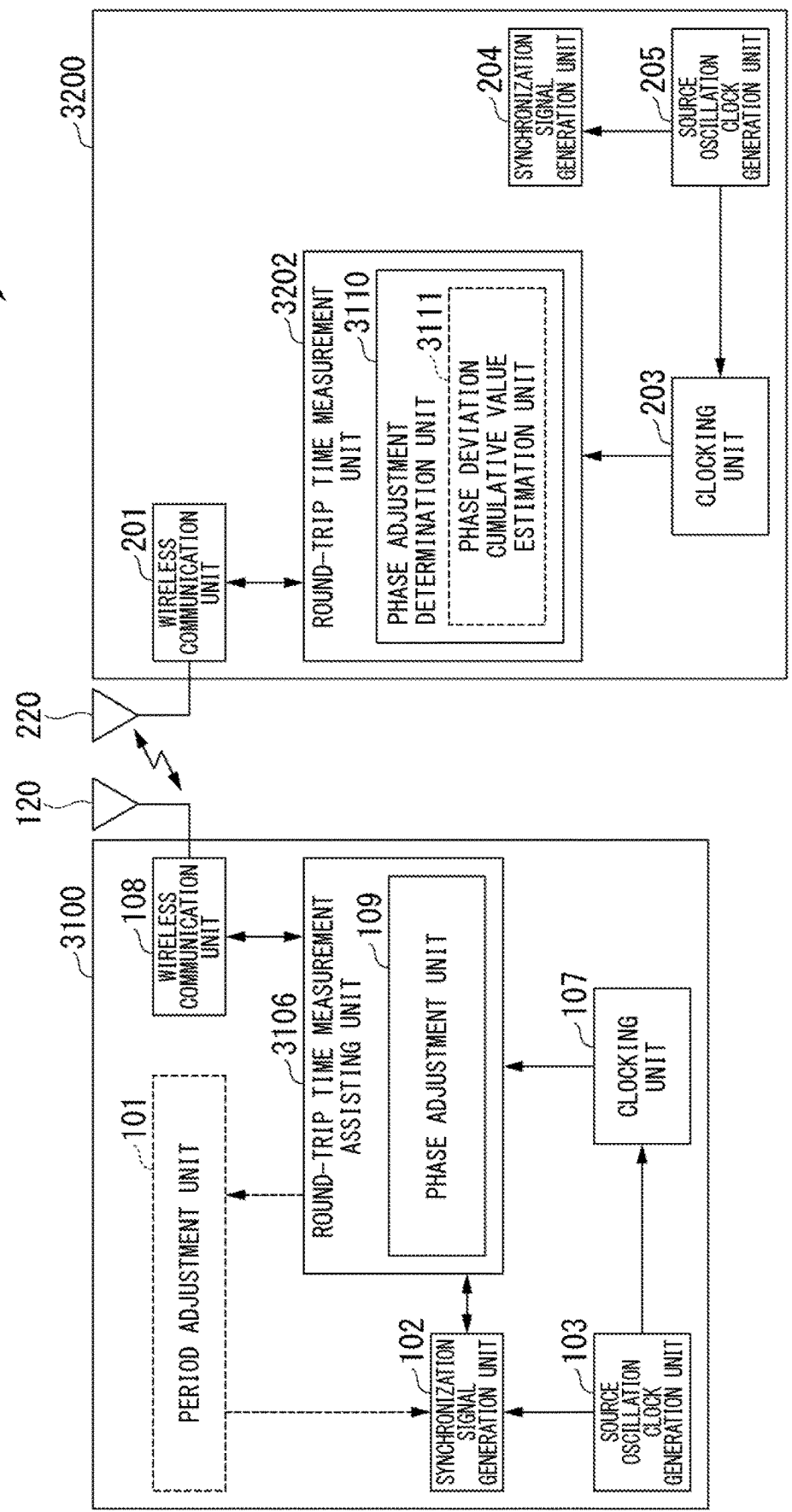
FIG. 20 is a block diagram showing an overall configuration of an image transfer system according to a fifth embodiment of the present invention.

Hereinafter, an image transfer system according to a fifth embodiment of the present invention will be described. FIG. 20 is a block diagram showing an overall configuration of the image transfer system according to the fifth embodiment of the present invention. An image transfer system 5 includes an imaging terminal 3100 and a display terminal 3200. The imaging terminal 3100 includes a synchronization signal generation unit 102, a period adjustment unit 101, a source oscillation clock generation unit 103, a wireless communication unit 108, a round-trip time measurement assisting unit 3106, a clocking unit 107, a phase adjustment unit 109, and an antenna 120. The display terminal 3200 includes a synchronization signal generation unit 204, a source oscillation clock generation unit 205, a wireless communication unit 201, a round-trip time measurement unit 3202, a clocking unit 203, a phase adjustment determination unit 3110, a phase deviation cumulative value estimation unit 3111, and an antenna 220.

In FIG. 20, in the constituent elements of the image transfer system 5, the same reference numbers are given to similar constituent elements to the constituent elements included in the image transfer system 1 according to the first embodiment and the image transfer system 2 according to the second embodiment shown in FIG. 2.

The image transfer system 5 is also an image transfer system in which a round-trip time measurement outward signal and a round-trip time measurement return signal are transmitted and received between the imaging terminal 3100 and the display terminal 3200 and the imaging terminal 3100 adjusts a phase and a period (at least a phase) of a generated imaging synchronization signal so that the phase and the period of the imaging synchronization signal match a phase and a period (at least a phase) of a display synchronization signal generated by the display terminal 3200, as in the image transfer system 1 according to the first embodiment to the image transfer system 4 according to the fourth embodiment. As in the image transfer system 3 according to the third embodiment, the image transfer system 5 is an image transfer system in which the display terminal 3200 calculates a round-trip time in the wireless transfer between the imaging terminal 3100 and the display terminal 3200 by transmitting the round-trip time measurement outward signal to the imaging terminal 3100, and the imaging terminal 3100 adjusts the phase and the period (at least the phase) of the generated imaging synchronization signal.

Here, in the image transfer system 5, some of the constituent elements included in the imaging terminal 1100 in the image transfer system 3 according to the third embodiment are moved to the display terminal 3200. More specifically, in the image transfer system 5, the display terminal 3200 includes the phase adjustment determination unit 3110 replacing the phase adjustment determination unit 110 included in the imaging terminal 1100 in the image transfer system 3 according to the third embodiment and the phase deviation cumulative value estimation unit 3111 replacing the phase deviation cumulative value estimation unit 111. More specifically, in the image transfer system 5, the phase adjustment determination unit 3110 including the phase deviation cumulative value estimation unit 3111 is included in the round-trip time measurement unit 3202 included in the display terminal 3200.

Therefore, in the image transfer system 5, the display terminal 3200 transmits a phase adjustment determination result obtained by determining whether the phase of the imaging synchronization signal generated by the synchronization signal generation unit 102 included in the imaging terminal 3100 is adjusted to the imaging terminal 3100. Then, in the image transfer system 5, the imaging terminal 3100 outputs the phase adjustment instruction to adjust the phase of the imaging synchronization signal based on the information regarding the round-trip time and the phase adjustment determination result transmitted from the display terminal 3200 to the synchronization signal generation unit 102, and adjusts the phase of the generated imaging synchronization signal.

However, in the image transfer system 5, there is a process of exchanging signals through the wireless transfer with a change in disposition of a constituent element, but a function and an operation of each constituent element are similar to a function and an operation of a corresponding constituent element in the image transfer system 1 according to the first embodiment and the image transfer system 2 according to the second embodiment. That is, a function and an operation of each constituent element included in the imaging terminal 3100 and the display terminal 3200 in the image transfer system 5 can be easily understood from the above description of each constituent element included in the imaging terminal 100 and the display terminal 200 in the image transfer system 1 according to the first embodiment and the image transfer system 2 according to the second embodiment. Accordingly, detailed description of each constituent element included in the image transfer system 5 will be omitted.

Figure 21:
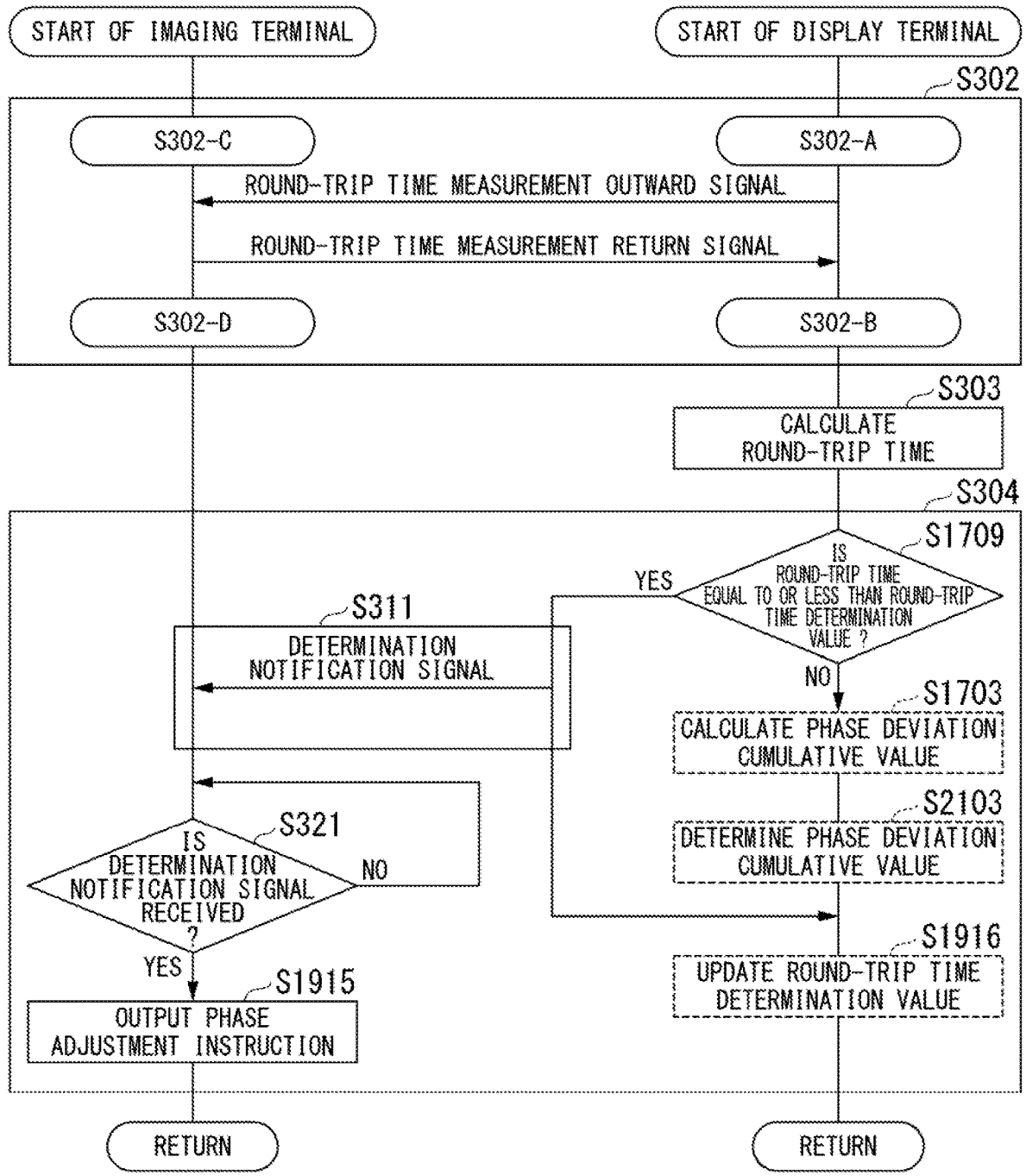
FIG. 21 is a flowchart showing a processing procedure of the image transfer system according to the fifth embodiment of the present invention.

Next, an operation of a process in the image transfer system 5 will be described. In the image transfer system 5, a process of transmitting information regarding the round-trip time to the imaging terminal 3100 is not performed and a process of transmitting information regarding the phase adjustment determination result to the imaging terminal 3100 is added with a change to a configuration in which the phase adjustment determination unit 3110 and the phase deviation cumulative value estimation unit 3111 are included in the display terminal 3200. However, an overview of an overall operation in the image transfer system 5 is similar to that of the image transfer system 1 according to the first embodiment and the image transfer system 2 according to the second embodiment. Accordingly, in the image transfer system 5, description of the overview of the overall operation will be omitted and a more specific operation of adjusting the phase of the imaging synchronization signal in the image transfer system 5 will be described. FIG. 21 is a flowchart showing a processing procedure of the image transfer system 5 according to the fifth embodiment of the present invention.

In the image transfer system 5, when the phase adjustment process starts, the display terminal 3200 transmits the round-trip time measurement outward signal to the imaging terminal 3100, and the imaging terminal 3100 transmits the round-trip time measurement return signal in accordance with the round-trip time measurement outward signal to the display terminal 3200 in step S302. The process of step S302 in the image transfer system 5 is similar to the process of step S302 in the image transfer system 3 according to the third embodiment.

Thereafter, in the image transfer system 5, in step S303, the display terminal 3200 calculates the round-trip time necessary for transmission and reception in the wireless transfer between the imaging terminal 3100 and the display terminal 3200. The process of step S303 in the image transfer system 5 is also similar to the process of step S303 in the image transfer system 3 according to the third embodiment.

Thereafter, in the image transfer system 5, in step S304, the display terminal 3200 adjusts the phase of the imaging synchronization signal based on the information regarding the round-trip time calculated in step S303. More specifically, in step S304, the phase adjustment determination unit 3110 determines whether the round-trip time calculated by the round-trip time measurement unit 3202 is equal to or less than the pre-decided round-trip time determination value (step S1709).

When the round-trip time is not equal to or less than the pre-decided round-trip time determination value, that is, the round-trip time calculated by the round-trip time measurement unit 3202 included in the display terminal 3200 is greater than the pre-decided round-trip time determination value in a determination result of step S1709 ("NO" in step S1709), the phase adjustment determination unit 3110 determines that the phase adjustment is not performed, and the process of step S304 ends.

In this case, even in the image transfer system 5, the phase deviation cumulative value estimation unit 3111 may estimate a deviation amount between the phases of the imaging synchronization signal and the display synchronization signal and may update the pre-decided round-trip time determination value used when the phase adjustment determination unit 3110 determines whether the phase of the imaging synchronization signal is adjusted based on the estimation result. Since the process (step S1703 to step S1916) of estimating the deviation amount between the phases of the imaging synchronization signal and the display synchronization signal and updating the round-trip time determination value in the image transfer system 5 is the same as that of the image transfer system 1 according to the first embodiment to the image transfer system 4 according to the fourth embodiment, detailed description thereof will be omitted.

Conversely, when the round-trip time is equal to or less than the pre-decided round-trip time determination value in a determination result of step S1709 ("YES" in step S1709), the phase adjustment determination unit 3110 determines that the phase adjustment is performed. In this case, the phase adjustment determination unit 3110 generates a determination notification signal including the phase adjustment determination result indicating the determination result and transmits the generated determination notification signal to the display terminal 3200 (step S311). More specifically, the phase adjustment determination unit 3110 generates a determination notification signal including the information regarding the phase adjustment determination result and the information regarding the round-trip time calculated by the round-trip time measurement unit 3202. Then, the phase adjustment determination unit 3110 outputs the generated determination notification signal to the wireless communication unit 201 to transmit the determination notification signal to the phase adjustment unit 109 via the wireless communication unit 201 and the antenna 220.

In this case, even in the image transfer system 5, the phase adjustment determination unit 3110 may perform the process of step S1916 of updating the round-trip time of a small value determined to be equal to or less than the pre-decided round-trip time determination value to the round-trip time determination value at the time of subsequent determination of the round-trip time. Since the process of step S1916 in the image transfer system 5 is also the same as the process of step S1916 of the image transfer system 1 according to the first embodiment to the image transfer system 4 according to the fourth embodiment, detailed description thereof will be omitted.

The imaging terminal 3100 confirms whether the determination notification signal transmitted from the display terminal 3200 is received (step S321). More specifically, the phase adjustment unit 109 confirms whether the information regarding the round-trip time and the phase adjustment determination result determined by the phase adjustment determination unit 3110 are acquired. When the information regarding the round-trip time and the phase adjustment determination result determined by the phase adjustment determination unit 3110 are not acquired in a confirmation result of step S321 ("NO" in step S321), the phase adjustment unit 109 returns the process to step S321 and repeats step S321 until the information regarding the round-trip time and the phase adjustment determination result are acquired from the phase adjustment determination unit 3110. Conversely, when the information regarding the round-trip time and the phase adjustment determination result determined by the phase adjustment determination unit 3110 are acquired in a confirmation result of step S321 ("YES" in step S321), the phase adjustment unit 109 outputs the phase adjustment instruction to adjust the phase of the imaging synchronization signal to the synchronization signal generation unit 102 based on the acquired information regarding the round-trip time and phase adjustment determination result (step S1915). Thus, the synchronization signal generation unit 102 adjusts the phase of the generated imaging synchronization signal in accordance with the phase adjustment instruction output from the phase adjustment unit 109.

In this way, in the image transfer system 5, the display terminal 3200 transmits the round-trip time measurement outward signal, calculates the round-trip time in the wireless transfer between the imaging terminal 3100 and the display terminal 3200, and transmits the phase adjustment determination result obtained by determining whether the phase of the imaging synchronization signal is adjusted. In the image transfer system 5, the imaging terminal 3100 generates the phase adjustment instruction. Thus, in the image transfer system 5, the imaging terminal 3100 adjusts the phases of the imaging synchronization signal and the display synchronization signal so that the phases do not deviate over time.

Even in the image transfer system 5, as in the image transfer system 1 according to the first embodiment to the image transfer system 4 according to the fourth embodiment, the process of adjusting the period of the imaging synchronization signal in step S310 may be performed subsequently after the process of adjusting the phase of the imaging synchronization signal in step S304. The process of step S310 in this case is similar to the process of step S310 in the image transfer system 1 according to the first embodiment to the image transfer system 4 according to the fourth embodiment. In the flowchart of the processing procedure of the image transfer system 5 shown in FIG. 21, the process of step S310 performed subsequently after the process of step S304 is not shown.

In this configuration and the processing procedure, in the image transfer system 5, the display terminal 3200 measures (calculates) the round-trip time in the wireless transfer between the imaging terminal 3100 and the display terminal 3200 by transmitting the round-trip time measurement outward signal. Even in the image transfer system 5, the display terminal 3200 determines whether the phase of the imaging synchronization signal is adjusted based on the measured (calculated) round-trip time and outputs the phase adjustment determination result of the determination result. In the image transfer system 5, the imaging terminal 3100 generates the phase adjustment instruction to adjust the phase of the imaging synchronization signal based on the phase adjustment determination result and the information regarding the round-trip time measured (calculated) by the display terminal 3200 and adjusts the phase of the generated imaging synchronization signal. Thus, even in the image transfer system 5, as in the image transfer system 1 according to the first embodiment to the image transfer system 4 according to the fourth embodiment, the phase and the period (at least the phase) of the imaging synchronization signal generated by the imaging terminal 3100 (more specifically, the synchronization signal generation unit 102) are adjusted so that the phase and the period of the imaging synchronization signal match the phase and the period (at least the phase) of the display synchronization signal generated by the display terminal 3200. That is, even in the image transfer system 5, as in the image transfer system 1 according to the first embodiment to the image transfer system 4 according to the fourth embodiment, a timing at which the imaging terminal 3100 wirelessly delivers the captured image data of the image captured by the imaging unit (not shown) to the display terminal 3200 matches a timing at which the display terminal 3200 causes the display unit (not shown) to display the image in accordance with the captured image data. Thus, even in the image transfer system 5, as in the image transfer system 1 according to the first embodiment to the image transfer system 4 according to the fourth embodiment, the display terminal 3200 can stably cause the display unit (not shown) to display the image in accordance with the captured image data wirelessly delivered from the imaging terminal 3100.

As described above, in the image transfer system 5 according to the fifth embodiment, after the wireless connection between the imaging terminal 3100 and the display terminal 3200 is established, the round-trip time measurement outward signal and the round-trip time measurement return signal are transmitted and received between the round-trip time measurement unit 3202 included in the display terminal 3200 and the round-trip time measurement assisting unit 3106 included in the imaging terminal 3100. Then, in the image transfer system 5 according to the fifth embodiment, the round-trip time measurement unit 3202 calculates a round-trip time necessary for transmission and reception in the wireless transfer between the imaging terminal 3100 and the display terminal 3200 based on the transmission time of the round-trip time measurement outward signal and the reception time of the round-trip time measurement return signal in accordance with the round-trip time measurement outward signal transmitted from the round-trip time measurement assisting unit 3106. Then, in the image transfer system 5 according to the fifth embodiment, the phase adjustment determination unit 3110 included in the display terminal 3200 determines whether the phase of the imaging synchronization signal generated by the synchronization signal generation unit 102 included in the imaging terminal 3100 is adjusted based on the round-trip time calculated by the round-trip time measurement unit 3202 and transmits the phase adjustment determination result of the determination result to the imaging terminal 3100. Then, in the image transfer system 5 according to the fifth embodiment, the phase adjustment unit 109 included in the imaging terminal 3100 generates the phase adjustment instruction to adjust the phase of the imaging synchronization signal based on the phase adjustment determination result transmitted from the display terminal 3200 and outputs the phase adjustment instruction. Thus, in the image transfer system 5 according to the fifth embodiment, the synchronization signal generation unit 102 included in the imaging terminal 3100 adjusts the phase of the generated imaging synchronization signal in accordance with the phase adjustment instruction output from the phase adjustment unit 109.

Thus, even in the image transfer system 5 according to the fifth embodiment, as in the image transfer system 1 according to the first embodiment to the image transfer system 4 according to the fourth embodiment, the phase and the period (at least the phase) of the imaging synchronization signal can match the phase and the period (at least the phase) of the display synchronization signal. That is, even in the image transfer system 5 according to the fifth embodiment, the phase and the period (at least the phase) of the imaging synchronization signal can match the phase and the period (at least the phase) of the display synchronization signal even when the phases of the imaging synchronization signal and the display synchronization signal deviate from one another over time due to an error of the phase and the period between the imaging standard clock signal and the display standard clock signal. Thus, even in the image transfer system 5 according to the fifth embodiment, it is possible to obtain similar advantages as those of the image transfer system 1 according to the first embodiment to the image transfer system 4 according to the fourth embodiment. That is, even in the image transfer system 5 according to the fifth embodiment, as in the image transfer system 1 according to the first embodiment to the image transfer system 4 according to the fourth embodiment, the captured image data can be wirelessly delivered from the imaging terminal 3100 to the display terminal 3200 without exceeding a valid period of a display image, and thus the display terminal 3200 can display the display image stably in accordance with the captured image data transmitted from the imaging terminal 3100.

Further, in the image transfer system 5 according to the fifth embodiment, the display terminal 3200 calculates the round-trip time necessary for transmission and reception in the wireless transfer between the imaging terminal 3100 and the display terminal 3200 and determines whether the phase of the generated imaging synchronization signal is adjusted. Thus, in the image transfer system 5 according to the fifth embodiment, it is not necessary to calculate the round-trip time and determine whether the phase adjustment is performed in the imaging terminal 3100, and it is possible to reduce a load of the process performed in the imaging terminal 3100.

Sixth Embodiment

Figure 22:
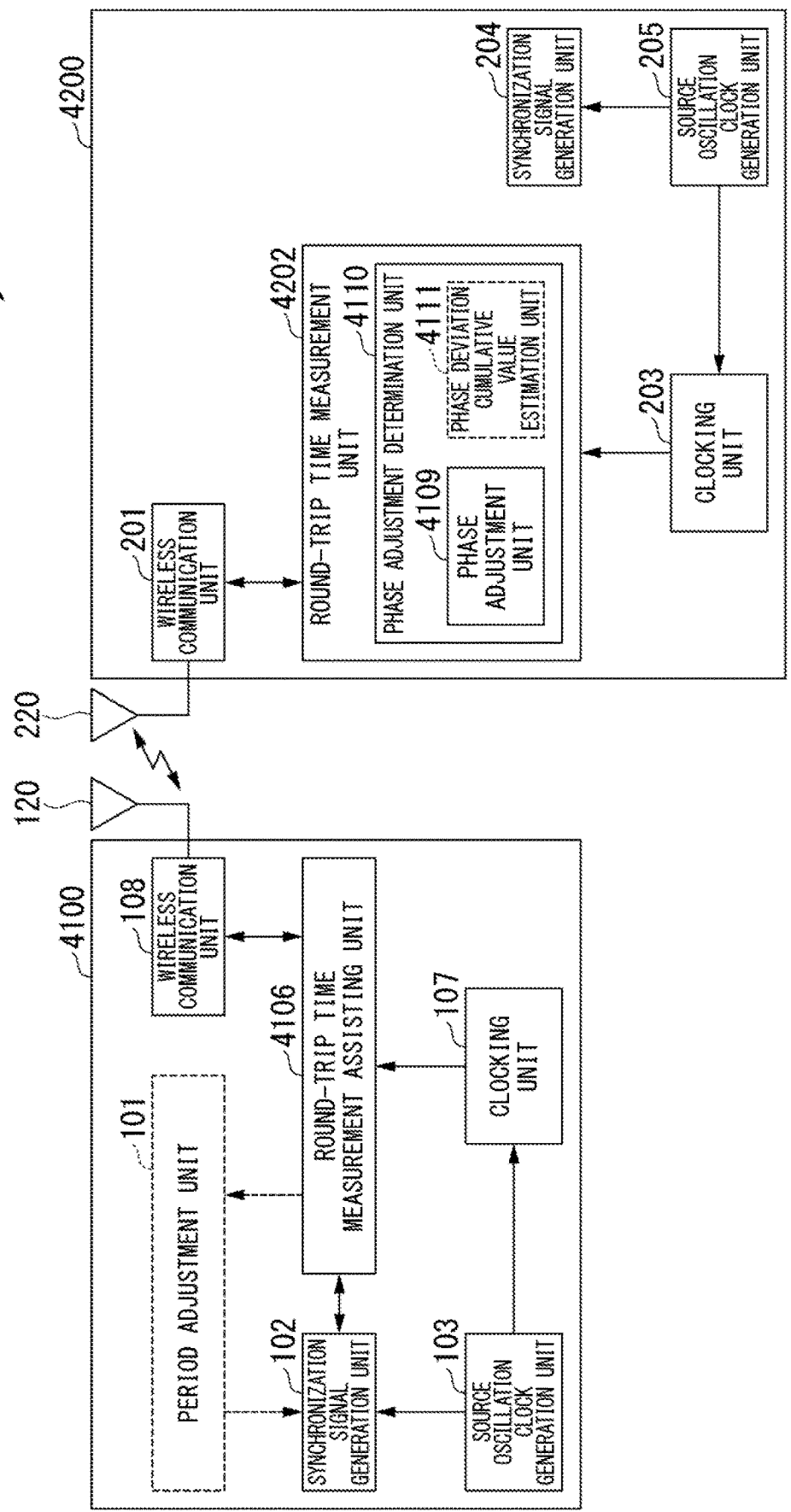
FIG. 22 is a block diagram showing an overall configuration of an image transfer system according to a sixth embodiment of the present invention.

Hereinafter, an image transfer system according to a sixth embodiment of the present invention will be described. FIG. 22 is a block diagram showing an overall configuration of the image transfer system according to the sixth embodiment of the present invention. An image transfer system 6 includes an imaging terminal 4100 and a display terminal 4200. The imaging terminal 4100 includes a synchronization signal generation unit 102, a period adjustment unit 101, a source oscillation clock generation unit 103, a wireless communication unit 108, a round-trip time measurement assisting unit 4106, a clocking unit 107, and an antenna 120. The display terminal 4200 includes a synchronization signal generation unit 204, a source oscillation clock generation unit 205, a wireless communication unit 201, a round-trip time measurement unit 4202, a clocking unit 203, a phase adjustment unit 4109, a phase adjustment determination unit 4110, a phase deviation cumulative value estimation unit 4111, and an antenna 220.

In FIG. 22, in the constituent elements of the image transfer system 6, the same reference numbers are given to similar constituent elements to the constituent elements included in the image transfer system 1 according to the first embodiment and the image transfer system 2 according to the second embodiment shown in FIG. 2.

The image transfer system 6 is also an image transfer system in which a round-trip time measurement outward signal and a round-trip time measurement return signal are transmitted and received between the imaging terminal 4100 and the display terminal 4200 and the imaging terminal 4100 adjusts a phase and a period (at least a phase) of a generated imaging synchronization signal so that the phase and the period of the imaging synchronization signal match a phase and a period (at least a phase) of a display synchronization signal generated by the display terminal 4200, as in the image transfer system 1 according to the first embodiment to the image transfer system 5 according to the fifth embodiment. As in the image transfer system 3 according to the third embodiment, the image transfer system 6 is an image transfer system in which the display terminal 4200 calculates a round-trip time in the wireless transfer between the imaging terminal 4100 and the display terminal 4200 by transmitting the round-trip time measurement outward signal to the imaging terminal 4100, and the imaging terminal 4100 adjusts the phase and the period (at least the phase) of the generated imaging synchronization signal.

Here, in the image transfer system 6, some of the constituent elements included in the imaging terminal 1100 in the image transfer system 3 according to the third embodiment are moved to the display terminal 4200. More specifically, in the image transfer system 6, the display terminal 4200 includes the phase adjustment determination unit 4110 replacing the phase adjustment determination unit 110, the phase adjustment unit 4109 replacing the phase adjustment unit 109, and the phase deviation cumulative value estimation unit 4111 replacing the phase deviation cumulative value estimation unit 111 included in the imaging terminal 1100 in the image transfer system 3 according to the third embodiment. More specifically, in the image transfer system 6, the phase adjustment determination unit 4110 including the phase adjustment unit 4109 and the phase deviation cumulative value estimation unit 4111 is included in the round-trip time measurement unit 4202 included in the display terminal 4200.

The configuration of the image transfer system 6 is equivalent to a configuration in which the display terminal 4200 includes the constituent elements of the phase adjustment determination unit 110, the phase adjustment unit 109, and the phase deviation cumulative value estimation unit 111 inside the round-trip time measurement assisting unit 1106 included in the imaging terminal 1100 of the image transfer system 3 according to the third embodiment. The configuration of the image transfer system 6 is equivalent to a configuration in which the display terminal 4200 includes the constituent elements of the round-trip time measurement unit 106, the phase adjustment unit 109, the phase adjustment determination unit 110, and the phase deviation cumulative value estimation unit 111 included in the imaging terminal 100 of the image transfer system 1 according to the first embodiment and the image transfer system 2 according to the second embodiment. In other words, the image transfer system 6 has a configuration in which the display terminal 4200 performs processes from calculation of the round-trip time necessary for transmission and reception of the wireless transfer between the imaging terminal 4100 and the display terminal 4200 to generation of the phase adjustment instruction to adjust the phase of the imaging synchronization signal and transmits the phase adjustment instruction to the imaging terminal 4100, and the imaging terminal 4100 adjusts the phase of the generated imaging synchronization signal in accordance with the phase adjustment instruction transmitted from the display terminal 4200.

Therefore, even in the image transfer system 6, there is a process of exchanging signals through the wireless transfer with a change in disposition of a constituent element, but a function and an operation of each constituent element are similar to a function and an operation of a corresponding constituent element in the image transfer system 1 according to the first embodiment and the image transfer system 2 according to the second embodiment. That is, a function and an operation of each constituent element included in the imaging terminal 4100 and the display terminal 4200 in the image transfer system 6 can be easily understood from the above description of each constituent element included in the imaging terminal 100 and the display terminal 200 in the image transfer system 1 according to the first embodiment and the image transfer system 2 according to the second embodiment. Accordingly, detailed description of each constituent element included in the image transfer system 6 will be omitted.

Figure 23:
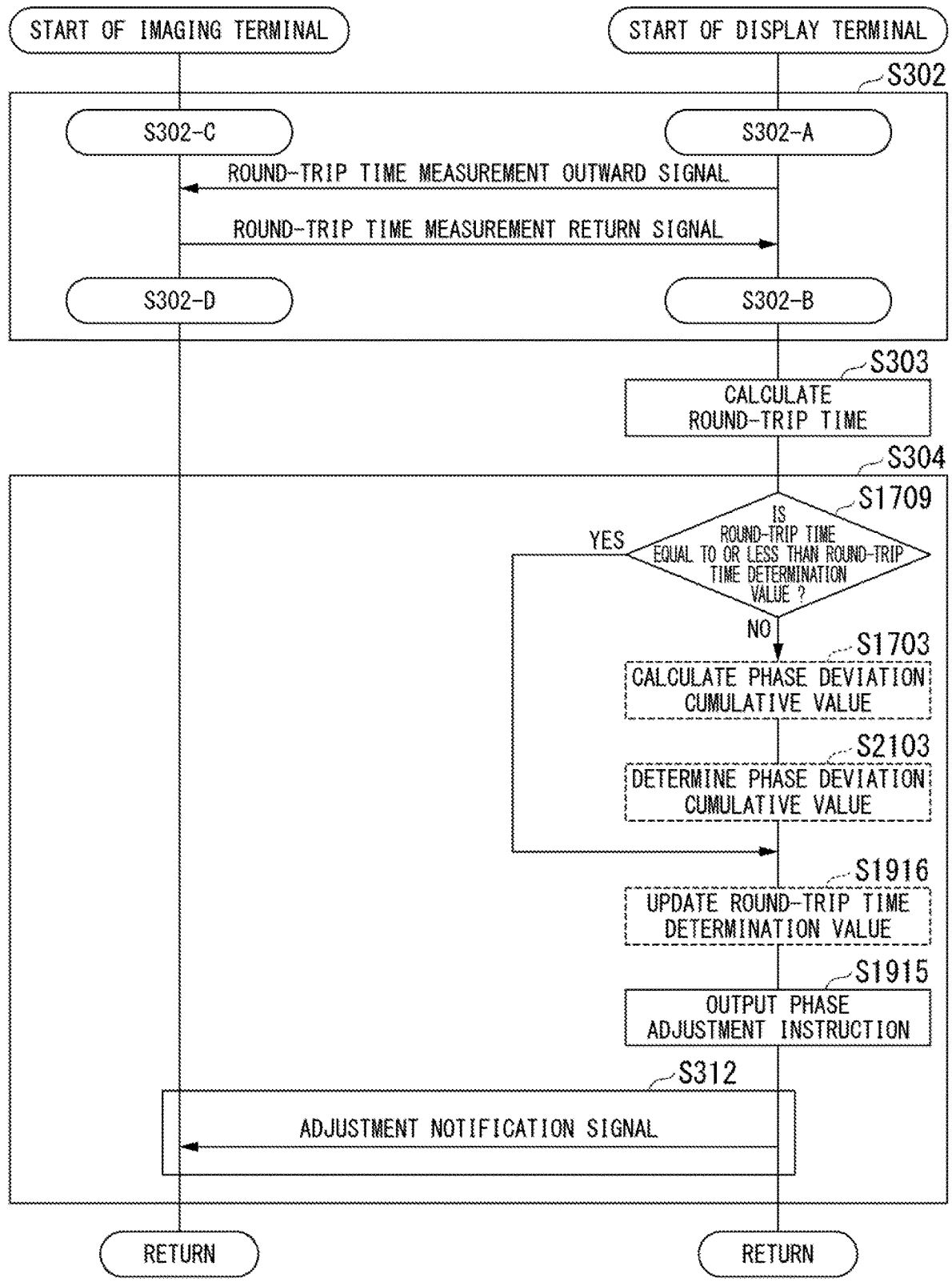
FIG. 23 is a flowchart showing a processing procedure of the image transfer system according to the sixth embodiment of the present invention.

Next, an operation of a process in the image transfer system 6 will be described. In the image transfer system 6, a process of transmitting information regarding the round-trip time to the imaging terminal 4100 and a process of transmitting the information regarding the phase adjustment determination result are not performed, and a process of transmitting information regarding the phase adjustment instruction to the imaging terminal 4100 is added with a change to a configuration in which the phase adjustment unit 4109, the phase adjustment determination unit 4110 are not performed, and the phase deviation cumulative value estimation unit 4111 are included in the display terminal 4200. However, an overview of an overall operation in the image transfer system 6 is similar to that of the image transfer system 1 according to the first embodiment and the image transfer system 2 according to the second embodiment. Accordingly, in the image transfer system 6, description of the overview of the overall operation will be omitted and a more specific operation of adjusting the phase of the imaging synchronization signal in the image transfer system 6 will be described. FIG. 23 is a flowchart showing a processing procedure of the image transfer system 6 according to the sixth embodiment of the present invention.

In the image transfer system 6, when the phase adjustment process starts, the display terminal 4200 transmits the round-trip time measurement outward signal to the imaging terminal 4100, and the imaging terminal 4100 transmits the round-trip time measurement return signal in accordance with the round-trip time measurement outward signal to the display terminal 4200 in step S302. The process of step S302 in the image transfer system 6 is similar to the process of step S302 in the image transfer system 3 according to the third embodiment.

Thereafter, in the image transfer system 6, in step S303, the display terminal 4200 calculates the round-trip time necessary for transmission and reception in the wireless transfer between the imaging terminal 4100 and the display terminal 4200. The process of step S303 in the image transfer system 6 is also similar to the process of step S303 in the image transfer system 3 according to the third embodiment.

Thereafter, in the image transfer system 6, in step S304, the display terminal 4200 adjusts the phase of the imaging synchronization signal based on the information regarding the round-trip time calculated in step S303. Here, in the image transfer system 6, the display terminal 4200 outputs the phase adjustment instruction to the synchronization signal generation unit 102 included in the imaging terminal 4100.

More specifically, in step S304, the phase adjustment determination unit 4110 determines whether the round-trip time calculated by the round-trip time measurement unit 4202 is equal to or less than the pre-decided round-trip time determination value (step S1709).

When the round-trip time is not equal to or less than the pre-decided round-trip time determination value, that is, the round-trip time calculated by the round-trip time measurement unit 4202 included in the display terminal 4200 is greater than the pre-decided round-trip time determination value in a determination result of step S1709 ("NO" in step S1709), the phase adjustment determination unit 4110 determines that the phase adjustment is not performed, and the process of step S304 ends. When the phase adjustment determination unit 4110 determines that the calculated round-trip time is not equal to or less than the pre-decided round-trip time determination value in a determination result of step S1709 ("NO" in step S1709), the process of step S1915 may not be performed and the process of step S304 may end. That is, when the phase adjustment determination unit 4110 determines that the phase adjustment is not performed, the phase adjustment instruction may not be output to the phase adjustment unit 4109.

In this case, even in the image transfer system 6, the phase deviation cumulative value estimation unit 4111 may estimate a deviation amount between the phases of the imaging synchronization signal and the display synchronization signal and may update the pre-decided round-trip time determination value used when the phase adjustment determination unit 4110 determines whether the phase of the imaging synchronization signal is adjusted based on the estimation result. Since the process (step S1703 to step S1916) of estimating the deviation amount between the phases of the imaging synchronization signal and the display synchronization signal and updating the round-trip time determination value in the image transfer system 6 is the same as that of the image transfer system 1 according to the first embodiment to the image transfer system 5 according to the fifth embodiment, detailed description thereof will be omitted.

Conversely, when the round-trip time is equal to or less than the pre-decided round-trip time determination value in a determination result of step S1709 ("YES" in step S1709), the phase adjustment determination unit 4110 determines that the phase adjustment is performed. In this case, the phase adjustment determination unit 4110 outputs the information regarding the round-tip time and the phase adjustment determination result indicating the determination result to the phase adjustment unit 4109.

In this case, even in the image transfer system 6, the phase adjustment determination unit 4110 may perform the process of step S1916 of updating the round-trip time of a small value determined to be equal to or less than the pre-decided round-trip time determination value to the round-trip time determination value at the time of subsequent determination of the round-trip time. Since the process of step S1916 in the image transfer system 6 is also the same as the process of step S1916 of the image transfer system 1 according to the first embodiment to the image transfer system 5 according to the fifth embodiment, detailed description thereof will be omitted.

Then, the phase adjustment unit 4109 generates the adjustment notification signal including the phase adjustment instruction to adjust the phase of the imaging synchronization signal based on the information regarding the round-trip time and the phase adjustment determination result output from the phase adjustment determination unit 4110 (step S1915).

Then, the phase adjustment unit 4109 transmits the generated adjustment notification signal to the imaging terminal 4100 (step S312). Thus, the imaging terminal 4100 acquires the phase adjustment instruction generated by the phase adjustment unit 4109 included in the display terminal 4200. More specifically, the wireless communication unit 108 receives the adjustment notification signal transmitted from the display terminal 4200 via the antenna 120. Then, the wireless communication unit 108 outputs the information regarding the phase adjustment instruction included in the received adjustment notification signal to the round-trip time measurement assisting unit 4106. The round-trip time measurement assisting unit 4106 outputs the phase adjustment instruction output from the wireless communication unit 108 to the synchronization signal generation unit 102. Thus, the synchronization signal generation unit 102 adjusts the phase of the generated imaging synchronization signal in accordance with the phase adjustment instruction output from the round-trip time measurement assisting unit 4106, that is, the phase adjustment instruction transmitted from the phase adjustment unit 4109 included in the display terminal 4200.

In this way, in the image transfer system 6, the display terminal 4200 transmits the round-trip time measurement outward signal, calculates the round-trip time in the wireless transfer between the imaging terminal 4100 and the display terminal 4200, and generates and transmits the phase adjustment instruction based on the phase adjustment determination result obtained by determining whether the phase of the imaging synchronization signal is adjusted. Thus, in the image transfer system 6, the imaging terminal 4100 adjusts the phases of the imaging synchronization signal and the display synchronization signal so that the phases do not deviate over time in accordance with the phase adjustment instruction transmitted from the display terminal 4200.

Even in the image transfer system 6, as in the image transfer system 1 according to the first embodiment to the image transfer system 5 according to the fifth embodiment, the process of adjusting the period of the imaging synchronization signal in step S310 may be performed subsequently after the process of adjusting the phase of the imaging synchronization signal in step S304. The process of step S310 in this case is similar to the process of step S310 in the image transfer system 1 according to the first embodiment to the image transfer system 5 according to the fifth embodiment. In the flowchart of the processing procedure of the image transfer system 6 shown in FIG. 23, the process of step S310 performed subsequently after the process of step S304 is not shown.

In this configuration and the processing procedure, in the image transfer system 6, the display terminal 4200 measures (calculates) the round-trip time in the wireless transfer between the imaging terminal 4100 and the display terminal 4200 by transmitting the round-trip time measurement outward signal. Even in the image transfer system 6, the display terminal 4200 determines whether the phase of the imaging synchronization signal is adjusted based on the measured (calculated) round-trip time. In the image transfer system 6, the phase adjustment instruction to adjust the phase of the imaging synchronization signal based on the phase adjustment determination result of the determination result and the information regarding the measured (calculated) round-trip time is transmitted to the imaging terminal 4100. Then, in the image transfer system 6, the imaging terminal 4100 adjusts the phase of the generated imaging synchronization signal. Thus, even in the image transfer system 6, as in the image transfer system 1 according to the first embodiment to the image transfer system 5 according to the fifth embodiment, the phase and the period (at least the phase) of the imaging synchronization signal generated by the imaging terminal 4100 (more specifically, the synchronization signal generation unit 102) are adjusted so that the phase and the period of the imaging synchronization signal match the phase and the period (at least the phase) of the display synchronization signal generated by the display terminal 4200. That is, even in the image transfer system 6, as in the image transfer system 1 according to the first embodiment to the image transfer system 5 according to the fifth embodiment, a timing at which the imaging terminal 4100 wirelessly delivers the captured image data of the image captured by the imaging unit (not shown) to the display terminal 4200 matches a timing at which the display terminal 4200 causes the display unit (not shown) to display the image in accordance with the captured image data. Thus, even in the image transfer system 6, as in the image transfer system 1 according to the first embodiment to the image transfer system 5 according to the fifth embodiment, the display terminal 4200 can stably cause the display unit (not shown) to display the image in accordance with the captured image data wirelessly delivered from the imaging terminal 4100.

As described above, in the image transfer system 6 according to the sixth embodiment, after the wireless connection between the imaging terminal 4100 and the display terminal 4200 is established, the round-trip time measurement outward signal and the round-trip time measurement return signal are transmitted and received between the round-trip time measurement unit 4202 included in the display terminal 4200 and the round-trip time measurement assisting unit 4106 included in the imaging terminal 4100. Then, in the image transfer system 6 according to the sixth embodiment, the round-trip time measurement unit 4202 calculates a round-trip time necessary for transmission and reception in the wireless transfer between the imaging terminal 4100 and the display terminal 4200 based on the transmission time of the round-trip time measurement outward signal and the reception time of the round-trip time measurement return signal in accordance with the round-trip time measurement outward signal transmitted from the round-trip time measurement assisting unit 4106. Then, in the image transfer system 6 according to the sixth embodiment, the phase adjustment determination unit 4110 included in the display terminal 4200 determines whether the phase of the imaging synchronization signal generated by the synchronization signal generation unit 102 included in the imaging terminal 4100 is adjusted based on the round-trip time calculated by the round-trip time measurement unit 4202 and outputs the phase adjustment determination result of the determination result to the phase adjustment unit 4109. Then, in the image transfer system 6 according to the sixth embodiment, when the phase adjustment determination unit 4110 determines that the phase of the imaging synchronization signal is adjusted, the phase adjustment unit 4109 included in the display terminal 4200 generates the phase adjustment instruction to adjust the phase of the imaging synchronization signal and outputs the phase adjustment instruction to the imaging terminal 4100. Thus, in the image transfer system 6 according to the sixth embodiment, the synchronization signal generation unit 102 included in the imaging terminal 4100 adjusts the phase of the generated imaging synchronization signal in accordance with the phase adjustment instruction transmitted from the phase adjustment unit 4109.

Thus, even in the image transfer system 6 according to the sixth embodiment, as in the image transfer system 1 according to the first embodiment to the image transfer system 5 according to the fifth embodiment, the phase and the period (at least the phase) of the imaging synchronization signal can match the phase and the period (at least the phase) of the display synchronization signal. That is, even in the image transfer system 6 according to the sixth embodiment, the phase and the period (at least the phase) of the imaging synchronization signal can match the phase and the period (at least the phase) of the display synchronization signal even when the phases of the imaging synchronization signal and the display synchronization signal deviate from one another over time due to an error of the phase and the period between the imaging standard clock signal and the display standard clock signal. Thus, even in the image transfer system 6 according to the sixth embodiment, it is possible to obtain similar advantages as those of the image transfer system 1 according to the first embodiment to the image transfer system 5 according to the fifth embodiment. That is, even in the image transfer system 6 according to the sixth embodiment, as in the image transfer system 1 according to the first embodiment to the image transfer system 5 according to the fifth embodiment, the captured image data can be wirelessly delivered from the imaging terminal 4100 to the display terminal 4200 without exceeding a valid period of a display image, and thus the display terminal 4200 can display the display image stably in accordance with the captured image data transmitted from the imaging terminal 4100.

Further, in the image transfer system 6 according to the sixth embodiment, the display terminal 4200 performs calculation of the round-trip time necessary for transmission and reception of the wireless transfer between the imaging terminal 4100 and the display terminal 4200 to generation of the phase adjustment instruction to adjust the phase of the imaging synchronization signal, and transmits the phase adjustment instruction to the imaging terminal 4100. Thus, in the image transfer system 6 according to the sixth embodiment, it is not necessary to calculate the round-trip time, determine whether the phase adjustment is performed, and generate the phase adjustment instruction in the imaging terminal 4100, and it is possible to reduce a load of the process performed in the imaging terminal 4100.

In the image transfer system 1 according to the first embodiment and the image transfer system 2 according to the second embodiment, the imaging terminal 100 transmits the round-trip time measurement outward signal to the display terminal 200 and receives the round-trip time measurement return signal transmitted from the display terminal 200 to calculate the round-trip time, as described above. In the image transfer system 3 according to the third embodiment to the image transfer system 6 according to the sixth embodiment, the examples of the cases in which some constituent elements are moved to the other terminal have been described in the configuration in which the display terminal transmits the round-trip time measurement outward signal to the imaging terminal and receives the round-trip time measurement return signal transmitted from the imaging terminal to calculate the round-trip time in contrast to the image transfer system 1 according to the first embodiment and the image transfer system 2 according to the second embodiment. As described above, however, in the image transfer system according to the present invention, the function of adjusting the phase of the imaging synchronization signal generated by the imaging terminal can be realized similarly even in the configuration in which each constituent element adjusting the phase of the imaging synchronization signal generated by the imaging terminal is included in either the imaging terminal or the display terminal. That is, as in the image transfer system 1 according to the first embodiment and the image transfer system 2 according to the second embodiment, even when some constituent elements are moved to the other terminal, the function of adjusting the phase of the imaging synchronization signal generated by the imaging terminal can be realized similarly in the configuration in which the imaging terminal transmits the round-trip time measurement outward signal to the display terminal and receives the round-trip time measurement return signal transmitted from the display terminal to calculate the round-trip time.

Seventh Embodiment

Figure 24:
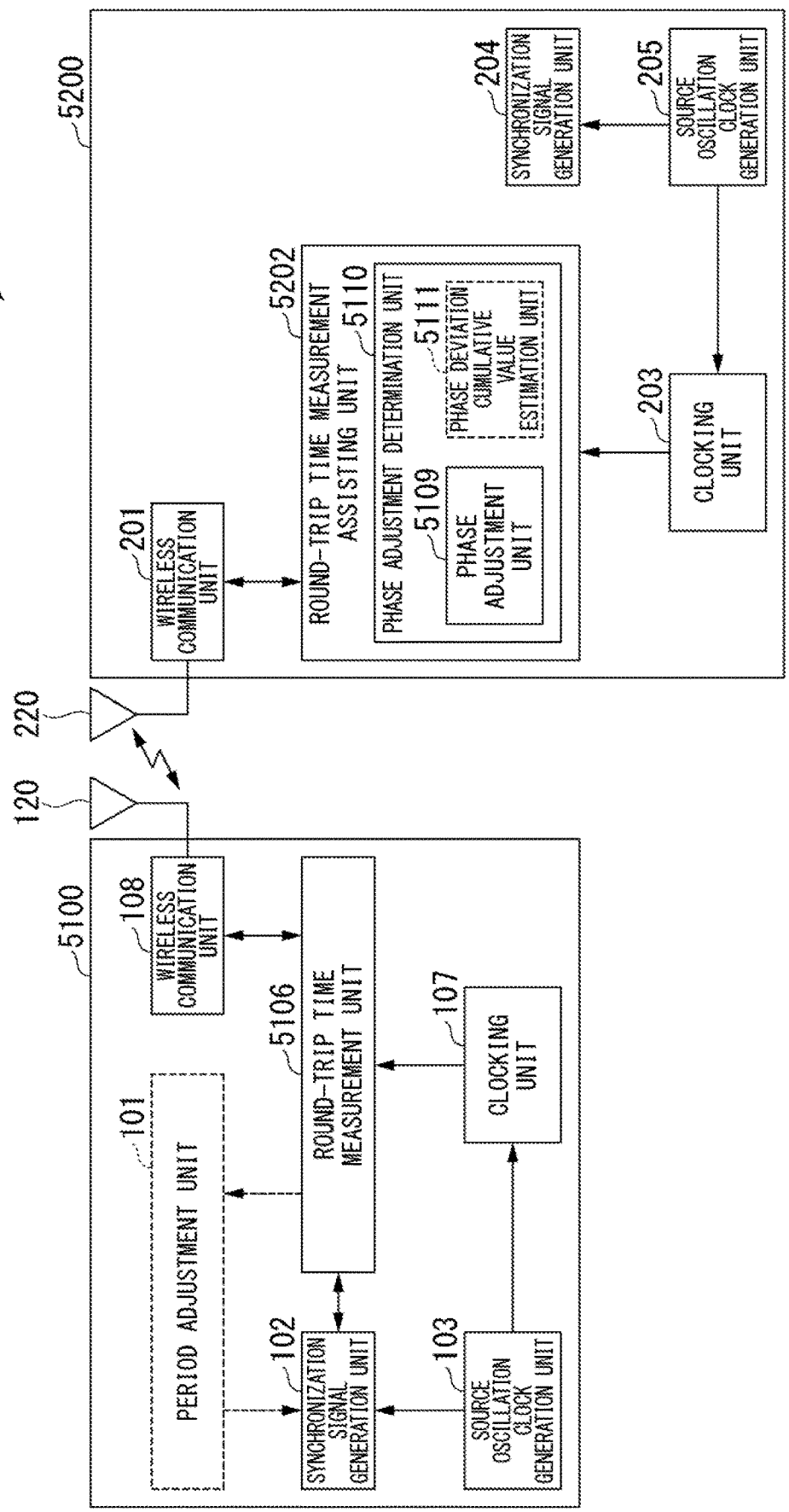
FIG. 24 is a block diagram showing an overall configuration of an image transfer system according to a seventh embodiment of the present invention.

Hereinafter, an image transfer system according to a seventh embodiment of the present invention will be described. FIG. 24 is a block diagram showing an overall configuration of the image transfer system according to the seventh embodiment of the present invention. An image transfer system 7 includes an imaging terminal 5100 and a display terminal 5200. The imaging terminal 5100 includes a synchronization signal generation unit 102, a period adjustment unit 101, a source oscillation clock generation unit 103, a wireless communication unit 108, a round-trip time measurement unit 5106, a clocking unit 107, and an antenna 120. The display terminal 5200 includes a synchronization signal generation unit 204, a source oscillation clock generation unit 205, a wireless communication unit 201, a round-trip time measurement assisting unit 5202, a clocking unit 203, a phase adjustment unit 5109, a phase adjustment determination unit 5110, a phase deviation cumulative value estimation unit 5111, and an antenna 220.

In FIG. 24, in the constituent elements of the image transfer system 7, the same reference numbers are given to similar constituent elements to the constituent elements included in the image transfer system 1 according to the first embodiment and the image transfer system 2 according to the second embodiment shown in FIG. 2.

The image transfer system 7 is also an image transfer system in which a round-trip time measurement outward signal and a round-trip time measurement return signal are transmitted and received between the imaging terminal 5100 and the display terminal 5200 and the imaging terminal 5100 adjusts a phase and a period (at least a phase) of a generated imaging synchronization signal so that the phase and the period of the imaging synchronization signal match a phase and a period (at least a phase) of a display synchronization signal generated by the display terminal 5200, as in the image transfer system 1 according to the first embodiment to the image transfer system 6 according to the sixth embodiment. As in the image transfer system 1 according to the first embodiment and the image transfer system 2 according to the second embodiment, the image transfer system 7 is an image transfer system in which the imaging terminal 5100 calculates a round-trip time in the wireless transfer between the imaging terminal 5100 and the display terminal 5200 by transmitting the round-trip time measurement outward signal to the display terminal 5200, and the imaging terminal 5100 adjusts the phase and the period (at least the phase) of the generated imaging synchronization signal.

Here, in the image transfer system 7, some of the constituent elements included in the imaging terminal 100 in the image transfer system 1 according to the first embodiment and the image transfer system 2 according to the second embodiment are moved to the display terminal 5200. More specifically, in the image transfer system 7, the display terminal 5200 includes the phase adjustment determination unit 5110 replacing the phase adjustment determination unit 110, the phase adjustment unit 5109 replacing the phase adjustment unit 109, and the phase deviation cumulative value estimation unit 5111 replacing the phase deviation cumulative value estimation unit 111 included in the imaging terminal 100 in the image transfer system 1 according to the first embodiment and the image transfer system 2 according to the second embodiment. More specifically, in the image transfer system 7, the phase adjustment determination unit 5110 including the phase adjustment unit 5109 and the phase deviation cumulative value estimation unit 5111 is included in the round-trip time measurement assisting unit 5202 included in the display terminal 5200.

Therefore, in the image transfer system 7, the imaging terminal 5100 transmits the round-trip time measurement outward signal to the display terminal 5200 and the display terminal 5200 transmits the round-trip time measurement return signal in accordance with the round-trip time measurement outward signal transmitted from the imaging terminal 5100 to the imaging terminal 5100. Then, in the image transfer system 7, the imaging terminal 5100 calculates a round-trip time necessary for transmission and reception in the wireless transfer between the imaging terminal 5100 and the display terminal 5200 based on a transmission time of the round-trip time measurement outward signal and a reception time of the round-trip time measurement return signal in accordance with the round-trip time measurement outward signal transmitted from the display terminal 5200, and transmits the information regarding the calculated round-trip time to the display terminal 5200. Then, in the image transfer system 7, the display terminal 5200 determines whether the phase of the imaging synchronization signal is adjusted based on the information regarding the round-trip time transmitted from the imaging terminal 5100 and transmits the phase adjustment instruction based on the phase adjustment determination result of the determination result to the imaging terminal 5100. Then, in the image transfer system 7, the imaging terminal 5100 adjusts the phase of the generated imaging synchronization signal in accordance with the phase adjustment instruction transmitted from the display terminal 5200.

However, in the image transfer system 7, there is a process of exchanging signals through the wireless transfer with a change in disposition of a constituent element, but a function and an operation of each constituent element are similar to a function and an operation of a corresponding constituent element in the image transfer system 1 according to the first embodiment and the image transfer system 2 according to the second embodiment. That is, a function and an operation of each constituent element included in the imaging terminal 5100 and the display terminal 5200 in the image transfer system 7 can be easily understood from the above description of each constituent element included in the imaging terminal 100 and the display terminal 200 in the image transfer system 1 according to the first embodiment and the image transfer system 2 according to the second embodiment. Accordingly, a detailed description of each constituent element included in the image transfer system 7 will be omitted.

Figure 25:
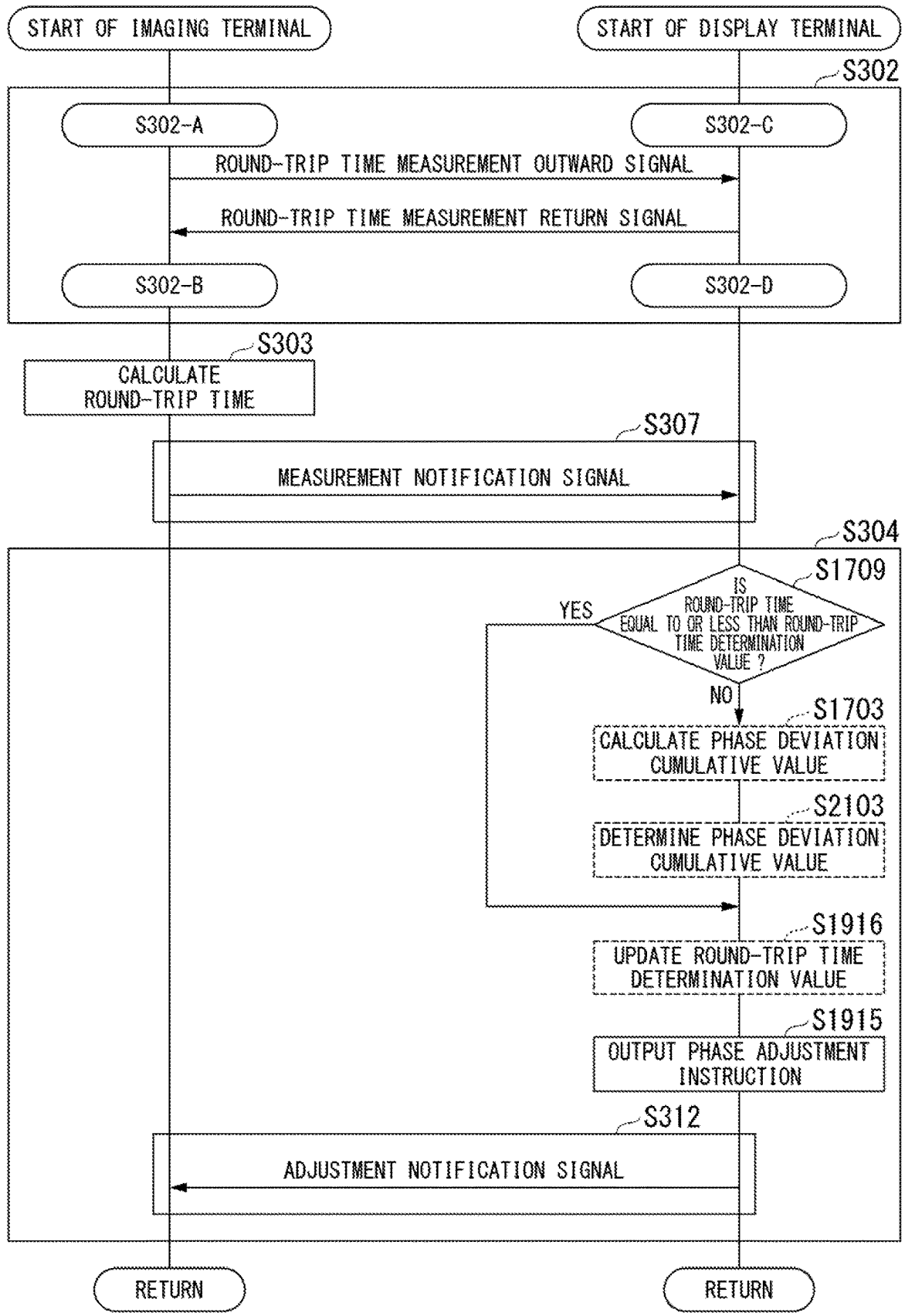
FIG. 25 is a flowchart showing a processing procedure of the image transfer system according to the seventh embodiment of the present invention.

Next, an operation of a process in the image transfer system 7 will be described. In the image transfer system 7, a process of transmitting information regarding the round-trip time to the display terminal 5200 and a process of transmitting information regarding the phase adjustment instruction to the imaging terminal 5100 are added with a change to a configuration in which the phase adjustment unit 5109, the phase adjustment determination unit 5110, and the phase deviation cumulative value estimation unit 5111 are included in the display terminal 5200. However, an overview of an overall operation in the image transfer system 7 is similar to that of the image transfer system 1 according to the first embodiment and the image transfer system 2 according to the second embodiment. Accordingly, in the image transfer system 7, a description of the overview of the overall operation will be omitted and a more specific operation of adjusting the phase of the imaging synchronization signal in the image transfer system 7 will be described. FIG. 25 is a flowchart showing a processing procedure of the image transfer system 7 according to the seventh embodiment of the present invention.

In the image transfer system 7, when the phase adjustment process starts, the imaging terminal 5100 transmits the round-trip time measurement outward signal to the display terminal 5200, and the display terminal 5200 transmits the round-trip time measurement return signal in accordance with the round-trip time measurement outward signal to the imaging terminal 5100 in step S302. The process of step S302 in the image transfer system 7 is similar to the process of step S302 in the image transfer system 1 according to the first embodiment and the image transfer system 2 according to the second embodiment.

Thereafter, in the image transfer system 7, in step S303, the imaging terminal 5100 calculates the round-trip time necessary for transmission and reception in the wireless transfer between the imaging terminal 5100 and the display terminal 5200. The process of step S303 in the image transfer system 7 is also similar to the process of step S303 in the image transfer system 1 according to the first embodiment and the image transfer system 2 according to the second embodiment.

Thereafter, in the image transfer system 7, in step S307, the imaging terminal 5100 generates a measurement notification signal including the information regarding the calculated round-trip time and transmits the generated measurement notification signal to the display terminal 5200. More specifically, the round-trip time measurement unit 5106 generates the measurement notification signal including the information regarding the calculated round-trip time, the information regarding the transmission schedule time of the round-trip time measurement outward signal, and the information regarding the transmission schedule time included in the received round-trip time measurement return signal. Then, the round-trip time measurement unit 5106 outputs the generated measurement notification signal to the wireless communication unit 108 to transmit the measurement notification signal to the display terminal 5200 via the wireless communication unit 108 and the antenna 120. Thus, the display terminal 5200 acquires the information regarding the round-trip time from the imaging terminal 5100. More specifically, the wireless communication unit 201 receives the measurement notification signal transmitted from the imaging terminal 5100 via the antenna 220. Then, the wireless communication unit 201 outputs the information regarding the round-trip time, the information regarding the transmission schedule time of the round-trip time measurement outward signal, and the information regarding the transmission schedule time included in the round-trip time measurement return signal included in the received measurement notification signal to the round-trip time measurement assisting unit 5202.

Thereafter, in the image transfer system 7, in step S304, the display terminal 5200 adjusts the phase of the imaging synchronization signal based on the round-trip time transmitted from the imaging terminal 5100, that is, the round-trip time calculated in step S303 by the imaging terminal 5100 and necessary for transmission and reception in the wireless transfer between the imaging terminal 5100 and the display terminal 5200. Here, in the image transfer system 7, the display terminal 5200 outputs the phase adjustment instruction to the synchronization signal generation unit 102 included in the imaging terminal 5100.

More specifically, in step S304, the phase adjustment determination unit 5110 determines whether the round-trip time transmitted from the imaging terminal 5100 is equal to or less than the pre-decided round-trip time determination value (step S1709).

When the round-trip time transmitted from the imaging terminal 5100 is not equal to or less than the pre-decided round-trip time determination value, that is, the round-trip time calculated by the round-trip time measurement unit 5106 included in the imaging terminal 5100 is greater than the pre-decided round-trip time determination value in a determination result of step S1709 ("NO" in step S1709), the phase adjustment determination unit 5110 determines that the phase adjustment is not performed, and the process of step S304 ends. When phase adjustment determination unit 5110 determines that the round-trip time transmitted from the imaging terminal 5100 is not equal to or less than the pre-decided round-trip time determination value in a determination result of step S1709 ("NO" in step S1709), the process of step S1915 may not be performed and the process of step S304 may end. That is, when the phase adjustment determination unit 5110 determines that the phase adjustment is not performed, the phase adjustment instruction may not be output to the phase adjustment unit 5109.

In this case, even in the image transfer system 7, the phase deviation cumulative value estimation unit 5111 may estimate a deviation amount between the phases of the imaging synchronization signal and the display synchronization signal and may update the pre-decided round-trip time determination value used when the phase adjustment determination unit 5110 determines whether the phase of the imaging synchronization signal is adjusted based on the estimation result. Since the process (step S1703 to step S1916) of estimating the deviation amount between the phases of the imaging synchronization signal and the display synchronization signal and updating the round-trip time determination value in the image transfer system 7 is the same as that of the image transfer system 1 according to the first embodiment to the image transfer system 6 according to the sixth embodiment, detailed description thereof will be omitted.

Conversely, when the round-trip time transmitted from the imaging terminal 5100 is equal to or less than the pre-decided round-trip time determination value in a determination result of step S1709 ("YES" in step S1709), the phase adjustment determination unit 5110 determines that the phase adjustment is performed. In this case, the phase adjustment determination unit 5110 outputs the information regarding the round-tip time and the phase adjustment determination result indicating the determination result to the phase adjustment unit 5109.

In this case, even in the image transfer system 7, the phase adjustment determination unit 5110 may perform the process of step S1916 of updating the round-trip time of a small value determined to be equal to or less than the pre-decided round-trip time determination value to the round-trip time determination value at the time of subsequent determination of the round-trip time. Since the process of step S1916 in the image transfer system 7 is also the same as the process of step S1916 of the image transfer system 1 according to the first embodiment to the image transfer system 6 according to the sixth embodiment, a detailed description thereof will be omitted.

Then, the phase adjustment unit 5109 generates the adjustment notification signal including the phase adjustment instruction to adjust the phase of the imaging synchronization signal based on the information regarding the round-trip time and the phase adjustment determination result output from the phase adjustment determination unit 5110 (step S1915).

Then, the phase adjustment unit 5109 transmits the generated adjustment notification signal to the imaging terminal 5100 (step S312). More specifically, the phase adjustment unit 5109 generates the adjustment notification signal including the phase adjustment instruction indicating the adjustment of the phase of the imaging synchronization signal by a time indicated by the information regarding the round-trip time. Then, the phase adjustment unit 5109 outputs the generated adjustment notification signal to the wireless communication unit 201 to transmit the adjustment notification signal to the imaging terminal 5100 via the wireless communication unit 201 and the antenna 220. Thus, the imaging terminal 5100 acquires the phase adjustment instruction generated by the phase adjustment unit 5109 included in the display terminal 5200. More specifically, the wireless communication unit 108 receives the adjustment notification signal transmitted from the display terminal 5200 via the antenna 120. Then, the wireless communication unit 108 outputs the information regarding the phase adjustment instruction included in the received adjustment notification signal to the round-trip time measurement unit 5106. The round-trip time measurement unit 5106 outputs the phase adjustment instruction output from the wireless communication unit 108 to the synchronization signal generation unit 102. Thus, the synchronization signal generation unit 102 adjusts the phase of the generated imaging synchronization signal in accordance with the phase adjustment instruction output from the round-trip time measurement unit 5106, that is, the phase adjustment instruction transmitted from the phase adjustment unit 5109 included in the display terminal 5200.

In this way, in the image transfer system 7, the imaging terminal 5100 transmits the round-trip time measurement outward signal and calculates the round-trip time in the wireless transfer between the imaging terminal 5100 and the display terminal 5200. In the image transfer system 7, the display terminal 5200 generates and transmits the phase adjustment instruction based on the result obtained by determining whether the phase of the imaging synchronization signal is adjusted. Thus, in the image transfer system 7, the imaging terminal 5100 adjusts the phases of the imaging synchronization signal and the display synchronization signal so that the phases do not deviate over time in accordance with the phase adjustment instruction transmitted from the display terminal 5200.

Even in the image transfer system 7, as in the image transfer system 1 according to the first embodiment to the image transfer system 6 according to the sixth embodiment, the process of adjusting the period of the imaging synchronization signal in step S310 may be performed subsequently after the process of adjusting the phase of the imaging synchronization signal in step S304. The process of step S310 in this case is similar to the process of step S310 in the image transfer system 1 according to the first embodiment to the image transfer system 6 according to the sixth embodiment. In the flowchart of the processing procedure of the image transfer system 7 shown in FIG. 25, the process of step S310 performed subsequently after the process of step S304 is not shown.

In this configuration and the processing procedure, in the image transfer system 7, the imaging terminal 5100 measures (calculates) the round-trip time in the wireless transfer between the imaging terminal 5100 and the display terminal 5200 by transmitting the round-trip time measurement outward signal. Even in the image transfer system 7, the display terminal 5200 determines whether the phase of the imaging synchronization signal is adjusted based on the round-trip time measured (calculated) by the imaging terminal 5100. In the image transfer system 7, the display terminal 5200 transmits the phase adjustment instruction to adjust the phase of the imaging synchronization signal based on the phase adjustment determination result of the determination result and the information regarding the measured (calculated) round-trip time to the imaging terminal 5100. Then, in the image transfer system 7, the imaging terminal 5100 adjusts the phase of the generated imaging synchronization signal in accordance with the phase adjustment instruction transmitted from the display terminal 5200. Thus, even in the image transfer system 7, as in the image transfer system 1 according to the first embodiment to the image transfer system 6 according to the sixth embodiment, the phase and the period (at least the phase) of the imaging synchronization signal generated by the imaging terminal 5100 (more specifically, the synchronization signal generation unit 102) are adjusted so that the phase and the period of the imaging synchronization signal match the phase and the period (at least the phase) of the display synchronization signal generated by the display terminal 5200. That is, even in the image transfer system 7, as in the image transfer system 1 according to the first embodiment to the image transfer system 6 according to the sixth embodiment, a timing at which the imaging terminal 5100 wirelessly delivers the captured image data of the image captured by the imaging unit (not shown) to the display terminal 5200 matches a timing at which the display terminal 5200 causes the display unit (not shown) to display the image in accordance with the captured image data. Thus, even in the image transfer system 7, as in the image transfer system 1 according to the first embodiment to the image transfer system 6 according to the sixth embodiment, the display terminal 5200 can stably cause the display unit (not shown) to display the image in accordance with the captured image data wirelessly delivered from the imaging terminal 5100.

As described above, in the image transfer system 7 according to the seventh embodiment, after the wireless connection between the imaging terminal 5100 and the display terminal 5200 is established, the round-trip time measurement outward signal and the round-trip time measurement return signal are transmitted and received between the round-trip time measurement unit 5106 included in the imaging terminal 5100 and the round-trip time measurement assisting unit 5202 included in the display terminal 5200. Then, in the image transfer system 7 according to the seventh embodiment, the round-trip time measurement unit 5106 calculates a round-trip time necessary for transmission and reception in the wireless transfer between the imaging terminal 5100 and the display terminal 5200 based on the transmission time of the round-trip time measurement outward signal and the reception time of the round-trip time measurement return signal in accordance with the round-trip time measurement outward signal transmitted from the round-trip time measurement assisting unit 5202. Then, in the image transfer system 7 according to the seventh embodiment, the phase adjustment determination unit 5110 included in the display terminal 5200 determines whether the phase of the imaging synchronization signal generated by the synchronization signal generation unit 102 included in the imaging terminal 5100 is adjusted based on the round-trip time calculated by the round-trip time measurement unit 5106 and outputs the phase adjustment determination result of the determination result to the phase adjustment unit 5109. Then, in the image transfer system 7 according to the seventh embodiment, when the phase adjustment determination unit 5110 determines that the phase of the imaging synchronization signal is adjusted, the phase adjustment unit 5109 included in the display terminal 5200 generates the phase adjustment instruction to adjust the phase of the imaging synchronization signal and transmits the phase adjustment instruction to the imaging terminal 5100. Thus, in the image transfer system 7 according to the seventh embodiment, the synchronization signal generation unit 102 included in the imaging terminal 5100 adjusts the phase of the generated imaging synchronization signal in accordance with the phase adjustment instruction transmitted from the phase adjustment unit 5109.

Thus, even in the image transfer system 7 according to the seventh embodiment, as in the image transfer system 1 according to the first embodiment to the image transfer system 6 according to the sixth embodiment, the phase and the period (at least the phase) of the imaging synchronization signal can match the phase and the period (at least the phase) of the display synchronization signal. That is, even in the image transfer system 7 according to the seventh embodiment, the phase and the period (at least the phase) of the imaging synchronization signal can match the phase and the period (at least the phase) of the display synchronization signal even when the phases of the imaging synchronization signal and the display synchronization signal deviate from one another over time due to an error of the phase and the period between the imaging standard clock signal and the display standard clock signal. Thus, even in the image transfer system 7 according to the seventh embodiment, it is possible to obtain similar advantages as those of the image transfer system 1 according to the first embodiment to the image transfer system 6 according to the sixth embodiment. That is, even in the image transfer system 7 according to the seventh embodiment, as in the image transfer system 1 according to the first embodiment to the image transfer system 6 according to the sixth embodiment, the captured image data can be wirelessly delivered from the imaging terminal 5100 to the display terminal 5200 without exceeding a valid period of a display image, and thus the display terminal 5200 can display the display image stably in accordance with the captured image data transmitted from the imaging terminal 5100.

Further, in the image transfer system 7 according to the seventh embodiment, the display terminal 5200 determines whether the phase of the generated imaging synchronization signal is adjusted, generates the phase adjustment instruction to adjust the phase of the imaging synchronization signal, and transmits the phase adjustment instruction to the imaging terminal 5100. Thus, in the image transfer system 7 according to the seventh embodiment, only the calculation of the round-trip time necessary for transmission and reception in the wireless transfer between the imaging terminal 5100 and the display terminal 5200 may be performed by the imaging terminal 5100. That is, in the image transfer system 7 according to the seventh embodiment, it is not necessary to determine whether the phase adjustment is performed and generate the phase adjustment instruction in the imaging terminal 5100, and it is possible to reduce a load of the process performed in the imaging terminal 5100.

Eighth Embodiment

Figure 26:
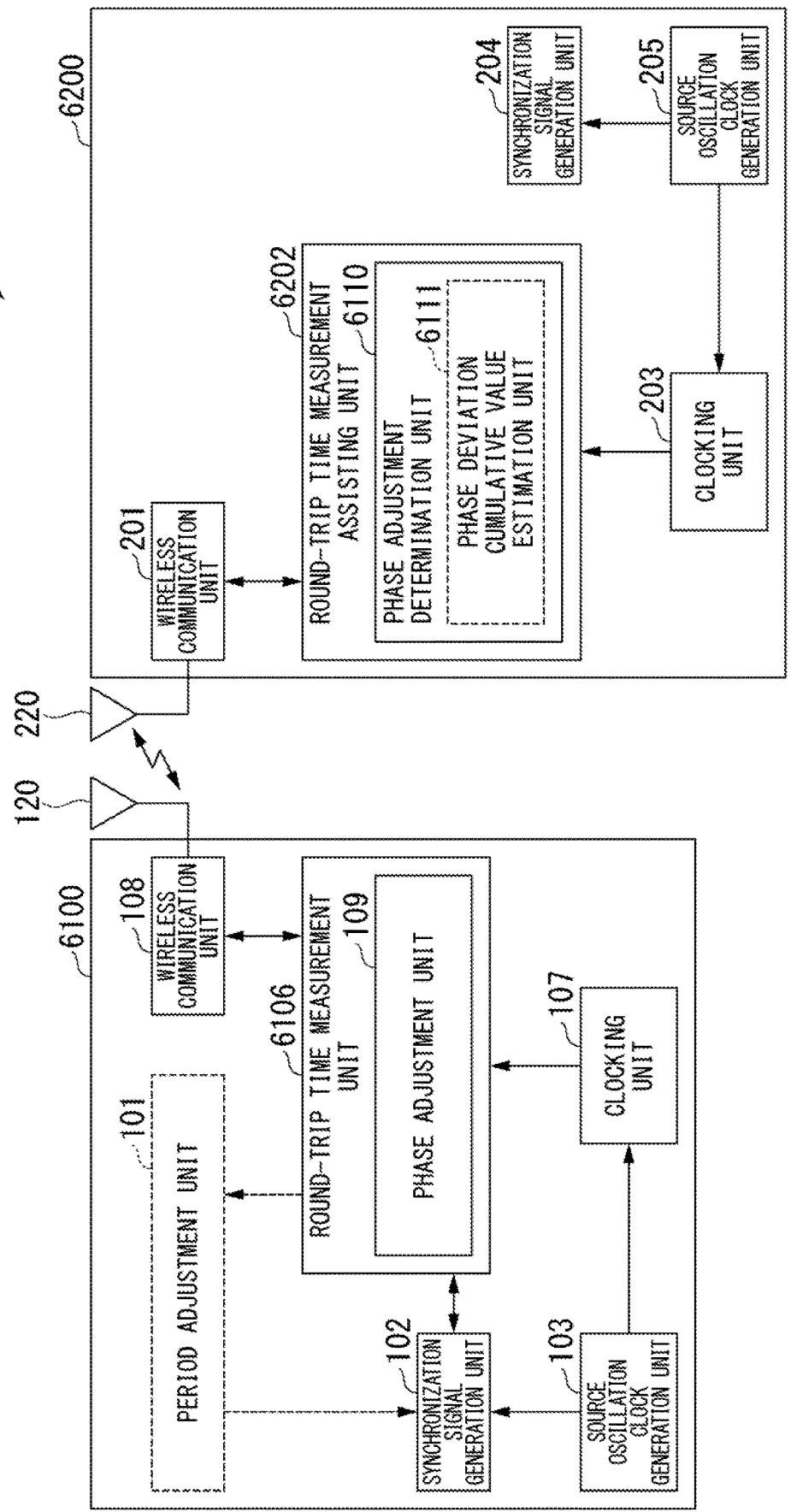
FIG. 26 is a block diagram showing an overall configuration of an image transfer system according to an eighth embodiment of the present invention.

Hereinafter, an image transfer system according to an eighth embodiment of the present invention will be described. FIG. 26 is a block diagram showing an overall configuration of the image transfer system according to the eighth embodiment of the present invention. An image transfer system 8 includes an imaging terminal 6100 and a display terminal 6200. The imaging terminal 6100 includes a synchronization signal generation unit 102, a period adjustment unit 101, a source oscillation clock generation unit 103, a wireless communication unit 108, a round-trip time measurement unit 6106, a clocking unit 107, a phase adjustment unit 109, and an antenna 120. The display terminal 6200 includes a synchronization signal generation unit 204, a source oscillation clock generation unit 205, a wireless communication unit 201, a round-trip time measurement assisting unit 6202, a clocking unit 203, a phase adjustment determination unit 6110, a phase deviation cumulative value estimation unit 6111, and an antenna 220.

In FIG. 26, in the constituent elements of the image transfer system 8, the same reference numbers are given to similar constituent elements to the constituent elements included in the image transfer system 1 according to the first embodiment and the image transfer system 2 according to the second embodiment shown in FIG. 2.

The image transfer system 8 is also an image transfer system in which a round-trip time measurement outward signal and a round-trip time measurement return signal are transmitted and received between the imaging terminal 6100 and the display terminal 6200 and the imaging terminal 6100 adjusts a phase and a period (at least a phase) of a generated imaging synchronization signal so that the phase and the period of the imaging synchronization signal match a phase and a period (at least a phase) of a display synchronization signal generated by the display terminal 6200, as in the image transfer system 1 according to the first embodiment to the image transfer system 7 according to the seventh embodiment. As in the image transfer system 1 according to the first embodiment and the image transfer system 2 according to the second embodiment, the image transfer system 8 is an image transfer system in which the imaging terminal 6100 calculates a round-trip time in the wireless transfer between the imaging terminal 6100 and the display terminal 6200 by transmitting the round-trip time measurement outward signal to the display terminal 6200, and the imaging terminal 6100 adjusts the phase and the period (at least the phase) of the generated imaging synchronization signal.

Here, in the image transfer system 8, some of the constituent elements included in the imaging terminal 100 in the image transfer system 1 according to the first embodiment and the image transfer system 2 according to the second embodiment are moved to the display terminal 6200. More specifically, in the image transfer system 8, the display terminal 6200 includes the phase adjustment determination unit 6110 replacing the phase adjustment determination unit 110 and the phase deviation cumulative value estimation unit 6111 replacing the phase deviation cumulative value estimation unit 111 included in the imaging terminal 100 in the image transfer system 1 according to the first embodiment and the image transfer system 2 according to the second embodiment. More specifically, in the image transfer system 8, the phase adjustment determination unit 6110 including the phase deviation cumulative value estimation unit 6111 is included in the round-trip time measurement assisting unit 6202 included in the display terminal 6200. The configuration of the image transfer system 8 is equivalent to a configuration in which the phase adjustment unit 5109 included in the display terminal 5200 in the image transfer system 7 according to the seventh embodiment is moved back to the imaging terminal 5100.

Therefore, in the image transfer system 8, the imaging terminal 6100 transmits the round-trip time measurement outward signal to the display terminal 6200 and the display terminal 6200 transmits the round-trip time measurement return signal in accordance with the round-trip time measurement outward signal transmitted from the imaging terminal 6100 to the imaging terminal 6100. Then, in the image transfer system 8, the imaging terminal 6100 calculates a round-trip time necessary for transmission and reception in the wireless transfer between the imaging terminal 6100 and the display terminal 6200 based on a transmission time of the round-trip time measurement outward signal and a reception time of the round-trip time measurement return signal in accordance with the round-trip time measurement outward signal transmitted from the display terminal 6200, and transmits the information regarding the calculated round-trip time to the display terminal 6200. Then, in the image transfer system 8, the display terminal 6200 determines whether the phase of the imaging synchronization signal is adjusted based on the information regarding the round-trip time transmitted from the imaging terminal 6100 and transmits the phase adjustment determination result of the determination result to the imaging terminal 6100. Then, in the image transfer system 8, the imaging terminal 6100 outputs the phase adjustment instruction to adjust the phase of the imaging synchronization signal based on the information regarding the round-trip time and the phase adjustment determination result transmitted from the display terminal 6200 to the synchronization signal generation unit 102 and adjusts the phase of the generated imaging synchronization signal.

However, in the image transfer system 8, there is a process of exchanging signals through the wireless transfer with a change in disposition of a constituent element, but a function and an operation of each constituent element are similar to a function and an operation of a corresponding constituent element in the image transfer system 1 according to the first embodiment and the image transfer system 2 according to the second embodiment. That is, a function and an operation of each constituent element included in the imaging terminal 6100 and the display terminal 6200 in the image transfer system 8 can be easily understood from the above description of each constituent element included in the imaging terminal 100 and the display terminal 200 in the image transfer system 1 according to the first embodiment and the image transfer system 2 according to the second embodiment. Accordingly, detailed description of each constituent element included in the image transfer system 8 will be omitted.

Figure 27:
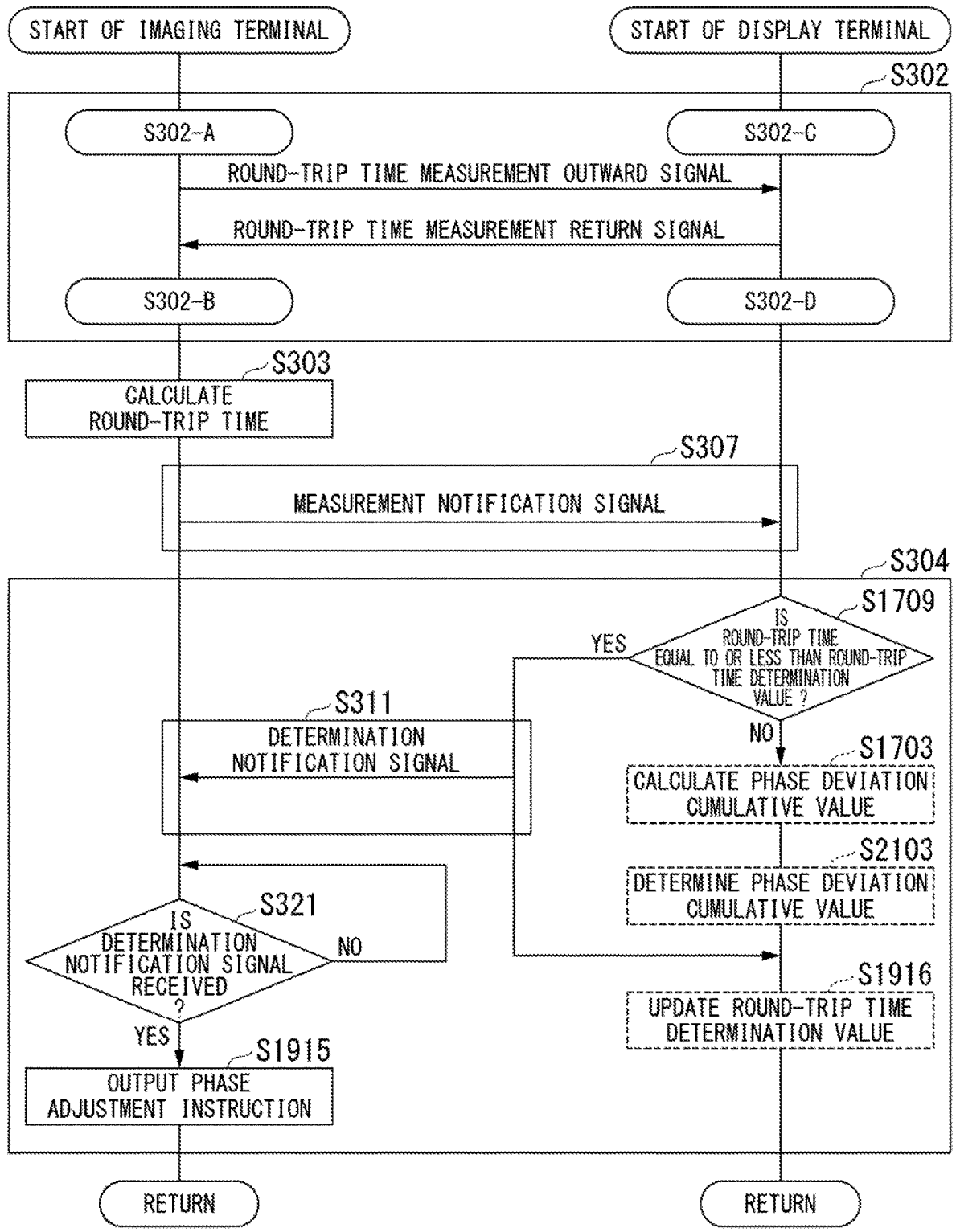
FIG. 27 is a flowchart showing a processing procedure of the image transfer system according to the eighth embodiment of the present invention.

Next, an operation of a process in the image transfer system 8 will be described. In the image transfer system 8, a process of transmitting information regarding the round-trip time to the display terminal 6200 and a process of transmitting information regarding the phase adjustment determination result to the imaging terminal 6100 are added with a change to a configuration in which the phase adjustment determination unit 6110 and the phase deviation cumulative value estimation unit 6111 are included in the display terminal 6200. However, an overview of an overall operation in the image transfer system 8 is similar to that of the image transfer system 1 according to the first embodiment and the image transfer system 2 according to the second embodiment. Accordingly, in the image transfer system 8, description of the overview of the overall operation will be omitted and a more specific operation of adjusting the phase of the imaging synchronization signal in the image transfer system 8 will be described. FIG. 27 is a flowchart showing a processing procedure of the image transfer system 8 according to the eighth embodiment of the present invention.

In the image transfer system 8, when the phase adjustment process starts, the imaging terminal 6100 transmits the round-trip time measurement outward signal to the display terminal 6200, and the display terminal 6200 transmits the round-trip time measurement return signal in accordance with the round-trip time measurement outward signal to the imaging terminal 6100 in step S302. The process of step S302 in the image transfer system 8 is similar to the process of step S302 in the image transfer system 1 according to the first embodiment and the image transfer system 2 according to the second embodiment.

Thereafter, in the image transfer system 8, in step S303, the imaging terminal 6100 calculates the round-trip time necessary for transmission and reception in the wireless transfer between the imaging terminal 6100 and the display terminal 6200. The process of step S303 in the image transfer system 8 is also similar to the process of step S303 in the image transfer system 1 according to the first embodiment and the image transfer system 2 according to the second embodiment.

Thereafter, in the image transfer system 8, in step S307, the imaging terminal 6100 generates the measurement notification signal including the information regarding the calculated round-trip time and transmits the generated measurement notification signal to the display terminal 6200. Thus, the display terminal 6200 acquires the information regarding the round-trip time from the imaging terminal 6100. The process of step S307 in the image transfer system 8 is similar to the process of step S307 in the image transfer system 7 according to the seventh embodiment.

Thereafter, in the image transfer system 8, in step S304, the display terminal 6200 adjusts the phase of the imaging synchronization signal based on the round-trip time transmitted from the imaging terminal 6100, that is, the round-trip time calculated in step S303 by the imaging terminal 6100 and necessary for transmission and reception in the wireless transfer between the imaging terminal 6100 and the display terminal 6200. Here, in the image transfer system 8, the display terminal 6200 transmits the phase adjustment determination result indicating whether the phase adjustment is performed to the imaging terminal 6100 and the imaging terminal 6100 outputs the phase adjustment instruction to the synchronization signal generation unit 102 based on the phase adjustment determination result transmitted from the display terminal 6200.

More specifically, in step S304, the phase adjustment determination unit 6110 determines whether the round-trip time transmitted from the imaging terminal 6100 is equal to or less than the pre-decided round-trip time determination value (step S1709).

When the round-trip time transmitted from the imaging terminal 6100 is not equal to or less than the pre-decided round-trip time determination value, that is, the round-trip time calculated by the round-trip time measurement unit 6106 included in the imaging terminal 6100 is greater than the pre-decided round-trip time determination value in a determination result of step S1709 ("NO" in step S1709), the phase adjustment determination unit 6110 determines that the phase adjustment is not performed, and the process of step S304 ends.

In this case, even in the image transfer system 8, the phase deviation cumulative value estimation unit 6111 may estimate a deviation amount between the phases of the imaging synchronization signal and the display synchronization signal and may update the pre-decided round-trip time determination value used when the phase adjustment determination unit 6110 determines whether the phase of the imaging synchronization signal is adjusted based on the estimation result. Since the process (step S1703 to step S1916) of estimating the deviation amount between the phases of the imaging synchronization signal and the display synchronization signal and updating the round-trip time determination value in the image transfer system 8 is the same as that of the image transfer system 1 according to the first embodiment to the image transfer system 7 according to the seventh embodiment, a detailed description thereof will be omitted.

Conversely, when the round-trip time transmitted from the imaging terminal 6100 is equal to or less than the pre-decided round-trip time determination value in a determination result of step S1709 ("YES" in step S1709), the phase adjustment determination unit 6110 determines that the phase adjustment is performed. In this case, the phase adjustment determination unit 6110 generates a determination notification signal including the phase adjustment determination result indicating the determination result and transmits the generated determination notification signal to the imaging terminal 6100 (step S311). More specifically, the phase adjustment determination unit 6110 generates a determination notification signal including the information regarding the phase adjustment determination result and information regarding the round-trip time transmitted from the imaging terminal 6100. Then, the phase adjustment determination unit 6110 outputs the generated determination notification signal to the wireless communication unit 201 to transmit the determination notification signal to the phase adjustment unit 109 via the wireless communication unit 201 and the antenna 220.

In this case, even in the image transfer system 8, the phase adjustment determination unit 6110 may perform the process of step S1916 of updating the round-trip time of a small value determined to be equal to or less than the pre-decided round-trip time determination value to the round-trip time determination value at the time of subsequent determination of the round-trip time. Since the process of step S1916 in the image transfer system 8 is also the same as the process of step S1916 of the image transfer system 1 according to the first embodiment to the image transfer system 7 according to the seventh embodiment, a detailed description thereof will be omitted.

The imaging terminal 6100 confirms whether the determination notification signal transmitted from the display terminal 6200 is received (step S321). More specifically, the phase adjustment unit 109 confirms whether the information regarding the round-trip time and the phase adjustment determination result determined by the phase adjustment determination unit 6110 are acquired. When the information regarding the round-trip time and the phase adjustment determination result determined by the phase adjustment determination unit 6110 are not acquired in a confirmation result of step S321 ("NO" in step S321), the phase adjustment unit 109 returns the process to step S321 and repeats step S321 until the information regarding the round-trip time and the phase adjustment determination result are acquired from the phase adjustment determination unit 6110. Conversely, when the information regarding the round-trip time and the phase adjustment determination result determined by the phase adjustment determination unit 6110 are acquired in a confirmation result of step S321 ("YES" in step S321), the phase adjustment unit 109 outputs the phase adjustment instruction to adjust the phase of the imaging synchronization signal to the synchronization signal generation unit 102 based on the acquired information regarding the round-trip time and phase adjustment determination result (step S1915). Thus, the synchronization signal generation unit 102 adjusts the phase of the generated imaging synchronization signal in accordance with the phase adjustment instruction output from the phase adjustment unit 109.

In this way, in the image transfer system 8, the imaging terminal 6100 transmits the round-trip time measurement outward signal and calculates the round-trip time in the wireless transfer between the imaging terminal 6100 and the display terminal 6200. In the image transfer system 8, the display terminal 6200 transmits the phase adjustment determination result obtained by determining whether the phase of the imaging synchronization signal is adjusted. Thus, in the image transfer system 8, the imaging terminal 6100 generates the phase adjustment instruction based on the phase adjustment determination result transmitted from the display terminal 6200 and adjusts the phases of the imaging synchronization signal and the display synchronization signal so that the phases do not deviate over time in accordance with the generated phase adjustment instruction.

Even in the image transfer system 8, as in the image transfer system 1 according to the first embodiment to the image transfer system 7 according to the seventh embodiment, the process of adjusting the period of the imaging synchronization signal in step S310 may be performed subsequently after the process of adjusting the phase of the imaging synchronization signal in step S304. The process of step S310 in this case is similar to the process of step S310 in the image transfer system 1 according to the first embodiment to the image transfer system 7 according to the seventh embodiment. In the flowchart of the processing procedure of the image transfer system 8 shown in FIG. 27, the process of step S310 performed subsequently after the process of step S304 is not shown.

In this configuration and the processing procedure, in the image transfer system 8, the imaging terminal 6100 measures (calculates) the round-trip time in the wireless transfer between the imaging terminal 6100 and the display terminal 6200 by transmitting the round-trip time measurement outward signal. Even in the image transfer system 8, the display terminal 6200 determines whether the phase of the imaging synchronization signal is adjusted based on the round-trip time measured (calculated) by the imaging terminal 6100 and outputs the phase adjustment determination result of the determination result. In the image transfer system 8, the imaging terminal 6100 generates the phase adjustment instruction to adjust the phase of the imaging synchronization signal based on the phase adjustment determination result of the result determined by the display terminal 6200 and the information regarding the measured (calculated) round-trip time and adjusts the phase of the generated imaging synchronization signal. Thus, even in the image transfer system 8, as in the image transfer system 1 according to the first embodiment to the image transfer system 7 according to the seventh embodiment, the phase and the period (at least the phase) of the imaging synchronization signal generated by the imaging terminal 6100 (more specifically, the synchronization signal generation unit 102) are adjusted so that the phase and the period of the imaging synchronization signal match the phase and the period (at least the phase) of the display synchronization signal generated by the display terminal 6200. That is, even in the image transfer system 8, as in the image transfer system 1 according to the first embodiment to the image transfer system 7 according to the seventh embodiment, a timing at which the imaging terminal 6100 wirelessly delivers the captured image data of the image captured by the imaging unit (not shown) to the display terminal 6200 matches a timing at which the display terminal 6200 causes the display unit (not shown) to display the image in accordance with the captured image data. Thus, even in the image transfer system 8, as in the image transfer system 1 according to the first embodiment to the image transfer system 7 according to the seventh embodiment, the display terminal 6200 can stably cause the display unit (not shown) to display the image in accordance with the captured image data wirelessly delivered from the imaging terminal 6100.

As described above, in the image transfer system 8 according to the eighth embodiment, after the wireless connection between the imaging terminal 6100 and the display terminal 6200 is established, the round-trip time measurement outward signal and the round-trip time measurement return signal are transmitted and received between the round-trip time measurement unit 6106 included in the imaging terminal 6100 and the round-trip time measurement assisting unit 6202 included in the display terminal 6200. Then, in the image transfer system 8 according to the eighth embodiment, the round-trip time measurement unit 6106 calculates a round-trip time necessary for transmission and reception in the wireless transfer between the imaging terminal 6100 and the display terminal 6200 based on the transmission time of the round-trip time measurement outward signal and the reception time of the round-trip time measurement return signal in accordance with the round-trip time measurement outward signal transmitted from the round-trip time measurement assisting unit 6202. Then, in the image transfer system 8 according to the eighth embodiment, the phase adjustment determination unit 6110 included in the display terminal 6200 determines whether the phase of the imaging synchronization signal generated by the synchronization signal generation unit 102 included in the imaging terminal 6100 is adjusted based on the round-trip time calculated by the round-trip time measurement unit 6106 and transmits the phase adjustment determination result of the determination result to the imaging terminal 6100. Then, in the image transfer system 8 according to the eighth embodiment, the phase adjustment unit 109 included in the imaging terminal 6100 generates the phase adjustment instruction to adjust the phase of the imaging synchronization signal based on the phase adjustment determination result transmitted from the display terminal 6200 and outputs the phase adjustment instruction. Thus, in the image transfer system 8 according to the eighth embodiment, the synchronization signal generation unit 102 included in the imaging terminal 6100 adjusts the phase of the generated imaging synchronization signal in accordance with the phase adjustment instruction output from the phase adjustment unit 109.

Thus, even in the image transfer system 8 according to the eighth embodiment, as in the image transfer system 1 according to the first embodiment to the image transfer system 7 according to the seventh embodiment, the phase and the period (at least the phase) of the imaging synchronization signal can match the phase and the period (at least the phase) of the display synchronization signal. That is, even in the image transfer system 8 according to the eighth embodiment, the phase and the period (at least the phase) of the imaging synchronization signal can match the phase and the period (at least the phase) of the display synchronization signal even when the phases of the imaging synchronization signal and the display synchronization signal deviate from one another over time due to an error of the phase and the period between the imaging standard clock signal and the display standard clock signal. Thus, even in the image transfer system 8 according to the eighth embodiment, it is possible to obtain similar advantages as those of the image transfer system 1 according to the first embodiment to the image transfer system 7 according to the seventh embodiment. That is, even in the image transfer system 8 according to the eighth embodiment, as in the image transfer system 1 according to the first embodiment to the image transfer system 7 according to the seventh embodiment, the captured image data can be wirelessly delivered from the imaging terminal 6100 to the display terminal 6200 without exceeding a valid period of a display image, and thus the display terminal 6200 can display the display image stably in accordance with the captured image data transmitted from the imaging terminal 6100.

Further, in the image transfer system 8 according to the eighth embodiment, the display terminal 6200 determines whether the phase of the generated imaging synchronization signal is adjusted and transmits the phase adjustment determination result to the imaging terminal 6100. Thus, in the image transfer system 8 according to the eighth embodiment, it is not necessary to determine whether the phase adjustment is performed in the imaging terminal 6100, and it is possible to reduce the load of the process performed in the imaging terminal 6100.

Ninth Embodiment

Hereinafter, an image transfer system according to a ninth embodiment of the present invention will be described. FIG.

28 is a block diagram showing an overall configuration of the image transfer system according to the ninth embodiment of the present invention. An image transfer system 9 includes an imaging terminal 7100 and a display terminal 7200. The imaging terminal 7100 includes a synchronization signal generation unit 102, a period adjustment unit 101, a source oscillation clock generation unit 103, a wireless communication unit 108, a round-trip time measurement unit 7106, a clocking unit 107, a phase adjustment determination unit 7110, a phase deviation cumulative value estimation unit 111, and an antenna 120. The display terminal 7200 includes a synchronization signal generation unit 204, a source oscillation clock generation unit 205, a wireless communication unit 201, a round-trip time measurement assisting unit 7202, a clocking unit 203, a phase adjustment unit 7109, and an antenna 220.

Figure 28:
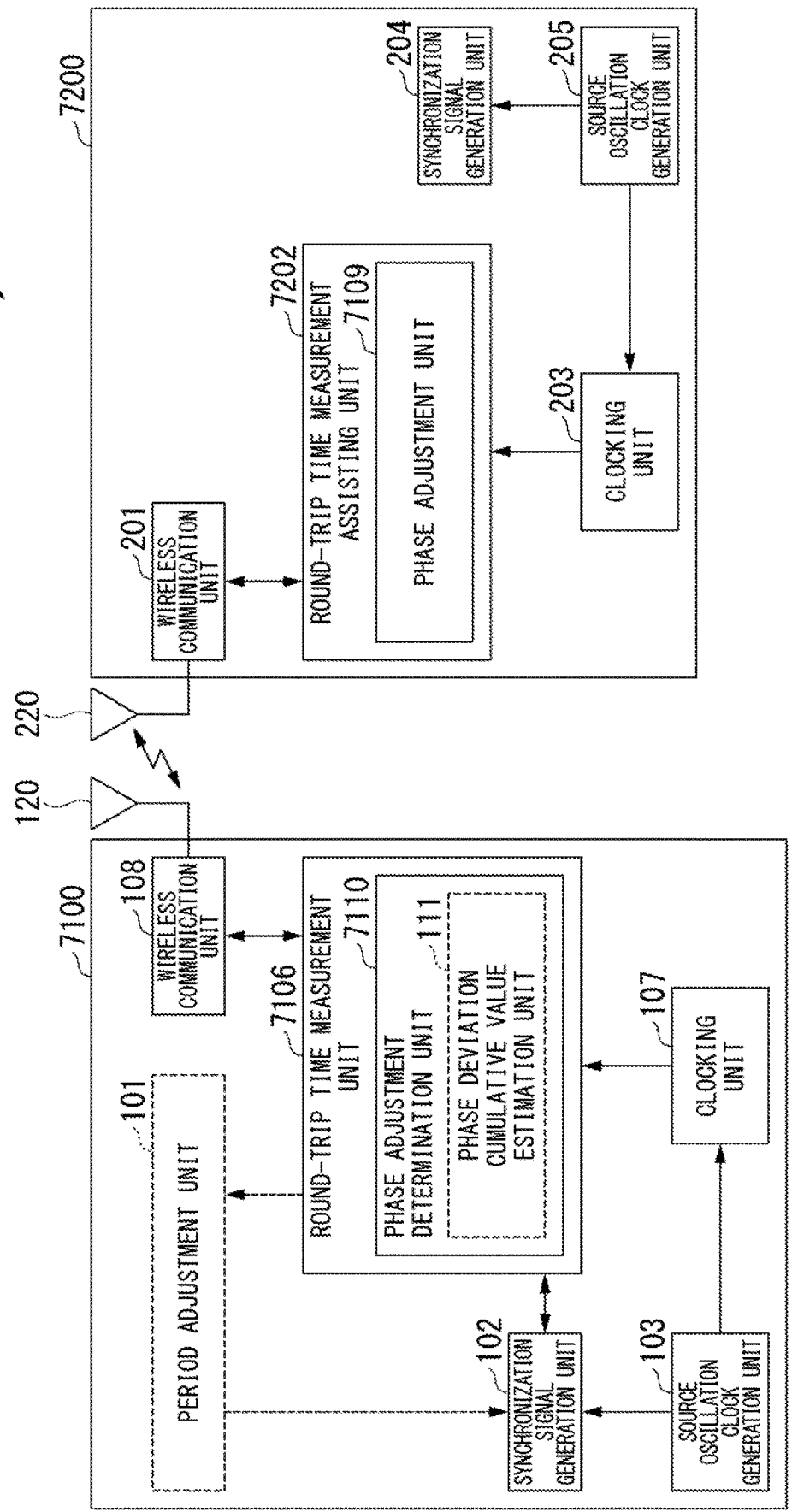
FIG. 28 is a block diagram showing an overall configuration of an image transfer system according to a ninth embodiment of the present invention.

In FIG. 28, in the constituent elements of the image transfer system 9, the same reference numbers are given to similar constituent elements to the constituent elements included in the image transfer system 1 according to the first embodiment and the image transfer system 2 according to the second embodiment shown in FIG. 2.

The image transfer system 9 is also an image transfer system in which a round-trip time measurement outward signal and a round-trip time measurement return signal are transmitted and received between the imaging terminal 7100 and the display terminal 7200 and the imaging terminal 7100 adjusts a phase and a period (at least a phase) of a generated imaging synchronization signal so that the phase and the period of the imaging synchronization signal match a phase and a period (at least a phase) of a display synchronization signal generated by the display terminal 7200, as in the image transfer system 1 according to the first embodiment to the image transfer system 8 according to the eighth embodiment. As in the image transfer system 1 according to the first embodiment and the image transfer system 2 according to the second embodiment, the image transfer system 9 is an image transfer system in which the imaging terminal 7100 calculates a round-trip time in the wireless transfer between the imaging terminal 7100 and the display terminal 7200 by transmitting the round-trip time measurement outward signal to the display terminal 7200, and the imaging terminal 7100 adjusts the phase and the period (at least the phase) of the generated imaging synchronization signal.

Here, in the image transfer system 9, some of the constituent elements included in the imaging terminal 100 in the image transfer system 1 according to the first embodiment and the image transfer system 2 according to the second embodiment are moved to the display terminal 7200. More specifically, in the image transfer system 9, the display terminal 7200 includes the phase adjustment unit 7109 replacing the phase adjustment unit 109 included in the imaging terminal 100 in the image transfer system 1 according to the first embodiment and the image transfer system 2 according to the second embodiment. More specifically, in the image transfer system 9, the phase adjustment unit 7109 is included in the round-trip time measurement assisting unit 7202 included in the display terminal 7200. The configuration of the imaging transfer system 9 is equivalent to a configuration in which the phase adjustment determination unit 5110 and the phase deviation cumulative value estimation unit 5111 included in the display terminal 5200 in the image transfer system 7 according to the seventh embodiment are moved back to the imaging terminal 7100. In the image transfer system 9, the phase adjustment determination unit 7110 including the phase deviation cumulative value estimation unit 111 is included in the round-trip time measurement unit 7106 included in the imaging terminal 7100.

Therefore, in the image transfer system 9, the imaging terminal 7100 transmits the round-trip time measurement outward signal to the display terminal 7200 and the display terminal 7200 transmits the round-trip time measurement return signal in accordance with the round-trip time measurement outward signal transmitted from the imaging terminal 7100 to the imaging terminal 7100. Then, in the image transfer system 9, the imaging terminal 7100 calculates a round-trip time necessary for transmission and reception in the wireless transfer between the imaging terminal 7100 and the display terminal 7200 based on the transmission time of the round-trip time measurement outward signal and the reception time of the round-trip time measurement return signal in accordance with the round-trip time measurement outward signal transmitted from the display terminal 7200. Then, in the image transfer system 9, the imaging terminal 7100 determines whether the phase of the imaging synchronization signal is adjusted based on the information regarding the calculated round-trip time and transmits the phase adjustment determination result of the determination result to the display terminal 7200. In the image transfer system 9, the display terminal 7200 generates the phase adjustment instruction to adjust the phase of the imaging synchronization signal generated by the synchronization signal generation unit 102 included in the imaging terminal 7100 based on the information regarding the round-trip time and the phase adjustment determination result transmitted from the imaging terminal 7100 and transmits the phase adjustment instruction to the imaging terminal 7100. Then, in the image transfer system 9, the imaging terminal 7100 adjusts the phase of the generated imaging synchronization signal in accordance with the phase adjustment instruction transmitted from the display terminal 7200.

However, in the image transfer system 9, there is a process of exchanging signals through the wireless transfer with a change in disposition of a constituent element, but a function and an operation of each constituent element are similar to a function and an operation of a corresponding constituent element in the image transfer system 1 according to the first embodiment and the image transfer system 2 according to the second embodiment. That is, a function and an operation of each constituent element included in the imaging terminal 7100 and the display terminal 7200 in the image transfer system 9 can be easily understood from the above description of each constituent element included in the imaging terminal 100 and the display terminal 200 in the image transfer system 1 according to the first embodiment and the image transfer system 2 according to the second embodiment. Accordingly, a detailed description of each constituent element included in the image transfer system 9 will be omitted.

Figure 29:
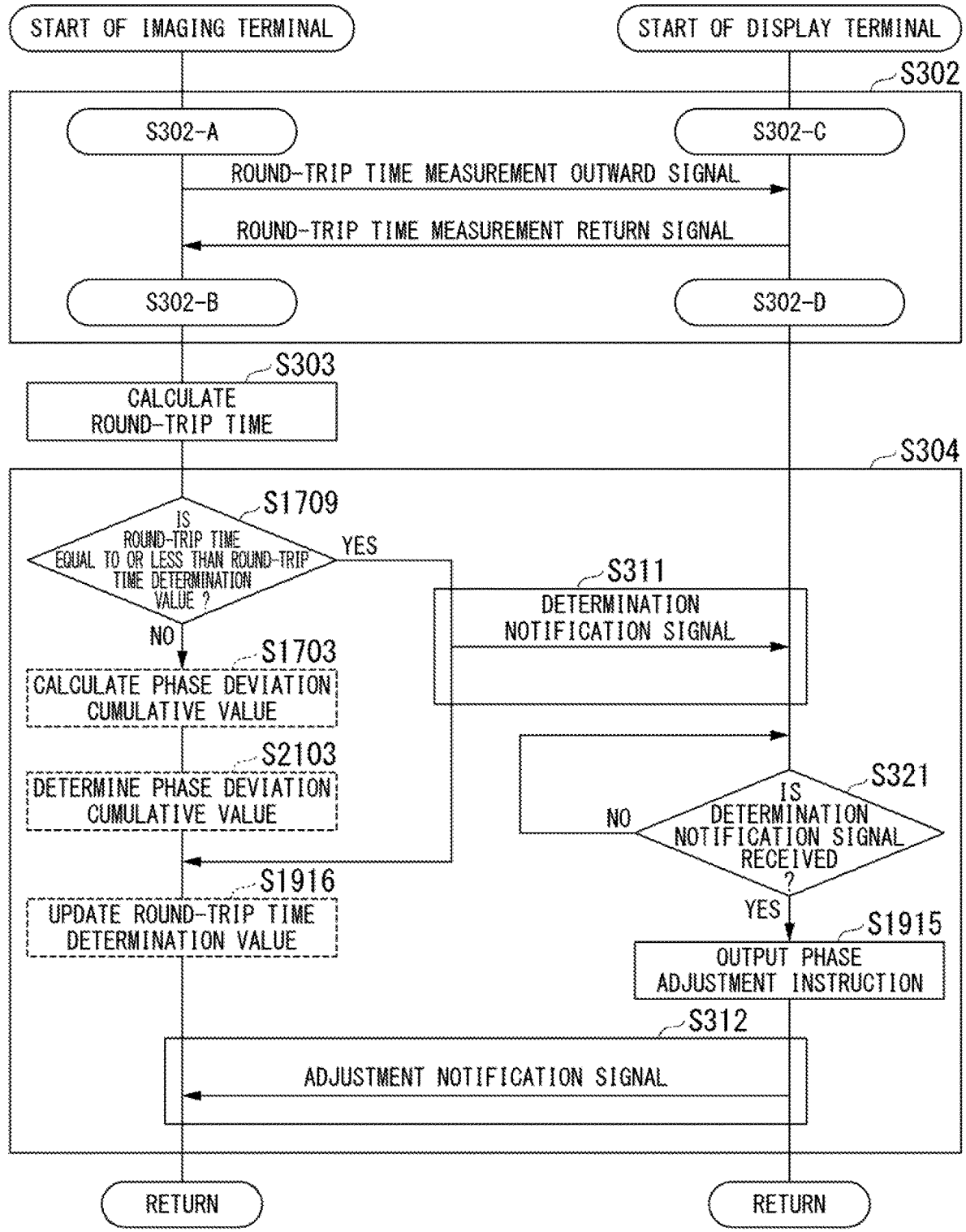
FIG. 29 is a flowchart showing a processing procedure of the image transfer system according to the ninth embodiment of the present invention.

Next, an operation of a process in the image transfer system 9 will be described. In the image transfer system 9, a process of transmitting information regarding the phase adjustment determination result to the display terminal 7200 and a process of transmitting information regarding the phase adjustment instruction to the imaging terminal 7100 are added with a change to a configuration in which the phase adjustment unit 7109 is included in the display terminal 7200. However, an overview of an overall operation in the image transfer system 9 is similar to that of the image transfer system 1 according to the first embodiment and the image transfer system 2 according to the second embodiment. Accordingly, in the image transfer system 9, description of the overview of the overall operation will be omitted and a more specific operation of adjusting the phase of the imaging synchronization signal in the image transfer system 9 will be described. FIG. 29 is a flowchart showing a processing procedure of the image transfer system 9 according to the ninth embodiment of the present invention.

In the image transfer system 9, when the phase adjustment process starts, the imaging terminal 7100 transmits the round-trip time measurement outward signal to the display terminal 7200, and the display terminal 7200 transmits the round-trip time measurement return signal in accordance with the round-trip time measurement outward signal to the imaging terminal 7100 in step S302. The process of step S302 in the image transfer system 9 is similar to the process of step S302 in the image transfer system 1 according to the first embodiment and the image transfer system 2 according to the second embodiment.

Thereafter, in the image transfer system 9, in step S303, the imaging terminal 7100 calculates the round-trip time necessary for transmission and reception in the wireless transfer between the imaging terminal 7100 and the display terminal 7200. The process of step S303 in the image transfer system 9 is also similar to the process of step S303 in the image transfer system 1 according to the first embodiment and the image transfer system 2 according to the second embodiment.

Thereafter, in the image transfer system 9, in step S304, the phase of the imaging synchronization signal is adjusted based on the round-trip time calculated in step S303. Here, in the image transfer system 9, the display terminal 7200 outputs the phase adjustment instruction to the synchronization signal generation unit 102 included in the imaging terminal 7100.

More specifically, in step S304, the phase adjustment determination unit 7110 determines whether the round-trip time calculated by the round-trip time measurement unit 7106 is equal to or less than the pre-decided round-trip time determination value (step S1709).

When the round-trip time is not equal to or less than the pre-decided round-trip time determination value, that is, the round-trip time calculated by the round-trip time measurement unit 7106 included in the imaging terminal 7100 is greater than the pre-decided round-trip time determination value in a determination result of step S1709 ("NO" in step S1709), the phase adjustment determination unit 7110 determines that the phase adjustment is not performed, and the process of step S304 ends.

In this case, even in the image transfer system 9, the phase deviation cumulative value estimation unit 111 may estimate a deviation amount between the phases of the imaging synchronization signal and the display synchronization signal and may update the pre-decided round-trip time determination value used when the phase adjustment determination unit 7110 determines whether the phase of the imaging synchronization signal is adjusted based on the estimation result. Since the process (step S1703 to step S1916) of estimating the deviation amount between the phases of the imaging synchronization signal and the display synchronization signal and updating the round-trip time determination value in the image transfer system 9 is the same as that of the image transfer system 1 according to the first embodiment to the image transfer system 8 according to the eighth embodiment, detailed description thereof will be omitted.

Conversely, when the round-trip time is equal to or less than the pre-decided round-trip time determination value in a determination result of step S1709 ("YES" in step S1709), the phase adjustment determination unit 7110 determines that the phase adjustment is performed. In this case, the phase adjustment determination unit 7110 generates a determination notification signal including the phase adjustment determination result indicating the determination result and transmits the generated determination notification signal to the display terminal 7200 (step S311). More specifically, the phase adjustment determination unit 7110 generates a determination notification signal including information regarding the phase adjustment determination result and information regarding the round-trip time calculated by the round-trip time measurement unit 7106. Then, the phase adjustment determination unit 7110 outputs the generated determination notification signal to the wireless communication unit 108 to transmit the determination notification signal to the phase adjustment unit 7109 via the wireless communication unit 108 and the antenna 120.

In this case, even in the image transfer system 9, the phase adjustment determination unit 7110 may perform the process of step S1916 of updating the round-trip time of a small value determined to be equal to or less than the pre-decided round-trip time determination value to the round-trip time determination value at the time of subsequent determination of the round-trip time. Since the process of step S1916 in the image transfer system 9 is also the same as the process of step S1916 of the image transfer system 1 according to the first embodiment to the image transfer system 8 according to the eighth embodiment, detailed description thereof will be omitted.

The display terminal 7200 confirms whether the determination notification signal transmitted from the imaging terminal 7100 is received (step S321). More specifically, the phase adjustment unit 7109 confirms whether the information regarding the round-trip time and the phase adjustment determination result determined by the phase adjustment determination unit 7110 are acquired. When the information regarding the round-trip time and the phase adjustment determination result determined by the phase adjustment determination unit 7110 are not acquired in a confirmation result of step S321 ("NO" in step S321), the phase adjustment unit 7109 returns the process to step S321 and repeats step S321 until the information regarding the round-trip time and the phase adjustment determination result are acquired from the phase adjustment determination unit 7110. Conversely, when the information regarding the round-trip time and the phase adjustment determination result determined by the phase adjustment determination unit 7110 are acquired in a determination result of step S321 ("YES" in step S321), the phase adjustment unit 7109 generates the adjustment notification signal including the phase adjustment instruction to adjust the phase of the imaging synchronization signal based on the acquired information regarding the round-trip time and phase adjustment determination result (step S1915).

Then, the phase adjustment unit 7109 transmits the generated adjustment notification signal to the imaging terminal 7100 (step S312). Thus, the imaging terminal 7100 acquires the phase adjustment instruction generated by the phase adjustment unit 7109 included in the display terminal 7200. More specifically, the wireless communication unit 108 receives the adjustment notification signal transmitted from the display terminal 7200 via the antenna 120. Then, the wireless communication unit 108 outputs the information regarding the phase adjustment instruction included in the received adjustment notification signal to the phase adjustment determination unit 7110. The phase adjustment determination unit 7110 outputs the phase adjustment instruction output from the wireless communication unit 108 to the synchronization signal generation unit 102. Thus, the synchronization signal generation unit 102 adjusts the phase of the generated imaging synchronization signal in accordance with the phase adjustment instruction output from the phase adjustment determination unit 7110, that is, the phase adjustment instruction transmitted from the phase adjustment unit 7109 included in the display terminal 7200.

In this way, in the image transfer system 9, the imaging terminal 7100 transmits the round-trip time measurement outward signal and calculates the round-trip time in the wireless transfer between the imaging terminal 7100 and the display terminal 7200. In the image transfer system 9, the imaging terminal 7100 transmits the phase adjustment determination result obtained by determining whether the phase of the imaging synchronization signal is adjusted to the display terminal 7200, and the display terminal 7200 generates the phase adjustment instruction based on the phase adjustment determination result transmitted from the imaging terminal 7100 and transmits the generated phase adjustment instruction to the imaging terminal 7100. Thus, in the image transfer system 9, the imaging terminal 7100 adjusts the phases of the imaging synchronization signal and the display synchronization signal so that the phases do not deviate over time in accordance with the phase adjustment instruction transmitted from the display terminal 7200.

Even in the image transfer system 9, as in the image transfer system 1 according to the first embodiment to the image transfer system 8 according to the eighth embodiment, the process of adjusting the period of the imaging synchronization signal in step S310 may be performed subsequently after the process of adjusting the phase of the imaging synchronization signal in step S304. The process of step S310 in this case is similar to the process of step S310 in the image transfer system 1 according to the first embodiment to the image transfer system 8 according to the eighth embodiment. In the flowchart of the processing procedure of the image transfer system 9 shown in FIG. 29, the process of step S310 performed subsequently after the process of step S304 is not shown.

In this configuration and the processing procedure, in the image transfer system 9, the imaging terminal 7100 measures (calculates) the round-trip time in the wireless transfer between the imaging terminal 7100 and the display terminal 7200 by transmitting the round-trip time measurement outward signal. Even in the image transfer system 9, the imaging terminal 7100 determines whether the phase of the imaging synchronization signal is adjusted based on the measured (calculated) round-trip time and transmits the phase adjustment determination result of the determination result to the display terminal 7200. In the image transfer system 9, the display terminal 7200 transmits the phase adjustment instruction to adjust the phase of the imaging synchronization signal based on the phase adjustment determination result and the information regarding the measured round-trip time transmitted from the imaging terminal 7100 to the imaging terminal 7100. Then, in the image transfer system 9, the imaging terminal 7100 adjusts the phase of the generated imaging synchronization signal in accordance with the phase adjustment instruction transmitted from the display terminal 7200. Thus, even in the image transfer system 9, as in the image transfer system 1 according to the first embodiment to the image transfer system 8 according to the eighth embodiment, the phase and the period (at least the phase) of the imaging synchronization signal generated by the imaging terminal 7100 (more specifically, the synchronization signal generation unit 102) are adjusted so that the phase and the period of the imaging synchronization signal match the phase and the period (at least the phase) of the display synchronization signal generated by the display terminal 7200. That is, even in the image transfer system 9, as in the image transfer system 1 according to the first embodiment to the image transfer system 8 according to the eighth embodiment, a timing at which the imaging terminal 7100 wirelessly delivers the captured image data of the image captured by the imaging unit (not shown) to the display terminal 7200 matches a timing at which the display terminal 7200 causes the display unit (not shown) to display the image in accordance with the captured image data. Thus, even in the image transfer system 9, as in the image transfer system 1 according to the first embodiment to the image transfer system 8 according to the eighth embodiment, the display terminal 7200 can stably cause the display unit (not shown) to display the image in accordance with the captured image data wirelessly delivered from the imaging terminal 7100.

As described above, in the image transfer system 9 according to the ninth embodiment, after the wireless connection between the imaging terminal 7100 and the display terminal 7200 is established, the round-trip time measurement outward signal and the round-trip time measurement return signal are transmitted and received between the round-trip time measurement unit 7106 included in the imaging terminal 7100 and the round-trip time measurement assisting unit 7202 included in the display terminal 7200. Then, in the image transfer system 9 according to the ninth embodiment, the round-trip time measurement unit 7106 calculates a round-trip time necessary for transmission and reception in the wireless transfer between the imaging terminal 7100 and the display terminal 7200 based on the transmission time of the round-trip time measurement outward signal and the reception time of the round-trip time measurement return signal in accordance with the round-trip time measurement outward signal transmitted from the round-trip time measurement assisting unit 7202. Then, in the image transfer system 9 according to the ninth embodiment, the phase adjustment determination unit 7110 included in the imaging terminal 7100 determines whether the phase of the imaging synchronization signal generated by the synchronization signal generation unit 102 included in the imaging terminal 7100 is adjusted based on the round-trip time calculated by the round-trip time measurement unit 7106 and transmits the phase adjustment determination result of the determination result to the display terminal 7200. Then, in the image transfer system 9 according to the ninth embodiment, the phase adjustment unit 7109 included in the display terminal 7200 generates the phase adjustment instruction to adjust the phase of the imaging synchronization signal and transmits the phase adjustment instruction to the imaging terminal 7100 based on the phase adjustment determination result transmitted from the imaging terminal 7100. Thus, in the image transfer system 9 according to the ninth embodiment, the synchronization signal generation unit 102 included in the imaging terminal 7100 adjusts the phase of the generated imaging synchronization signal in accordance with the phase adjustment instruction transmitted from the phase adjustment unit 7109.

Thus, even in the image transfer system 9 according to the ninth embodiment, as in the image transfer system 1 according to the first embodiment to the image transfer system 8 according to the eighth embodiment, the phase and the period (at least the phase) of the imaging synchronization signal can match the phase and the period (at least the phase) of the display synchronization signal. That is, even in the image transfer system 9 according to the ninth embodiment, the phase and the period (at least the phase) of the imaging synchronization signal can match the phase and the period (at least the phase) of the display synchronization signal even when the phases of the imaging synchronization signal and the display synchronization signal deviate from one another over time due to an error of the phase and the period between the imaging standard clock signal and the display standard clock signal. Thus, even in the image transfer system 9 according to the ninth embodiment, it is possible to obtain similar advantages as those of the image transfer system 1 according to the first embodiment to the image transfer system 8 according to the eighth embodiment. That is, even in the image transfer system 9 according to the ninth embodiment, as in the image transfer system 1 according to the first embodiment to the image transfer system 8 according to the eighth embodiment, the captured image data can be wirelessly delivered from the imaging terminal 7100 to the display terminal 7200 without exceeding a valid period of a display image, and thus the display terminal 7200 can display the display image stably in accordance with the captured image data transmitted from the imaging terminal 7100.

Further, in the image transfer system 9 according to the ninth embodiment, the display terminal 7200 generates the phase adjustment instruction to adjust the phase of the generated imaging synchronization signal and transmits the phase adjustment instruction to the imaging terminal 7100. Thus, in the image transfer system 9 according to the ninth embodiment, it is not necessary to generate the phase adjustment instruction in the imaging terminal 7100, and it is possible to reduce a load of the process performed in the imaging terminal 7100.

According to each embodiment of the present invention, there is provided an image transfer system (for example, the image transfer system 1) including an imaging terminal (for example, the imaging terminal 100) that transmits captured image data at an imaging period (a timing signal: for example, an imaging synchronization signal) and a display terminal (for example, the display terminal 200) that receives the captured image data and displays the captured image data at a display period (a timing signal: for example, a display synchronization signal). The image transfer system (for example, the image transfer system 1) includes: a communication delay time calculation function (for example, a function of the round-trip time measurement unit 106) provided for one terminal between the imaging terminal and the display terminal, the function of generating a first measurement signal (a round-trip time measurement outward signal) in synchronization with the timing signal (for example, an imaging synchronization signal) and transmitting the round-trip time measurement outward signal to the other terminal, receiving a second measurement signal (a round-trip time measurement return signal) in accordance with the round-trip time measurement outward signal transmitted from the other terminal, and calculating a communication delay time (a round-trip time) based on a transmission timing of the round-trip time measurement outward signal, a reception timing of the round-trip time measurement return signal, and elapsed time data (a receiver elapsed time) included in the round-trip time measurement return signal and indicating an elapsed time from a reception timing of the round-trip time measurement outward signal to a transmission timing of the round-trip time measurement return signal in the other terminal; a communication delay time calculation assisting function (for example, a function of the round-trip time measurement assisting unit 202) provided for the other terminal, the function of receiving the round-trip time measurement outward signal, generating the round-trip time measurement return signal including the receiver elapsed time, and transmitting the round-trip time measurement return signal to the one terminal; an adjustment necessity or non-necessity determination function (for example, a function of the phase adjustment determination unit 110) provided for one terminal between the imaging terminal and the display terminal, the function of determining necessity or non-necessity of adjustment for phase deviation (phase adjustment) between an imaging timing (for example, an imaging synchronization signal) of the imaging terminal and a display timing (for example, a display synchronization signal) of the display terminal based on the round-trip time and a pre-decided threshold time (a round-trip time determination value); and a phase adjustment function (for example, a function of the phase adjustment unit 109) provided for one terminal between the imaging terminal and the display terminal, the function of adjusting a phase of the imaging timing (for example, the imaging synchronization signal) or the display timing (for example, the display synchronization signal) when the phase adjustment is determined to be necessary (the phase adjustment is determined to be performed).

According to each embodiment of the present invention, in the image transfer system (for example, the image transfer system 1), in the phase adjustment function, the phase of the imaging timing (for example, the imaging synchronization signal) or the display timing (for example, the display synchronization signal) is adjusted based on the round-trip time when the phase adjustment is determined to be necessary (the phase adjustment is determined to be performed).

According to each embodiment of the present invention, in the image transfer system (for example, the image transfer system 1), in the adjustment necessity or non-necessity determination function, the phase adjustment is determined to be performed when the round-trip time is equal to or less than the round-trip time determination value.

According to each embodiment of the present invention, in the image transfer system (for example, the image transfer system 1), in the adjustment necessity or non-necessity determination function, the round-trip time determination value is updated to a time shorter than a current decided time when the phase adjustment is determined to be performed.

According to each embodiment of the present invention, in the image transfer system (for example, the image transfer system 1), the adjustment necessity or non-necessity determination function includes a phase deviation cumulative time estimation function (for example, a function of the phase deviation cumulative value estimation unit 111) of estimating (calculating) a cumulative time of the phase deviation (a phase deviation cumulative value) based on a non-adjustment elapsed time (phase non-adjustment time) indicating an elapsed time from a time at which the phase adjustment is determined to be performed last when the round-trip time exceeds the round-trip time determination value (the round-trip time is greater than the round-trip time determination value) (when the phase adjustment is determined not to be performed). In the phase deviation cumulative time estimation function, the round-trip time determination value is updated based on the round-trip time when the estimated (calculated) phase deviation cumulative time exceeds a predetermined ratio of the round-trip time determination value.

According to each embodiment of the present invention, in the image transfer system (for example, the image transfer system 1), the imaging terminal and the display terminal include a clock generator (for example, the source oscillation clock generation unit 103 or the source oscillation clock generation unit 205) with the same specification. In the phase deviation cumulative time estimation function, the phase deviation cumulative value is estimated (calculated) based on the phase non-adjustment time and information indicating pre-stored precision specification of the clock generator.

According to each embodiment of the present invention, the image transfer system (for example, the image transfer system 1) further includes a period adjustment necessity and non-necessity determination function (for example, a function of the period adjustment unit 101) provided for one terminal between the imaging terminal and the display terminal, the period adjustment necessity and non-necessity determination function of determining necessity or non-necessity of adjustment of period deviation (period adjustment) between the timing signal (for example, the imaging synchronization signal) and the timing signal (for example, the display synchronization signal) whenever a predetermined time elapses.

According to each embodiment of the present invention, in the image transfer system (for example, the image transfer system 1), in the phase deviation cumulative time estimation function, the phase deviation cumulative value is estimated (calculated) based on the phase non-adjustment time and information indicating an adjustment amount of the period deviation (a period adjustment amount) by the period adjustment necessity and non-necessity determination function.

According to each embodiment of the present invention, there is provided an imaging terminal (for example, the imaging terminal 100) in an image transfer system (for example, the image transfer system 1) including the imaging terminal (for example, the imaging terminal 100) that transmits captured image data at an imaging period (a timing signal: for example, an imaging synchronization signal) and a display terminal (for example, the display terminal 200) that receives the captured image data and displays the captured image data at a display period (a timing signal: for example, the display synchronization signal). The imaging terminal (for example, the imaging terminal 100) includes: a communication delay time calculation function (for example, a function of the round-trip time measurement unit 106) of generating a first measurement signal in synchronization with the timing signal (for example, the imaging synchronization signal) and transmitting the first measurement signal to the display terminal, receiving a second measurement signal (a round-trip time measurement return signal) in accordance with the first measurement signal (a round-trip time measurement outward signal) transmitted from the display terminal, and calculating a communication delay time (a round-trip time) based on a transmission timing of the round-trip time measurement outward signal, a reception timing of the round-trip time measurement return signal, and elapsed time data (a receiver elapsed time) included in the round-trip time measurement return signal and indicating an elapsed time from a reception timing of the round-trip time measurement outward signal to a transmission timing of the round-trip time measurement return signal in the display terminal; an adjustment necessity or non-necessity determination function (for example, a function of the phase adjustment determination unit 110) of determining necessity or non-necessity of adjustment for phase deviation (phase adjustment) between an imaging timing (for example, an imaging synchronization signal) of the imaging terminal and a display timing (for example, a display synchronization signal) of the display terminal based on the round-trip time and a pre-decided threshold time (for example, a round-trip time determination value); and a phase adjustment function (for example, a function of the phase adjustment unit 109) of adjusting a phase of the imaging timing (for example, the imaging synchronization signal) when the phase adjustment is determined to be necessary (the phase adjustment is determined to be performed).

According to each embodiment of the present invention, there is provided a display terminal (for example, the display terminal 200) in an image transfer system (for example, the image transfer system 1) including an imaging terminal (for example, the imaging terminal 100) that transmits captured image data at an imaging period (a timing signal: for example, an imaging synchronization signal) and the display terminal (for example, the display terminal 200) that receives the captured image data and displays the captured image data at a display period (a timing signal: for example, the display synchronization signal). The display terminal (for example, the display terminal 200) includes a communication delay time calculation assisting function (for example, a function of the round-trip time measurement assisting unit 202) of receiving a first measurement signal (a round-trip time measurement outward signal) transmitted from the imaging terminal in synchronization with a timing signal (for example, an imaging synchronization signal), generating a round-trip time measurement return signal including elapsed time data (a receiver elapsed time) indicating an elapsed time from a reception timing of the round-trip time measurement outward signal and a transmission timing of the second measurement signal (the round-trip time measurement return signal) in accordance with the round-trip time measurement outward signal, and transmitting the round-trip time measurement return signal to the imaging terminal.

According to each embodiment of the present invention, there is provided an adjustment method of adjusting phase deviation (performing phase adjustment) between an imaging timing (for example, an imaging synchronization signal) of an imaging terminal and a display timing (for example, a display synchronization signal) of a display terminal in an image transfer system (for example, the image transfer system 1) including the imaging terminal (for example, the imaging terminal 100) that transmits captured image data at an imaging period (a timing signal: for example, an imaging synchronization signal) and the display terminal (for example, the display terminal 200) that receives the captured image data and displays the captured image data at a display period (a timing signal: for example, a display synchronization signal). The adjustment method includes: a process of generating a first measurement signal (the round-trip time measurement outward signal) in synchronization with the timing signal (for example, the imaging synchronization signal) from one terminal between the imaging terminal and the display terminal and transmitting the first measurement signal (the round-trip time measurement outward signal) to the other terminal; a process of receiving the round-trip time measurement outward signal by the other terminal; a process of generating a second measurement signal (the round-trip time measurement return signal) including elapsed time data (a receiver elapsed time) indicating an elapsed time from a reception timing of the round-trip time measurement outward signal to a transmission timing of the round-trip time measurement return signal in accordance with the round-trip time measurement outward signal and transmitting the round-trip time measurement return signal to the one terminal by the other terminal; a process of receiving the round-trip time measurement return signal and calculating a communication delay time (a round-trip time) based on a transmission timing of the round-trip time measurement outward signal, a reception timing of the round-trip time measurement return signal, and the receiver elapsed time by the one terminal; a process of determining necessity or non-necessity of the phase adjustment between the imaging timing (for example, an imaging synchronization signal) of the imaging terminal and the display timing (for example, a display synchronization signal) of the display terminal based on the round-trip time and a pre-decided threshold time (a round-trip time determination value) by one terminal between the imaging terminal and the display terminal; and a process of adjusting a phase of the imaging timing (for example, the imaging synchronization signal) or the display timing (for example, the display synchronization signal) by one terminal between the imaging terminal and the display terminal when the phase adjustment is determined to be necessary (the phase adjustment is determined to be performed).

According to each embodiment of the present invention, there is provided an adjustment method of adjusting phase deviation (phase adjustment) between an imaging timing (for example, an imaging synchronization signal) of an imaging terminal (for example, the imaging terminal 100) and a display timing (for example, a display synchronization signal) of a display terminal (for example, the display terminal 200) in the imaging terminal of an image transfer system (for example, the image transfer system 1) including the imaging terminal that transmits captured image data at an imaging period (a timing signal: for example, an imaging synchronization signal) and the display terminal that receives the captured image data and displays the captured image data at a display period (a timing signal: for example, a display synchronization signal). The adjustment method includes: a process of generating a first measurement signal (a round-trip time measurement outward signal) in synchronization with the timing signal (for example, the imaging synchronization signal) and transmitting the round-trip time measurement outward signal to the display terminal; a process of receiving a second measurement signal (a round-trip time measurement return signal) including elapsed time data (a receiver elapsed time) indicating an elapsed time from a reception timing of the round-trip time measurement outward signal to a transmission timing of the round-trip time measurement return signal in accordance with the round-trip time measurement outward signal transmitted from the display terminal; a process of calculating a communication delay time (a round-trip time) based on a transmission timing of the round-trip time measurement outward signal, a reception timing of the round-trip time measurement return signal, and the receiver elapsed time; a process of determining necessity or non-necessity of the phase adjustment between the imaging timing (for example, the imaging synchronization signal) of the imaging terminal and the display timing (for example, the display synchronization signal) of the display terminal based on the round-trip time and a pre-decided threshold time (a round-trip time determination value); and a process of adjusting a phase of the imaging timing (for example, the imaging synchronization signal) when the phase adjustment is determined to be necessary (the phase adjustment is determined to be performed).

According to each embodiment of the present invention, there is provided an adjustment support method of assisting adjustment of phase deviation (phase adjustment) between an imaging timing (for example, an imaging synchronization signal) of an imaging terminal (for example, the imaging terminal 100) and a display timing (for example, a display synchronization signal) of a display terminal (for example, the display terminal 200) in the display terminal of an image transfer system (for example, the image transfer system 1) including the imaging terminal that transmits captured image data at an imaging period (a timing signal: for example, an imaging synchronization signal) and the display terminal that receives the captured image data and displays the captured image data at a display period (a timing signal: for example, a display synchronization signal). The adjustment support method includes a process of receiving a first measurement signal (a round-trip time measurement outward signal) transmitted from the imaging terminal in synchronization with a timing signal (for example, an imaging synchronization signal), generating a round-trip time measurement return signal including elapsed time data (a receiver elapsed time) indicating an elapsed time from a reception timing of the round-trip time measurement outward signal and a transmission timing of the second measurement signal (the round-trip time measurement return signal) in accordance with the round-trip time measurement outward signal, and transmitting the round-trip time measurement return signal to the imaging terminal.

According to each embodiment of the present invention, there is provided an adjustment program causing a computer to perform an adjustment method of adjusting phase deviation (phase adjustment) between an imaging timing (for example, an imaging synchronization signal) of an imaging terminal (for example, the imaging terminal 100) and a display timing (for example, a display synchronization signal) of a display terminal (for example, the display terminal 200) in the imaging terminal of an image transfer system (for example, the image transfer system 1) including the imaging terminal that transmits captured image data at an imaging period (a timing signal: for example, an imaging synchronization signal) and the display terminal that receives the captured image data and displays the captured image data at a display period (a timing signal: for example, a display synchronization signal). The adjustment program causes the computer to perform: a process of generating a first measurement signal (a round-trip time measurement outward signal) in synchronization with the timing signal (for example, the imaging synchronization signal) and transmitting the round-trip time measurement outward signal to the display terminal; a process of receiving a second measurement signal (a round-trip time measurement return signal) including elapsed time data (a receiver elapsed time) indicating an elapsed time from a reception timing of the round-trip time measurement outward signal to a transmission timing of the round-trip time measurement return signal in accordance with the round-trip time measurement outward signal transmitted from the display terminal; a process of calculating a communication delay time (a round-trip time) based on a transmission timing of the round-trip time measurement outward signal, a reception timing of the round-trip time measurement return signal, and the receiver elapsed time; a process of determining necessity or non-necessity of the phase adjustment between the imaging timing (for example, the imaging synchronization signal) of the imaging terminal and the display timing (for example, the display synchronization signal) of the display terminal based on the round-trip time and a pre-decided threshold time (a round-trip time determination value); and a process of adjusting a phase of the imaging timing (for example, the imaging synchronization signal) when the phase adjustment is determined to be necessary (the phase adjustment is determined to be performed).

According to each embodiment of the present invention, there is provided an adjustment support program causing a computer to perform an adjustment support method of assisting adjustment of phase deviation (phase adjustment) between an imaging timing (for example, an imaging synchronization signal) of an imaging terminal (for example, the imaging terminal 100) and a display timing (for example, a display synchronization signal) of a display terminal (for example, the display terminal 200) in the display terminal of an image transfer system (for example, the image transfer system 1) including the imaging terminal that transmits captured image data at an imaging period (a timing signal: for example, an imaging synchronization signal) and the display terminal that receives the captured image data and displays the captured image data at a display period (a timing signal: for example, a display synchronization signal). The adjustment support program causes the computer to perform a process of receiving a first measurement signal (a round-trip time measurement outward signal) transmitted from the imaging terminal in synchronization with a timing signal (for example, an imaging synchronization signal), generating a round-trip time measurement return signal including elapsed time data (a receiver elapsed time) indicating an elapsed time from a reception timing of the round-trip time measurement outward signal and a transmission timing of the second measurement signal (the round-trip time measurement return signal) in accordance with the round-trip time measurement outward signal, and transmitting the round-trip time measurement return signal to the imaging terminal.

As described above, according to each embodiment of the present invention, in the image transfer system in which the captured image data is wirelessly delivered between the imaging terminal and the display terminal, the round-trip time measurement outward signal and the round-trip time measurement return signal are transmitted and received between the imaging terminal and the display terminal. According to each embodiment of the present invention, of the imaging terminal and the display terminal, one terminal transmitting the round-trip time measurement outward signal and receiving the round-trip time measurement return signal calculates the round-trip time necessary for transmission and reception of a signal in the wireless transfer between the imaging terminal and the display terminal based on a transmission time of the round-trip time measurement outward signal and a reception time of the round-trip time measurement return signal in accordance with the transmitted round-trip time measurement outward signal. Thereafter, according to each embodiment of the present invention, whether the phase adjustment of the timing signal (in each embodiment, the imaging synchronization signal) generated by the imaging terminal is performed is determined based on the calculated round-trip time, and the phase of the timing signal is adjusted when the phase adjustment is determined to be performed. Thus, according to each embodiment of the present invention, the phase of the timing signal generated by the imaging terminal can match the phase of the timing signal generated by the display terminal (in each embodiment, the display synchronization signal) even when the phases of the timing signal generated by the imaging terminal and the timing signal generated by the display terminal deviate from one another over time due to an error of the phase and the period between the standard clock signals of the imaging terminal and the display terminal. Thus, according to each embodiment of the present invention, even when a variation in the transfer time or sudden considerable lag occurs in the wireless transfer between the imaging terminal and the display terminal, the wireless transfer can be performed in a state excluding lag of wireless transfer exceeding a predetermined range. Thus, according to each embodiment of the present invention, the captured image data can be wirelessly delivered from the imaging terminal to the display terminal without exceeding a valid period of a display image, and thus the display terminal can display the display image stably in accordance with the captured image data transmitted from the imaging terminal.

According to each embodiment of the present invention, the image transfer system configured such that the phase of the imaging synchronization signal generated by the imaging terminal and the phase of the display synchronization signal generated by the display terminal are adjusted so that the phases match one other has been described. That is, according to each embodiment of the present invention, the case in which the timing signal of a phase adjustment target is the imaging synchronization signal generated by the imaging terminal has been described. However, the timing signal of the phase adjustment target is not limited to the timing signal generated by the imaging terminal in each embodiment of the present invention. For example, the timing signal of the phase adjustment target may be the timing signal generated by the display terminal. That is, the image transfer system may have a configuration in which the phase of the display synchronization signal generated by the display terminal is adjusted to match the phase of the imaging synchronization signal generated by the imaging terminal. Even in this case, by applying the point of view of the present invention, it is possible to easily realize the image transfer system that has a configuration in which the phase is adjusted using the timing signal at which the display terminal is generated as a timing signal of the target.

For example, the above-described various processes related to the image transfer system 1 according to the embodiment or the round-trip time measurement unit 106, the phase adjustment determination unit 110, the phase adjustment unit 109, or the phase deviation cumulative value estimation unit 111 included in the imaging terminal 100 or the round-trip time measurement assisting unit 202 included in the display terminal 200 may be performed by recording a program realizing processes by the image transfer system 1 shown in FIG. 2 or a part of the image transfer system 1, for example, the round-trip time measurement unit 106, the phase adjustment determination unit 110, the phase adjustment unit 109, or the phase deviation cumulative value estimation unit 111 included in the imaging terminal 100 or the round-trip time measurement assisting unit 202 included in the display terminal 200, in a computer-readable recording medium, reading the program recorded on the recording medium to a computer system, and executing the program. The "computer system" mentioned here may include an OS or hardware such as a peripheral device. The "computer system" is assumed to include a home page providing environment (or a display environment) when a WWW system is used. The "computer-readable recording medium" is a storage device such as a writable nonvolatile memory such as a flexible disc, a magneto-optical disc, a ROM, or a flash memory, a portable medium such as a CD, or a hard disk embedded in a computer system.

Further, the "computer-readable recording medium" is assumed to include retaining a program for a given time, such as a volatile memory (for example, a dynamic random access memory (DRAM)) inside a computer system serving as a server or a client when a program is transmitted via a network such as the Internet or a communication circuit such as a telephone circuit. The program may be delivered from a computer system storing the program in a storage device or the like to another computer system via a transfer medium or by radio waves in a transfer medium. Here, a "transfer system" delivering a program is a medium that has a function of delivering information, such as a network (communication network) such as the Internet or a communication circuit (communication line) such as a telephone circuit. The program may be a program realizing some of the above-described functions. Further, the above-described functions may be a program realized by combining the program with a program recorded previously in a computer system, a so-called a differential file (differential program).

While preferred embodiments of the invention have been described and shown above, it should be understood that these are exemplary examples of the invention and are not to be conceived as limiting. Additions, omissions, substitutions, and other modifications of configurations can be made without departing from the spirit or scope of the present invention. Accordingly, the invention is not to be considered as being limited by the foregoing description, and is only limited by the scope of the appended claims.

What is claimed is:

1. An image transfer system including an imaging terminal that transmits captured image data at an imaging period and a display terminal that is configured to receive the captured image data and display the captured image data at a display period, wherein
a processor included in one terminal of the imaging terminal and the display terminal is programmed to execute a communication delay time calculation function of generating a first measurement signal in synchronization with the imaging period and transmitting the first measurement signal to the other terminal, receiving a second measurement signal in accordance with the first measurement signal transmitted from the other terminal, and calculating a communication delay time according to a transmission timing of the first measurement signal, a reception timing of the second measurement signal, and elapsed time data included in the second measurement signal and indicating an elapsed time from a reception timing of the first measurement signal to a transmission timing of the second measurement signal in the other terminal,
a processor included in the other terminal is programmed to execute a communication delay time calculation assisting function of receiving the first measurement signal, generating the second measurement signal including the elapsed time data, and transmitting the second measurement signal to the one terminal,
a processor included in either one terminal of the imaging terminal and the display terminal is programmed to execute an adjustment necessity or non-necessity determination function of determining necessity or non-necessity of adjustment for phase deviation between an imaging timing of the imaging terminal and a display timing of the display terminal according to the communication delay time and a pre-decided threshold time, and
a processor included in either one terminal of the imaging terminal and the display terminal is programmed to execute a phase adjustment function of adjusting a phase of the imaging timing or the display timing when the adjustment of the phase deviation is determined to be necessary.

2. The image transfer system according to claim 1, wherein, in the phase adjustment function, the phase of the imaging timing or the display timing is adjusted according to the communication delay time when the adjustment of the phase deviation is determined to be necessary.

3. The image transfer system according to claim 2, wherein, in the adjustment necessity or non-necessity determination function, the adjustment of the phase deviation is determined to be necessary when the communication delay time is equal to or less than the threshold time.

4. The image transfer system according to claim 3, wherein, in the adjustment necessity or non-necessity determination function, the threshold time is updated to a time shorter than a current decided time when the adjustment of the phase deviation is determined to be necessary.

5. The image transfer system according to claim 3,
wherein the adjustment necessity or non-necessity determination function includes a phase deviation cumulative time estimation function of estimating a cumulative time of the phase deviation according to a non-adjustment elapsed time indicating an elapsed time from a time at which the adjustment of the phase deviation is last determined to be necessary when the communication delay time exceeds the threshold time, and
wherein, in the phase deviation cumulative time estimation function, the threshold time is updated according to the communication delay time when the estimated cumulative time exceeds a predetermined ratio of the threshold time.

6. The image transfer system according to claim 5,
wherein the imaging terminal and the display terminal include a clock generator with the same specification, and
wherein, in the phase deviation cumulative time estimation function, the cumulative time is estimated according to the non-adjustment elapsed time and information indicating a pre-stored precision specification of the clock generator.

7. The image transfer system according to claim 5, further comprising:
a period adjustment necessity and non-necessity determination function provided for one terminal between the imaging terminal and the display terminal, the period adjustment necessity and non-necessity determination function of determining necessity or non-necessity of adjustment of period deviation between the imaging period and the display period whenever a predetermined time elapses.

8. The image transfer system according to claim 7, wherein, in the phase deviation cumulative time estimation function, the cumulative time is estimated according to the non-adjustment elapsed time and information indicating an adjustment amount of the period deviation by the period adjustment necessity and non-necessity determination function.

9. An imaging terminal in an image transfer system including the imaging terminal that transmits captured image data at an imaging period and a display terminal that is configured to receive the captured image data and displays the captured image data at a display period, the imaging terminal comprising a processor programmed to execute:
a communication delay time calculation function of generating a first measurement signal in synchronization with the imaging period and transmitting the first measurement signal to the display terminal, receiving a second measurement signal in accordance with the first measurement signal transmitted from the display terminal, and calculating a communication delay time according to a transmission timing of the first measurement signal, a reception timing of the second measurement signal, and elapsed time data included in the second measurement signal and indicating an elapsed time from a reception timing of the first measurement signal to a transmission timing of the second measurement signal in the display terminal;

an adjustment necessity or non-necessity determination function of determining necessity or non-necessity of adjustment for phase deviation between an imaging timing of the imaging terminal and a display timing of the display terminal according to the communication delay time and a pre-decided threshold time; and a phase adjustment function of adjusting a phase of the imaging timing when the adjustment of the phase deviation is determined to be necessary.

10. An adjustment method of adjusting phase deviation between an imaging timing of an imaging terminal and a display timing of a display terminal in an image transfer system including the imaging terminal that transmits captured image data at an imaging period and the display terminal that is configured to receive the captured image data and displays the captured image data at a display period, the adjustment method comprising:

a process of generating a first measurement signal in synchronization with the imaging period from one terminal between the imaging terminal and the display terminal and transmitting the first measurement signal to the other terminal;

a process of receiving the first measurement signal by the other terminal;

a process of generating the second measurement signal including elapsed time data indicating an elapsed time from a reception timing of the first measurement signal to a transmission timing of the second measurement signal in accordance with the first measurement signal and transmitting the second measurement signal to the one terminal by the other terminal;

a process of receiving the second measurement signal and calculating a communication delay time according to a transmission timing of the first measurement signal, a reception timing of the second measurement signal, and the elapsed time data by the one terminal;

a process of determining necessity or non-necessity of adjustment of phase deviation between the imaging timing of the imaging terminal and the display timing of the display terminal according to the communication delay time and a pre-decided threshold time by one terminal between the imaging terminal and the display terminal; and a process of adjusting a phase of the imaging timing or the display timing by one terminal between the imaging terminal and the display terminal when the adjustment of the phase deviation is determined to be necessary.

11. An adjustment method of adjusting phase deviation between an imaging timing of an imaging terminal and a display timing of a display terminal in the imaging terminal of an image transfer system including the imaging terminal that transmits captured image data at an imaging period and the display terminal that is configured to receive the captured image data and displays the captured image data at a display period, the adjustment method comprising:

a process of generating a first measurement signal in synchronization with the imaging period and transmitting the first measurement signal to the display terminal;

a process of receiving a second measurement signal including elapsed time data indicating an elapsed time from a reception timing of the first measurement signal to a transmission timing of the second measurement signal in accordance with the first measurement signal transmitted from the display terminal;

a process of calculating a communication delay time according to a transmission timing of the first measurement signal, a reception timing of the second measurement signal, and the elapsed time data;

a process of determining necessity or non-necessity of adjustment for phase deviation between the imaging timing of the imaging terminal and the display timing of the display terminal according to the communication delay time and a pre-decided threshold time; and a process of adjusting a phase of the imaging timing when the adjustment of the phase deviation is determined to be necessary.

12. A non-transitory computer-readable recording medium that stores a computer program causing a computer to perform an adjustment method of adjusting phase deviation between an imaging timing of an imaging terminal and a display timing of a display terminal in the imaging terminal of an image transfer system including the imaging terminal that transmits captured image data at an imaging period and the display terminal that is configured to receive the captured image data and displays the captured image data at a display period, the adjustment program causing the computer to perform:

a process of generating a first measurement signal in synchronization with the imaging period and transmitting the first measurement signal to the display terminal;

a process of receiving a second measurement signal including elapsed time data indicating an elapsed time from a reception timing of the first measurement signal to a transmission timing of the second measurement signal in accordance with the first measurement signal transmitted from the display terminal;

a process of calculating a communication delay time according to a transmission timing of the first measurement signal, a reception timing of the second measurement signal, and the elapsed time data;

a process of determining necessity or non-necessity of adjustment for phase deviation between the imaging timing of the imaging terminal and the display timing of the display terminal according to the communication delay time and a pre-decided threshold time; and a process of adjusting a phase of the imaging timing when the adjustment of the phase deviation is determined to be necessary.

* * * * *